United States Patent
Hulett et al.

(10) Patent No.: US 11,259,665 B2
(45) Date of Patent: Mar. 1, 2022

(54) APPARATUS, SYSTEMS, AND METHODS FOR BREWING A BEVERAGE

(71) Applicant: Starbucks Corporation, Seattle, WA (US)

(72) Inventors: Randy Hulett, Seattle, WA (US); David Doucette, Seattle, WA (US); Izaak Matthew Koller, Seattle, WA (US); Brian Shay, Seattle, WA (US); Harold A Brown, Seattle, WA (US); Jared Drinkwater, Auburn, WA (US); Levi Makaio Miller, Seattle, WA (US); Jeff Allison, Lake Oswego, OR (US); Peter Bristol, Seattle, WA (US)

(73) Assignee: Starbucks Corporation, Seattle, WA (US)

(*) Notice: Subject to any disclaimer, the term of this patent is extended or adjusted under 35 U.S.C. 154(b) by 151 days.

(21) Appl. No.: 16/436,691

(22) Filed: Jun. 10, 2019

(65) Prior Publication Data
US 2019/0290051 A1    Sep. 26, 2019

Related U.S. Application Data

(63) Continuation of application No. 13/684,117, filed on Nov. 21, 2012, now Pat. No. 10,314,426.
(Continued)

(51) Int. Cl.
*A47J 31/40* (2006.01)
*A47J 31/20* (2006.01)
(Continued)

(52) U.S. Cl.
CPC .............. *A47J 31/40* (2013.01); *A47J 31/20* (2013.01); *A47J 31/3609* (2013.01);
(Continued)

(58) Field of Classification Search
CPC . A47J 31/3609; A47J 31/3614; A47J 31/3619
See application file for complete search history.

(56) References Cited

U.S. PATENT DOCUMENTS

| 1,896,230 A | 1/1931 | Farago |
| D144,555 S | 4/1946 | Smith |
| (Continued) | | |

FOREIGN PATENT DOCUMENTS

| CN | 101026981 A | 8/2007 |
| CN | 101380197 A | 3/2009 |
| (Continued) | | |

OTHER PUBLICATIONS

Office Action for U.S. Appl. No. 13/684,117 dated Mar. 31, 2016, in 13 pages.
(Continued)

*Primary Examiner* — John J Norton
(74) *Attorney, Agent, or Firm* — Knobbe, Martens, Olson & Bear, LLP

(57) ABSTRACT

A system for brewing a desired portion of a beverage, such as a single-cup portion of coffee, is provided. The system may have more than one brew module. The system allows a user to quickly and easily brew a variety of types of single-cup portions of a beverage. In some embodiments, the system may brew a single-cup portion of coffee in a relatively short period of time based on a combination of certain parameters. The system may include an automatic cleaning mechanism such that a user does not need to manually clean components of a brewing machine between brew cycles. The system may also include apparatus configured to substantially prevent steam from reaching grinder components of the system. The system may also include apparatus configured to provide a precise dose of material based on, for (Continued)

example, volume of the material. Methods and apparatus for brewing a beverage are also disclosed.

15 Claims, 50 Drawing Sheets

Related U.S. Application Data

(60) Provisional application No. 61/563,185, filed on Nov. 23, 2011.

(51) Int. Cl.
*A47J 31/36* (2006.01)
*A47J 31/42* (2006.01)
*A47J 31/46* (2006.01)
*A47J 31/60* (2006.01)
*A47J 42/38* (2006.01)

(52) U.S. Cl.
CPC ......... *A47J 31/3619* (2013.01); *A47J 31/404* (2013.01); *A47J 31/42* (2013.01); *A47J 31/46* (2013.01); *A47J 31/60* (2013.01); *A47J 42/38* (2013.01)

(56) References Cited

U.S. PATENT DOCUMENTS

| | | |
|---|---|---|
| 3,007,392 A | 11/1961 | Pecoraro et al. |
| 3,087,415 A | 4/1963 | Kaplan et al. |
| 3,450,024 A | 6/1969 | Martin |
| 3,561,349 A | 2/1971 | Endo et al. |
| 3,580,425 A | 5/1971 | DeMan |
| 4,143,795 A | 3/1979 | Casebier |
| 4,253,385 A | 3/1981 | Illy |
| 4,421,014 A | 12/1983 | Vicker |
| 4,470,999 A | 9/1984 | Carpiac |
| 4,852,472 A | 8/1989 | In-Albon et al. |
| D304,407 S | 11/1989 | Fossella |
| 4,973,828 A | 11/1990 | Naruse et al. |
| 5,000,508 A | 3/1991 | Woods |
| 5,025,138 A | 6/1991 | Cuervo |
| 5,032,136 A | 7/1991 | Fitzgerald et al. |
| 5,134,925 A | 8/1992 | Bunn et al. |
| 5,207,148 A | 5/1993 | Anderson et al. |
| 5,223,699 A | 6/1993 | Flynn et al. |
| D337,019 S | 7/1993 | Newnan |
| 5,276,311 A | 1/1994 | Hennige |
| 5,349,897 A | 9/1994 | King et al. |
| D353,740 S | 12/1994 | Gilstrap |
| 5,372,832 A | 12/1994 | Bunn et al. |
| 5,392,694 A | 2/1995 | Muller et al. |
| 5,397,391 A | 3/1995 | Stramel |
| 5,406,882 A | 4/1995 | Shaanan |
| 5,408,917 A | 4/1995 | Lussi |
| 5,409,092 A | 4/1995 | Itako et al. |
| 5,440,108 A | 8/1995 | Tran et al. |
| 5,506,393 A | 4/1996 | Ziarno |
| 5,521,966 A | 5/1996 | Friedes et al. |
| 5,577,109 A | 11/1996 | Stimson et al. |
| 5,578,808 A | 11/1996 | Taylor |
| 5,584,229 A | 12/1996 | Anson |
| 5,638,739 A | 6/1997 | Shaanan et al. |
| 5,671,657 A | 9/1997 | Ford et al. |
| 5,684,291 A | 11/1997 | Taskett |
| 5,689,100 A | 11/1997 | Carrithers et al. |
| 5,696,908 A | 12/1997 | Muehlberger et al. |
| 5,704,046 A | 12/1997 | Hogan |
| 5,744,787 A | 4/1998 | Teicher |
| 5,788,840 A | 8/1998 | Lee et al. |
| 5,819,234 A | 10/1998 | Slavin et al. |
| 5,858,437 A | 1/1999 | Anson |
| 5,923,016 A | 7/1999 | Fredregill et al. |
| 5,937,391 A | 8/1999 | Ikeda et al. |
| 5,953,710 A | 9/1999 | Fleming |
| 5,956,695 A | 9/1999 | Carrithers et al. |
| 5,991,413 A | 11/1999 | Arditti et al. |
| 5,991,748 A | 11/1999 | Taskett |
| 5,992,298 A | 11/1999 | Illy et al. |
| 6,000,508 A | 12/1999 | Forster |
| 6,000,608 A | 12/1999 | Dorf |
| 6,032,859 A | 3/2000 | Muehlberger et al. |
| 6,044,362 A | 3/2000 | Neely |
| 6,105,009 A | 8/2000 | Cuervo |
| 6,138,911 A | 10/2000 | Fredregill et al. |
| 6,152,365 A | 11/2000 | Kolls |
| 6,167,387 A | 12/2000 | Lee-Wai-Yin |
| 6,167,389 A | 12/2000 | Davis et al. |
| 6,176,172 B1 | 1/2001 | Stettes et al. |
| 6,189,787 B1 | 2/2001 | Dorf |
| 6,193,155 B1 | 2/2001 | Walker et al. |
| 6,202,101 B1 | 3/2001 | Chin et al. |
| 6,244,162 B1 | 6/2001 | Dahmen |
| 6,282,566 B1 | 8/2001 | Lee, Jr. et al. |
| 6,330,978 B1 | 12/2001 | Molano et al. |
| 6,349,889 B1 | 2/2002 | Sandolo |
| 6,375,073 B1 | 4/2002 | Aebi et al. |
| D465,915 S | 11/2002 | Earnshaw |
| 6,502,745 B1 | 1/2003 | Stimson et al. |
| 6,615,189 B1 | 9/2003 | Phillips et al. |
| 6,626,085 B1 | 9/2003 | Lassota |
| 6,634,279 B2 | 10/2003 | D'Antonio et al. |
| 6,658,989 B2 | 12/2003 | Sweeney et al. |
| 6,705,208 B2 | 3/2004 | Lassota |
| 6,739,240 B2 | 5/2004 | De Koning et al. |
| 6,832,542 B2 | 12/2004 | Hu et al. |
| 6,835,915 B2 | 12/2004 | Timm |
| D502,043 S | 2/2005 | Lin |
| 6,915,732 B2 | 7/2005 | Jones et al. |
| 6,968,775 B2 | 11/2005 | Burrows et al. |
| 6,988,444 B1 | 1/2006 | Pfeifer et al. |
| 7,024,985 B2 | 4/2006 | Park |
| 7,240,611 B2 | 7/2007 | Burrows et al. |
| 7,279,660 B2 | 10/2007 | Long et al. |
| 7,350,455 B2 | 4/2008 | Vetterli |
| 7,398,725 B2 | 7/2008 | Rebordosa et al. |
| 7,430,521 B2 | 9/2008 | Walker et al. |
| 7,455,011 B2 | 11/2008 | Brouwer et al. |
| 7,571,674 B2 | 8/2009 | Wang |
| 7,581,489 B2 | 9/2009 | Van Hattem et al. |
| 7,669,519 B2 * | 3/2010 | Pope ............... A47J 31/4478 99/315 |
| 7,685,932 B2 | 3/2010 | Rahn et al. |
| 7,814,824 B2 | 10/2010 | Beretta |
| 7,849,784 B2 | 12/2010 | Adler |
| 7,922,382 B2 | 4/2011 | Thakur et al. |
| 8,176,839 B2 | 5/2012 | Morgandi |
| 8,247,010 B2 | 8/2012 | Nguyen et al. |
| D667,251 S | 9/2012 | Cahen |
| D675,677 S | 2/2013 | Barili |
| 8,371,211 B2 | 2/2013 | Nosler et al. |
| 8,434,401 B2 | 5/2013 | Skalski et al. |
| 8,586,116 B2 | 11/2013 | Wroblewski et al. |
| 8,616,116 B2 | 12/2013 | McLaughlin |
| 8,623,441 B2 | 1/2014 | McLaughlin et al. |
| 8,627,760 B2 | 1/2014 | Kollep et al. |
| 8,770,094 B2 | 7/2014 | Rithener et al. |
| D738,667 S | 9/2015 | Bristol et al. |
| 9,218,633 B2 | 12/2015 | Hulett et al. |
| 9,930,987 B2 | 4/2018 | Hulett et al. |
| 2001/0047342 A1 | 11/2001 | Cuervo |
| 2002/0130137 A1 | 9/2002 | Greenwald et al. |
| 2002/0174016 A1 | 11/2002 | Cuervo |
| 2003/0049356 A1 | 3/2003 | Nielsen et al. |
| 2003/0126993 A1 | 7/2003 | Lassota et al. |
| 2003/0167928 A1 | 9/2003 | Mulle et al. |
| 2003/0209150 A1 * | 11/2003 | Guindulain Vidondo ........... A47J 31/3614 99/289 R |
| 2004/0194631 A1 * | 10/2004 | Pope ............... A47J 31/56 99/279 |
| 2004/0236696 A1 | 11/2004 | Aoki et al. |
| 2005/0103202 A1 | 5/2005 | Rahn et al. |
| 2005/0120885 A1 | 6/2005 | Wang |

(56) References Cited

U.S. PATENT DOCUMENTS

| | | |
|---|---|---|
| 2005/0121978 A1 | 6/2005 | McAvoy |
| 2007/0012196 A1 | 1/2007 | Sato |
| 2007/0068393 A1 | 3/2007 | Nosler et al. |
| 2007/0137495 A1 | 6/2007 | Talbert |
| 2007/0144355 A1* | 6/2007 | Denisart ............ B65D 85/8043 99/275 |
| 2007/0169640 A1 | 7/2007 | Sato et al. |
| 2007/0185776 A1 | 8/2007 | Nguyen et al. |
| 2007/0261563 A1 | 11/2007 | Morin et al. |
| 2007/0261566 A1 | 11/2007 | Varney et al. |
| 2008/0028944 A1 | 2/2008 | Webster et al. |
| 2008/0029595 A1 | 2/2008 | Waller |
| 2008/0038423 A1 | 2/2008 | Klant et al. |
| 2008/0041233 A1 | 2/2008 | Bunn |
| 2008/0168905 A1 | 7/2008 | Hart |
| 2008/0173182 A1 | 7/2008 | Boerner et al. |
| 2008/0277512 A1 | 11/2008 | Vuijk |
| 2009/0031900 A1 | 2/2009 | Barraclough et al. |
| 2009/0095165 A1 | 4/2009 | Nosler et al. |
| 2009/0158937 A1 | 6/2009 | Stearns et al. |
| 2009/0173236 A1 | 7/2009 | Wang |
| 2009/0204504 A1 | 8/2009 | De Araujo |
| 2010/0024657 A9 | 2/2010 | Nosler et al. |
| 2010/0052421 A1 | 3/2010 | Schindler et al. |
| 2010/0065587 A1 | 3/2010 | Erman et al. |
| 2010/0086289 A1 | 4/2010 | Johnson et al. |
| 2010/0095852 A1* | 4/2010 | Remo .................. A47J 31/3614 99/280 |
| 2010/0107885 A1 | 5/2010 | Kirschner et al. |
| 2010/0263543 A1 | 10/2010 | Krauchi et al. |
| 2010/0280960 A1 | 11/2010 | Ziotopoulos |
| 2011/0086148 A1 | 4/2011 | Ford |
| 2011/0107919 A1 | 5/2011 | Webster |
| 2011/0154993 A1 | 6/2011 | Bertolina |
| 2011/0167440 A1 | 7/2011 | Greenfield |
| 2011/0185908 A1 | 8/2011 | Berto |
| 2011/0212231 A1 | 9/2011 | McLaughlin |
| 2011/0212236 A1 | 9/2011 | Nguyen et al. |
| 2011/0256273 A1 | 10/2011 | de Graaff et al. |
| 2011/0258072 A1 | 10/2011 | Kerker et al. |
| 2012/0095805 A1 | 4/2012 | Ghosh |
| 2012/0310757 A1 | 12/2012 | Kim et al. |
| 2013/0019754 A1 | 1/2013 | Tien et al. |
| 2013/0019755 A1 | 1/2013 | Tien et al. |
| 2013/0108755 A1 | 5/2013 | Carbonini et al. |
| 2013/0131883 A1 | 5/2013 | Yamada |
| 2013/0133520 A1 | 5/2013 | Hulett et al. |
| 2013/0220137 A1 | 8/2013 | Bombeck et al. |
| 2013/0247771 A1 | 9/2013 | Maisch |
| 2013/0275181 A1 | 10/2013 | DiGioacchino et al. |
| 2013/0297089 A1 | 11/2013 | Fu et al. |

FOREIGN PATENT DOCUMENTS

| | | |
|---|---|---|
| CN | 101641039 A | 2/2010 |
| DE | 29810370 | 11/1998 |
| DE | 102009045705 | 4/2011 |
| DE | 202011005003 U1 | 8/2011 |
| EP | 0280345 | 8/1988 |
| EP | 0476173 | 3/1992 |
| EP | 0801921 | 10/1997 |
| EP | 0848925 | 6/1998 |
| EP | 1510159 A1 | 3/2005 |
| EP | 1940268 | 7/2008 |
| EP | 2168468 | 3/2010 |
| EP | 2782484 | 10/2014 |
| GB | 910555 | 11/1962 |
| GB | 2345252 | 7/2000 |
| JP | 1988-030997-000000 | 2/1988 |
| JP | 2006-155255 | 6/2006 |
| JP | 2007-503233 | 2/2007 |
| JP | 2009-525056 | 7/2009 |
| JP | 5358742 | 12/2013 |
| JP | 5534268 | 6/2014 |
| KR | 10-2008-0068664 A | 7/2008 |
| TW | M318395 | 9/2007 |
| TW | 200926034 | 6/2009 |
| TW | I343025 | 6/2011 |
| WO | WO 94/01028 | 1/1994 |
| WO | WO 94/07401 | 4/1994 |
| WO | WO 94/24643 | 10/1994 |
| WO | WO 95/26669 | 10/1995 |
| WO | WO 97/24052 | 7/1997 |
| WO | WO 98/11809 | 3/1998 |
| WO | WO 99/03057 | 1/1999 |
| WO | WO 99/012455 | 3/1999 |
| WO | WO 99/60900 | 12/1999 |
| WO | WO 00/045685 | 8/2000 |
| WO | WO 00/65969 | 11/2000 |
| WO | WO 01/21049 | 3/2001 |
| WO | WO 01/54550 | 8/2001 |
| WO | WO 01/63522 | 8/2001 |
| WO | WO 01/74212 | 10/2001 |
| WO | WO 02/09563 | 2/2002 |
| WO | WO 02/074145 | 9/2002 |
| WO | WO 02/091903 | 11/2002 |
| WO | WO 03/084377 | 10/2003 |
| WO | WO 03/092456 | 11/2003 |
| WO | WO 03/093561 | 11/2003 |
| WO | WO 2004/006739 | 1/2004 |
| WO | WO 2004/093619 | 11/2004 |
| WO | WO 2004/103129 | 12/2004 |
| WO | WO 2005/048791 | 6/2005 |
| WO | WO 2005/072578 | 8/2005 |
| WO | WO 2005/077231 | 8/2005 |
| WO | WO 2005/077232 | 8/2005 |
| WO | WO 2005/117669 | 12/2005 |
| WO | WO 2006/015689 A1 | 2/2006 |
| WO | WO 2006090183 A2 | 8/2006 |
| WO | WO 2006/124180 | 11/2006 |
| WO | WO 2006/133699 | 12/2006 |
| WO | WO 2007/023265 | 3/2007 |
| WO | WO 2007/027206 | 3/2007 |
| WO | WO 2007/035877 | 3/2007 |
| WO | WO 2007/070874 | 6/2007 |
| WO | WO 2007/133972 | 11/2007 |
| WO | WO 2007/141334 | 12/2007 |
| WO | WO 2008/006682 | 1/2008 |
| WO | WO 2008/049222 | 5/2008 |
| WO | WO 2009/074550 | 6/2009 |
| WO | WO 2009/074555 | 6/2009 |
| WO | WO 2009/000039 | 7/2009 |
| WO | WO 2009/120708 | 10/2009 |
| WO | WO 2009/128110 | 10/2009 |
| WO | WO 2010/034722 A1 | 4/2010 |
| WO | WO 2011/006198 | 1/2011 |
| WO | WO 2011/095502 | 8/2011 |
| WO | WO 2011/130439 | 10/2011 |
| WO | WO 2011/151490 | 12/2011 |
| WO | WO 2011/158131 | 12/2011 |
| WO | WO 2012/036635 | 3/2012 |
| WO | WO 2012/072767 | 6/2012 |
| WO | WO 2012/119923 | 9/2012 |
| WO | WO 2012/130662 | 10/2012 |
| WO | WO 2013/011078 | 1/2013 |
| WO | WO 2013/034563 | 3/2013 |
| WO | WO 2013/078428 | 5/2013 |
| WO | WO 2013/078437 | 5/2013 |
| WO | WO 2013/119538 | 8/2013 |
| WO | WO 2015/077367 | 5/2015 |
| WO | WO 2015/077237 | 9/2015 |

OTHER PUBLICATIONS

Office Action for U.S. Appl. No. 13/684,117 dated Aug. 14, 2015, in 20 pages.
Office Action for U.S. Appl. No. 13/684,117 dated Mar. 13, 2018, in 15 pages.
Office Action for Canadian Appl. No. 2856422 dated Aug. 1, 2018, in 4 pages.
Office Action for European Appl. No. 12 798 995.2 dated Jul. 7, 2015, in 6 pages.

(56) References Cited

OTHER PUBLICATIONS

Extended European Search Report Appl. No. 16205404.3 dated Apr. 19, 2017, in 14 pages.
International Search Report and Written Opinion for Application No. PCT/US2012/066428, dated Apr. 26, 2013, in 26 pages.
Office Action for Taiwan Appl. No. 10420523210 dated Apr. 23, 2015, in 7 pages.
Office Action for Chinese Appl. No. 201280067591.3 dated Nov. 11, 2015, in 8 pages.
Office Action for Chinese Appl. No. 201280067591.3 dated Jun. 29, 2016, in 19 pages.
Office Action for Chinese Appl. No. 201280067591.3 dated Mar. 23, 2017 in 8 pages.
Office Action for Chinese Appl. No. 201280067591.3 dated Jan. 2, 2018 in 8 pages.
Office Action for Japanese Appl. No. 2014-543590 dated Aug. 29, 2016, in 9 pages.
Office Action for Japanese Appl. No. 2014-543590 dated May 22, 2017, in 5 pages.
Office Action in Japanese Appl. No. 2018-230 dated Jan. 7, 2019, in 17 pages.
Office Action for Mexican Appl. No. MX/a/2014/006297 dated Aug. 16, 2016, in 3 pages.
Examination Report in Australian Application No. 2012340526 dated Feb. 16, 2017, in 4 pages.
Examination Report in Australian Application No. 2017272230 dated Oct. 20, 2018, in 3 pages.
Office Action in Korean Application No. 10-2014-7016751 dated Oct. 15, 2018 in 8 pages.
Office Action in Indian Application No. 1324/KOLNP/2014 dated Apr. 16, 2019 in 8 pages.
Office Action for U.S. Appl. No. 13/684,062 dated Dec. 20, 2013, in 9 pages.
Office Action for U.S. Appl. No. 13/684,062 dated Aug. 19, 2014, in 8 pages.
Final Office Action for U.S. Appl. No. 13/684,062 dated Jan. 13, 2015 in 8 pages.
Office Action for U.S. Appl. No. 13/684,062 dated May 19, 2015, in 9 pages.
International Search Report and Written Opinion for Application No. PCT/US2012/66417 dated May 31, 2013, in 14 pages.
Office Action in U.S. Appl. No. 14/548,174 dated Sep. 9, 2016, in 21 pages.
Office Action in U.S. Appl. No. 14/548,174 dated Feb. 17, 2017, in 16 pages.
Office Action in U.S. Appl. No. 14/548,174 dated Aug. 17, 2017, in 11 pages.
Office Action for U.S. Appl. No. 29/473,291 dated Jan. 21, 2015, in 10 pages.
Office Action for U.S. Appl. No. 29/473,289 dated Jan. 23, 2015, in 10 pages.
International Search Report and Written Opinion for Application No. PCT/US2014/066455 dated Apr. 17, 2015, in 13 pages.
International Preliminary Report on Patentability for Application No. PCT/US2014/066455 dated May 24, 2016, in 8 pages.
Office Action for Taiwan Appl. No. 103140111 dated Feb. 7, 2018.
Office Action in Korean Application No. 10-2019-7016814 dated Sep. 3, 2019 in 6 pages.
Notice of Allowance for Japanese Appl. No. 2018-000230 dated Sep. 30, 3019 in 3 pages.
Preliminary Office Action for Brazilian Patent Appl. No. BR 11 2014 012421 3 dated Oct. 4, 2019 in 4 pages.
Office Action in Chinese Application No. 201810741584.6 dated Feb. 14, 2020 in 8 pages.

\* cited by examiner

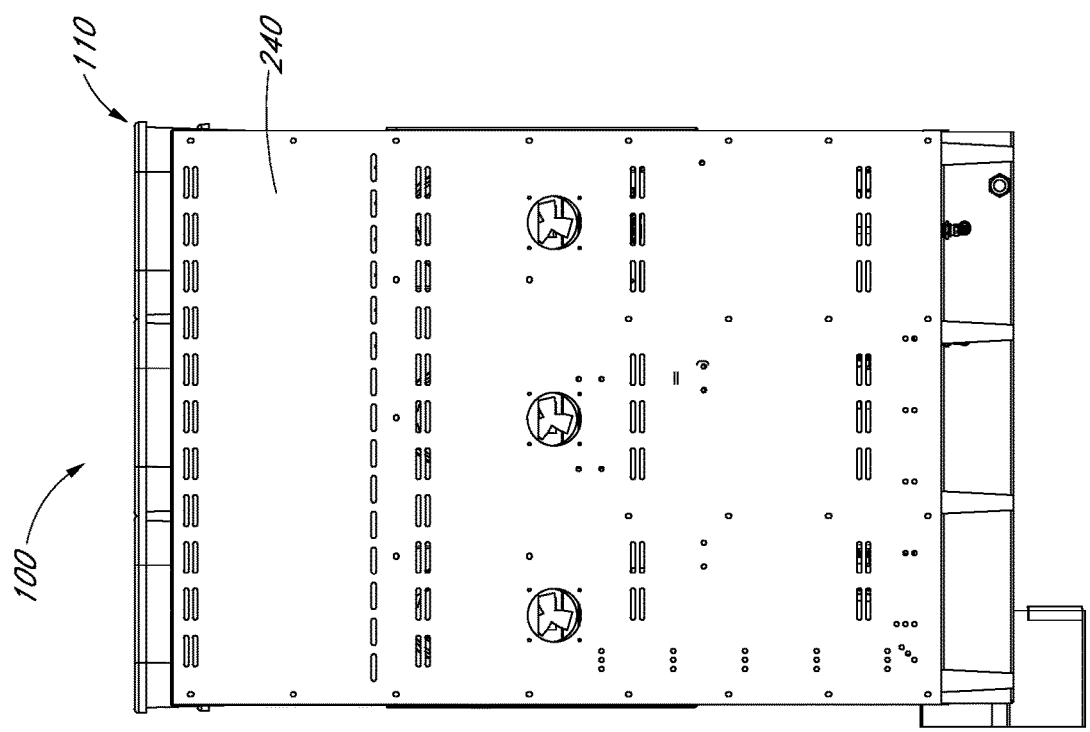
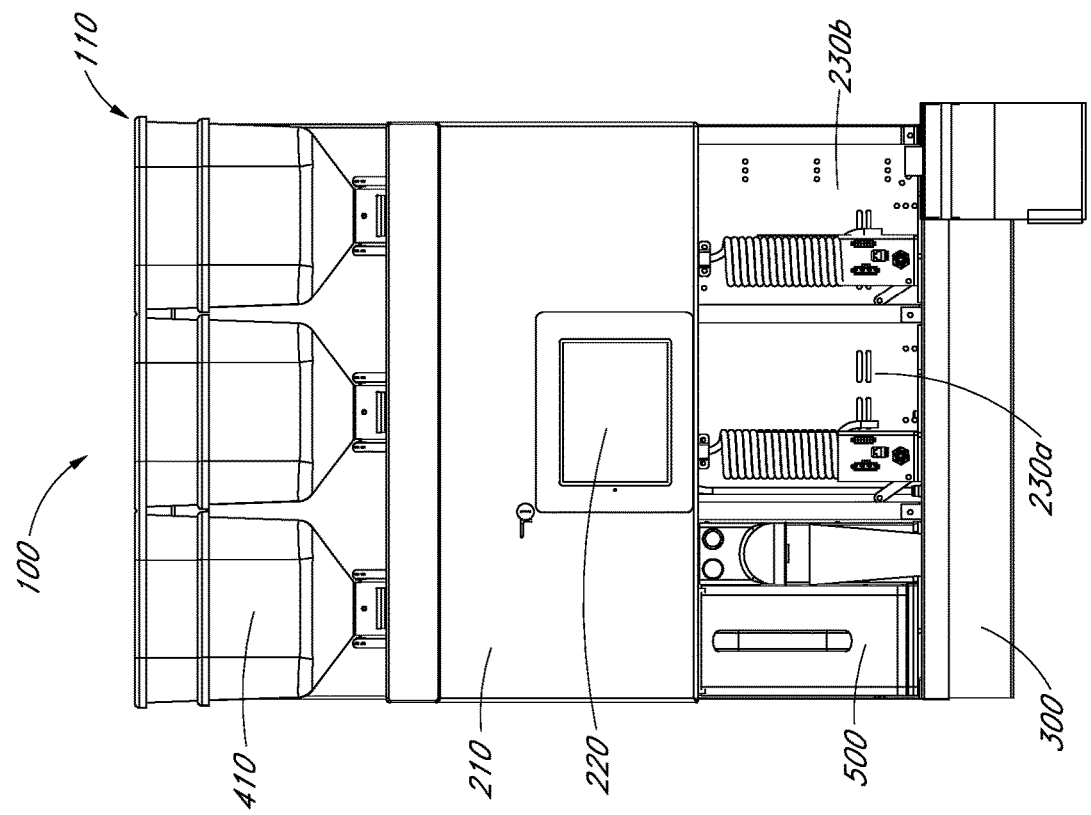
FIG. 4
FIG. 3

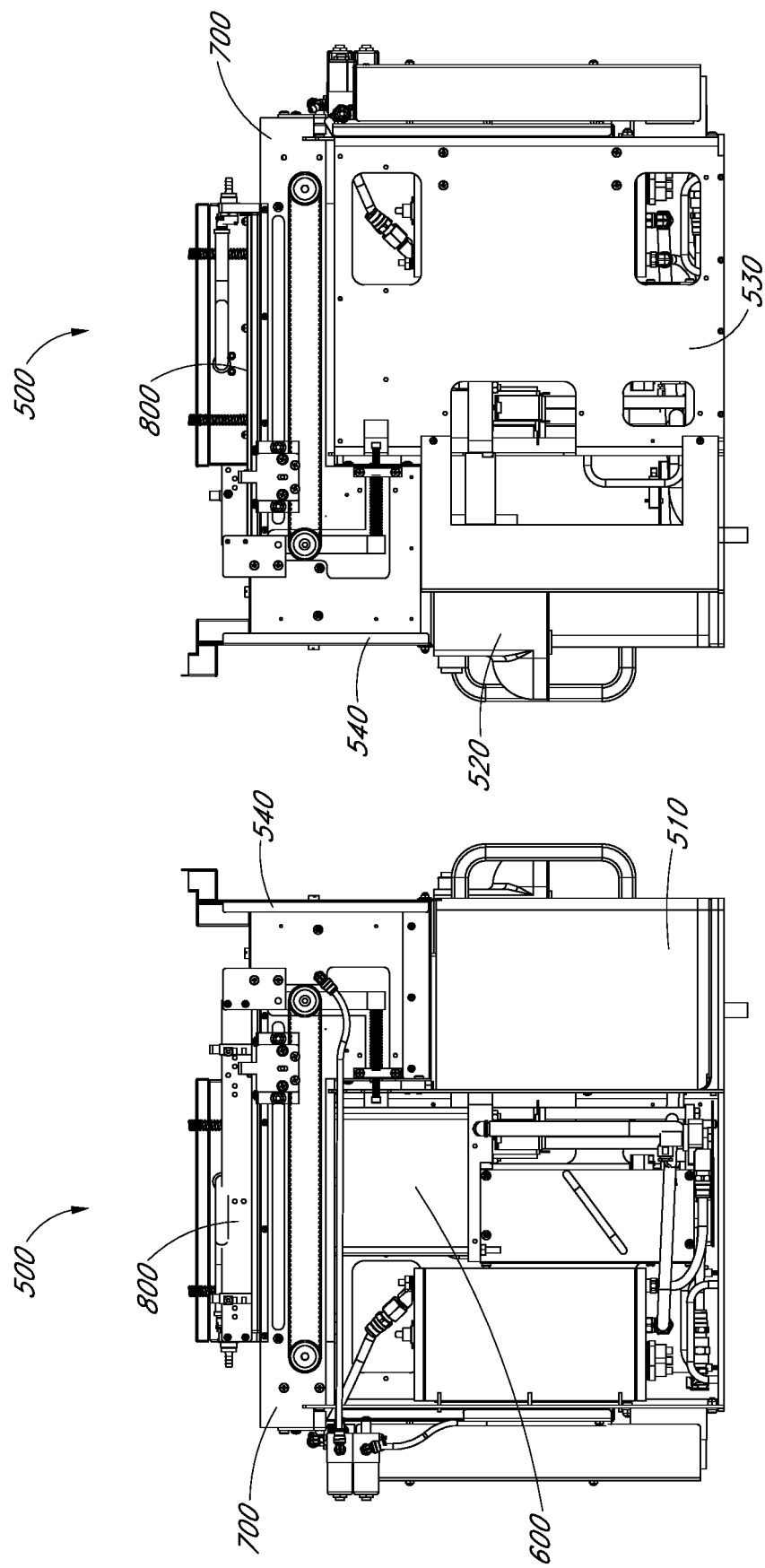

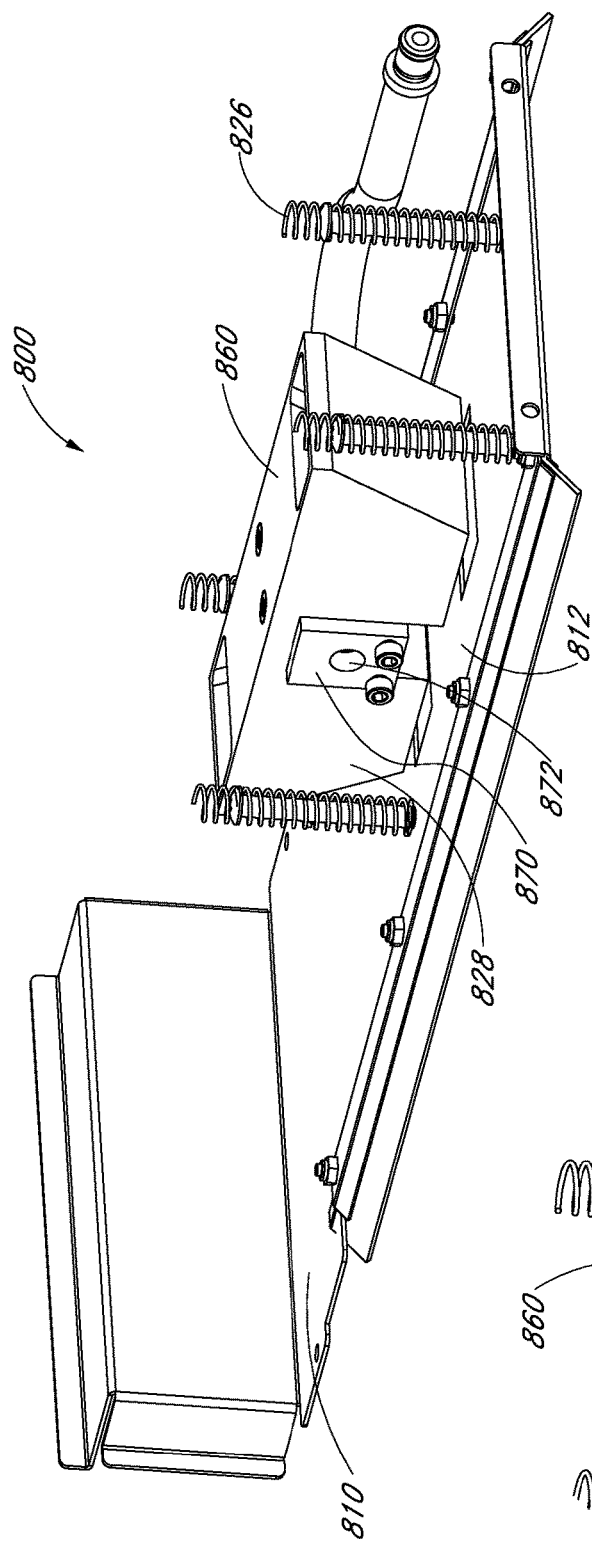
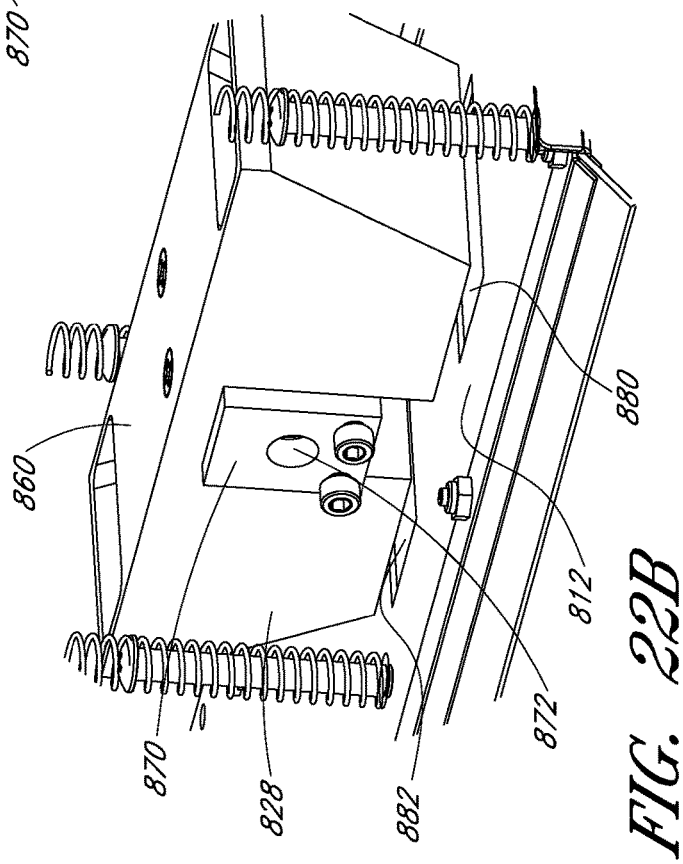
FIG. 22A
FIG. 22B

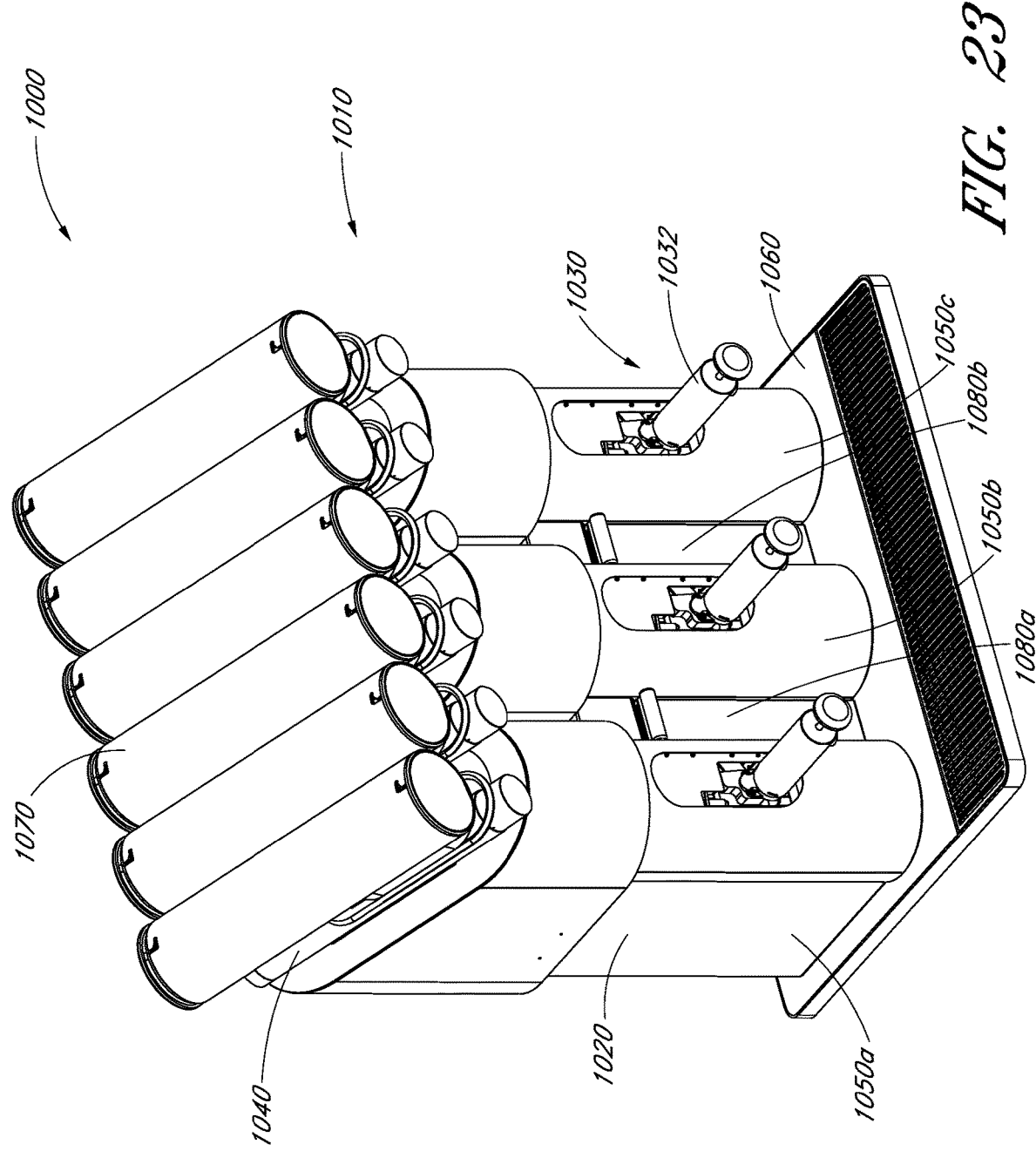

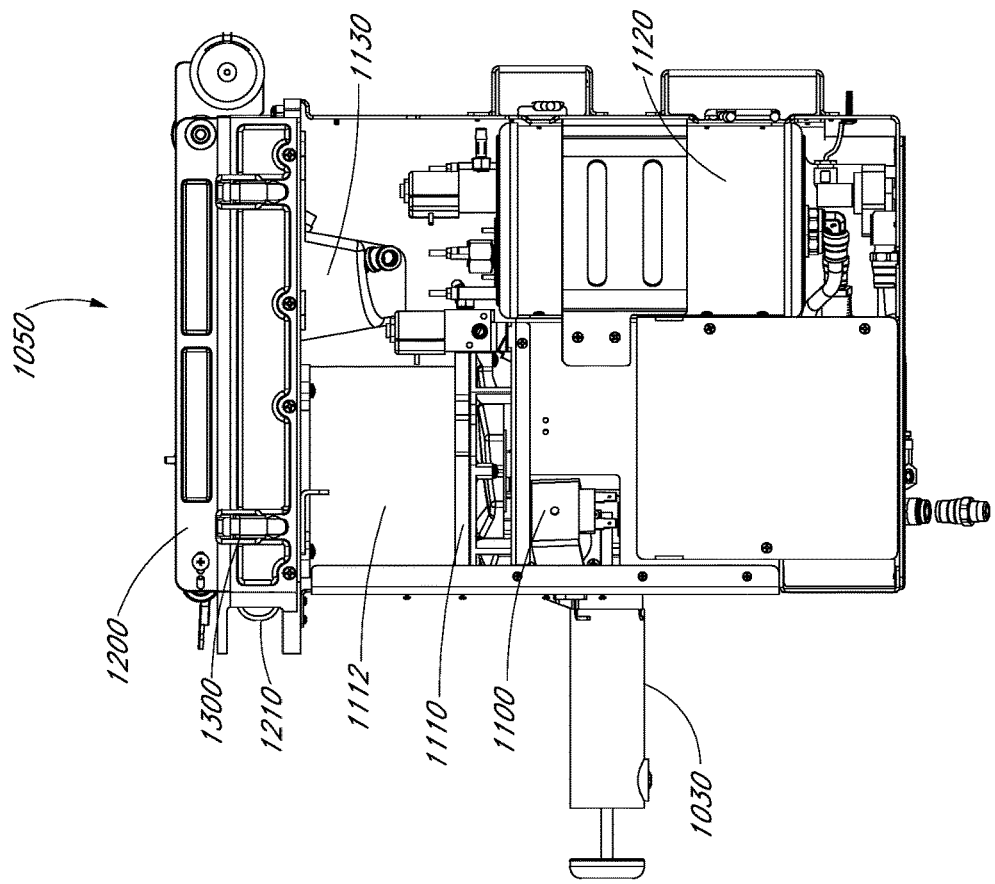
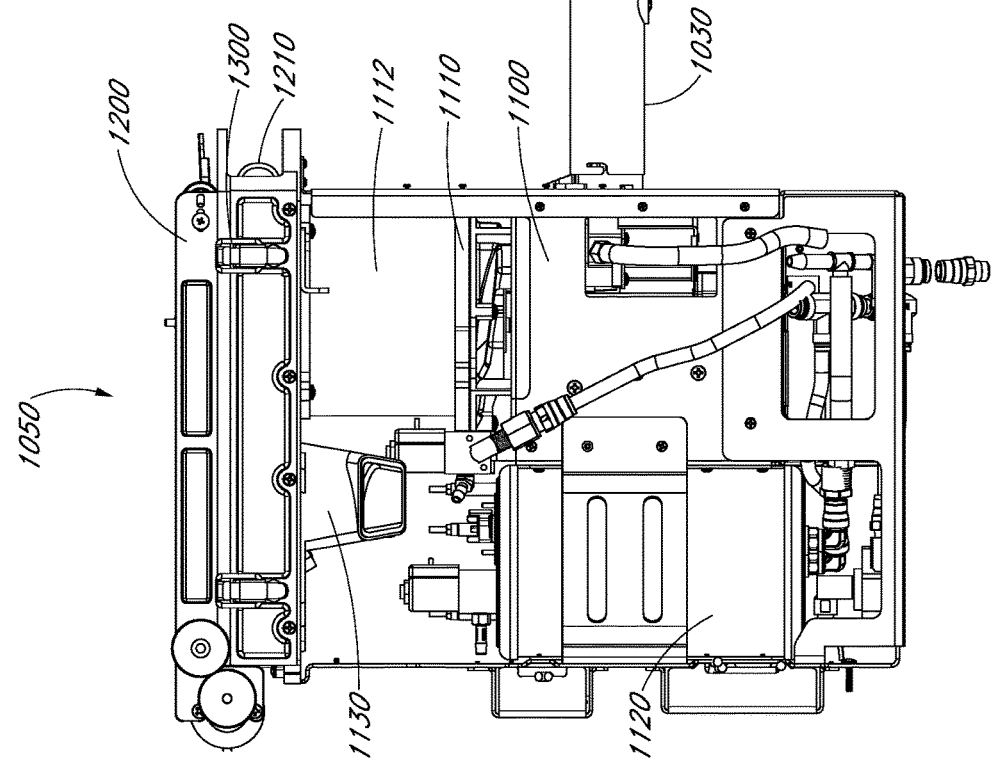

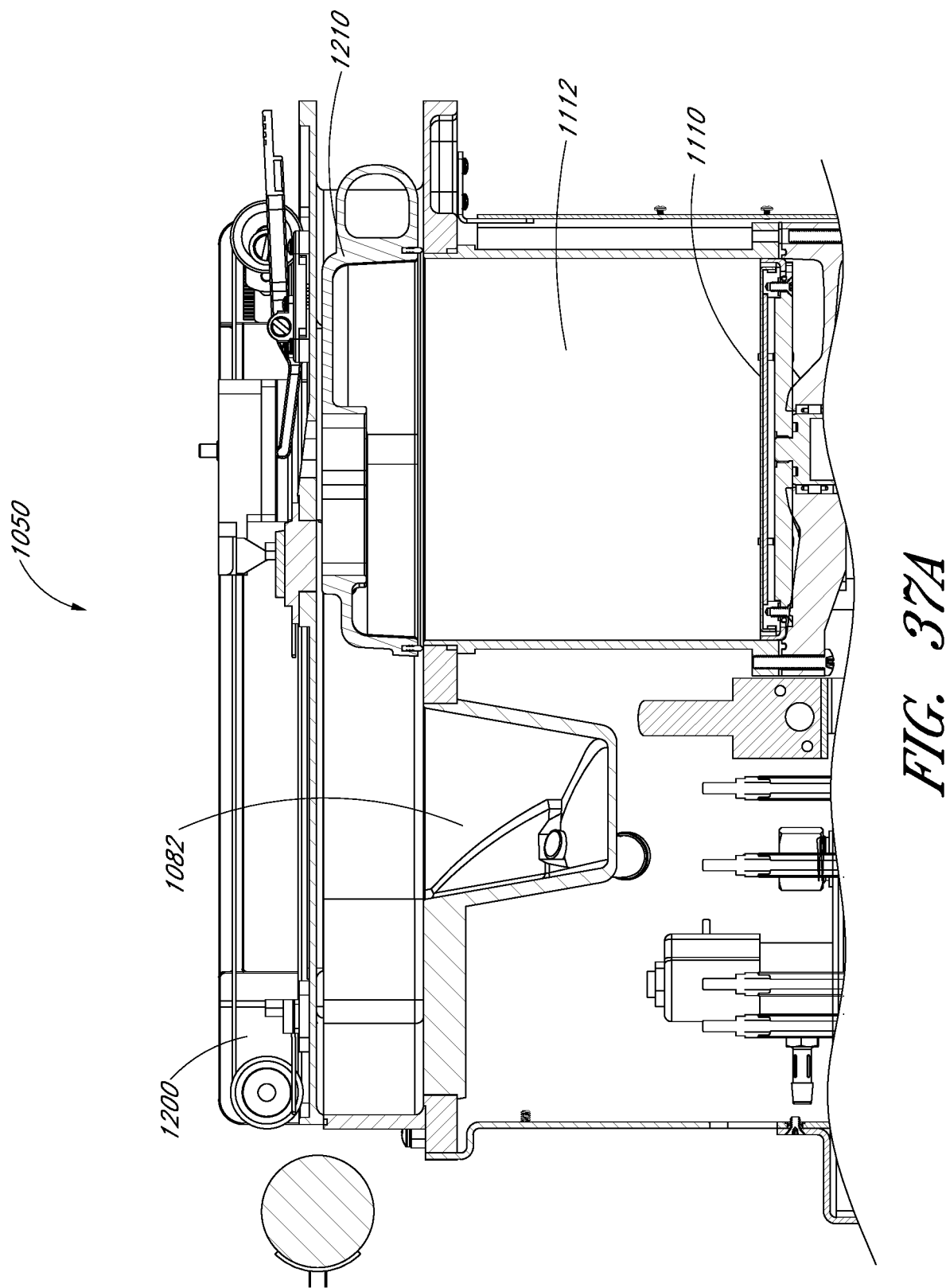

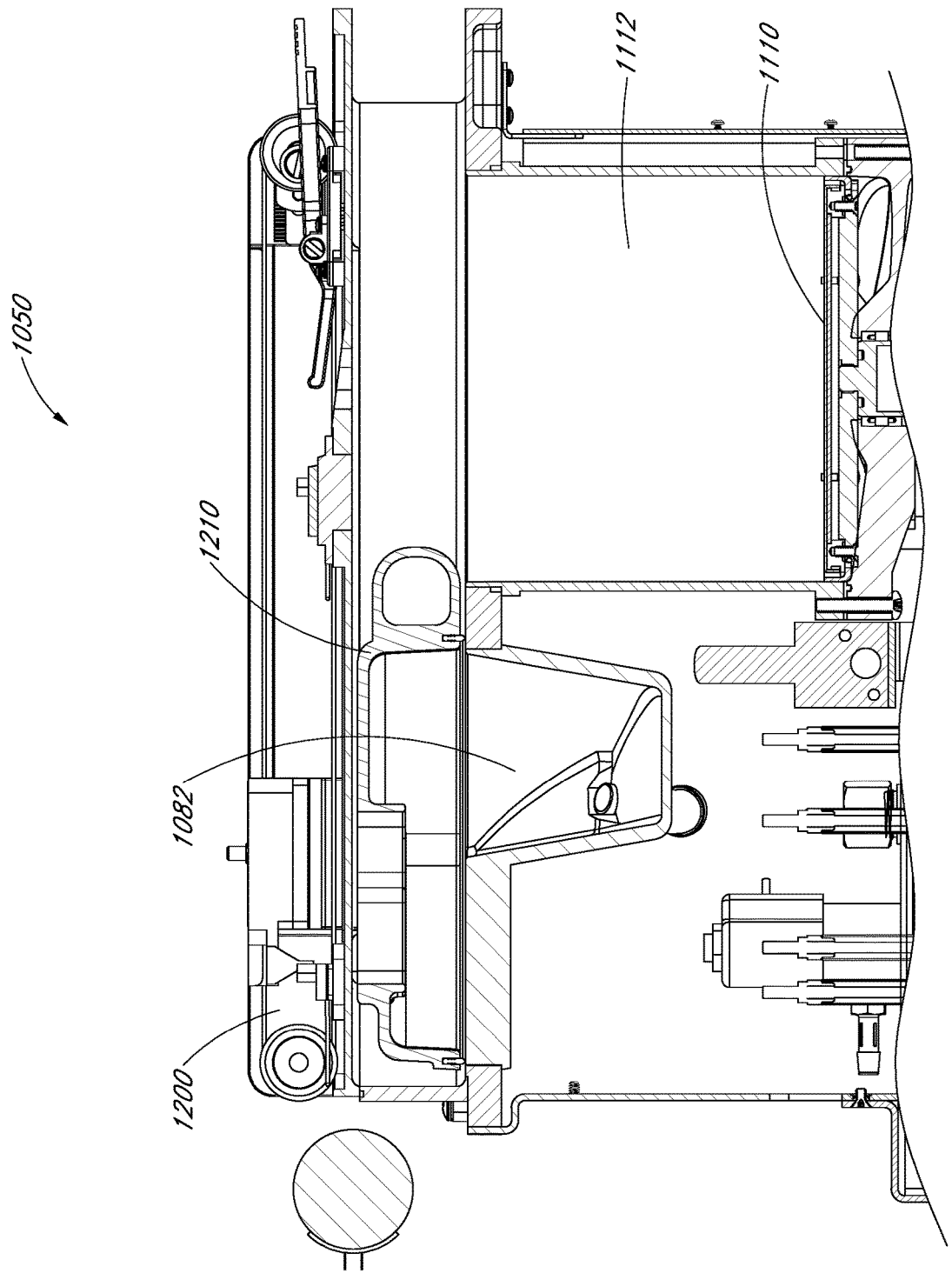

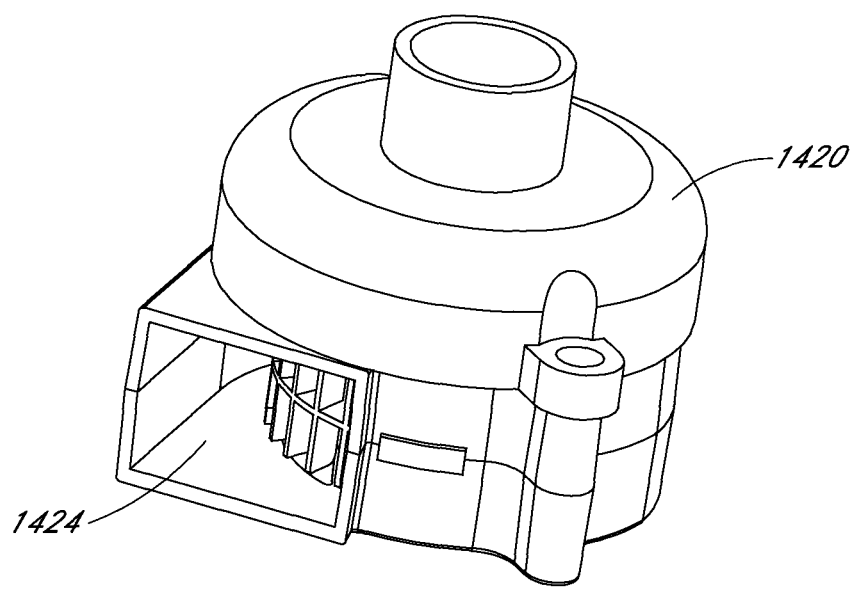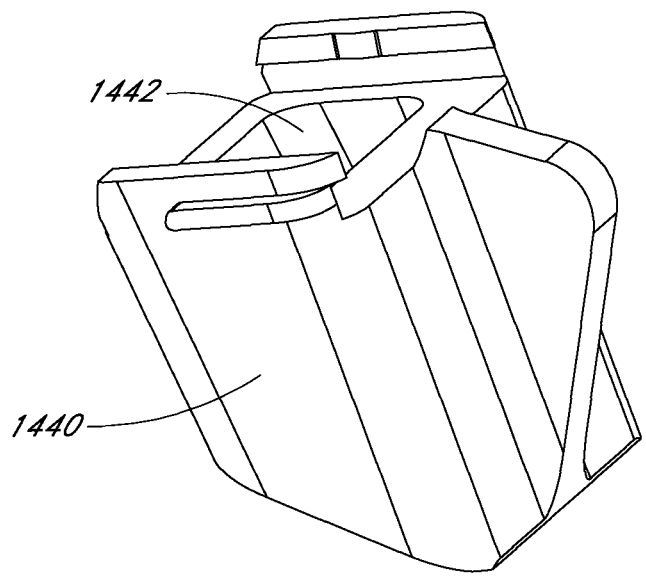
FIG. 49

APPARATUS, SYSTEMS, AND METHODS FOR BREWING A BEVERAGE

CROSS-REFERENCE TO RELATED APPLICATIONS

This application claims the benefit of, and priority to, U.S. Provisional Application No. 61/563,185, filed on Nov. 23, 2011 and U.S. patent application Ser. No. 13/684,117, filed on Nov. 21, 2012, both entitled "Apparatus, Systems, and Methods for Brewing a Beverage," each of which is incorporated herein by reference in its entirety.

FIELD

The present disclosure generally relates to apparatus, systems, and methods for brewing a beverage, such as coffee, and includes the disclosure of automated single-cup coffee brewing systems having one or more brew groups or modules.

BACKGROUND

Many methods and systems for brewing beverages, such as coffee, are known. In conventional coffee brewing systems, a brewing machine typically brews a relatively large batch of coffee. In commercial settings, a barista may pour cup-sized portions of coffee from the batch when a customer places an order. Such beverage brewing systems are inefficient because coffee may be wasted when not all of the coffee in the batch is ordered or consumed. In addition, such systems may produce coffee having an inconsistent flavor and taste because the coffee is not necessarily brewed when a customer places an order and may not be fresh when consumed.

Automated single-cup coffee brewing systems may be employed to address some of the disadvantages of conventional batch-type coffee brewing systems. Users of automated single-cup coffee brewing systems would benefit from several improvements to those systems, including, but not limited to, reducing the time it takes to brew a single-cup portion or traveler portion of coffee, reducing the labor and time involved in cleaning brewing equipment between brew cycles, reducing steam and condensation from entering the grinder and hopper areas of the system to improve the quality of the coffee and to reduce corrosion on grinder components, improving the accuracy and repeatability of providing a desired dose of coffee beans to a grinder portion of the system, improving agitation of coffee grounds during a brew cycle, and reducing the labor and time involved in maintaining the hoppers and refilling the hoppers with coffee beans.

SUMMARY

In one embodiment, a system for brewing a single-cup portion of coffee is provided. The system comprises a first brew module, a second brew module, and a third brew module. The first brew module, the second brew module, and the third brew module are each configured to brew a single-cup portion of coffee in about 30 seconds or less. In such an embodiment, the first brew module comprises a first doser assembly, a first upper subassembly, a first interior subassembly, and a first dispensing portion. The first doser assembly is engaged with the first upper subassembly and is configured to receive one or more hoppers. The first upper subassembly comprises a first wiper assembly for automatically cleaning the upper subassembly after a brew cycle. The first interior subassembly comprises a first piston configured to raise and lower coffee grounds during a brew cycle. The first dispensing portion is engaged with the first interior subassembly and is configured to provide brewed coffee to a drinking receptacle after a brew cycle.

In such an embodiment, the second brew module comprises a second doser assembly, a second upper subassembly, a second interior subassembly, and a second dispensing portion. The second doser assembly is engaged with the second upper subassembly and is configured to receive one or more hoppers. The second upper subassembly comprises a second wiper assembly for automatically cleaning the second upper subassembly after a brew cycle. The second interior subassembly comprises a second piston configured to raise and lower coffee grounds during a brew cycle. The second dispensing portion is engaged with the second interior subassembly and is configured to provide brewed coffee to a drinking receptacle after a brew cycle.

In such an embodiment, the third brew module comprises a third doser assembly, a third upper subassembly, a third interior subassembly, and a third dispensing portion. The third doser assembly is engaged with the third upper subassembly and is configured to receive one or more hoppers. The third upper subassembly comprises a third wiper assembly for automatically cleaning the third upper subassembly after a brew cycle. The third interior subassembly comprises a third piston configured to raise and lower coffee grounds during a brew cycle. The third dispensing portion is engaged with the third interior subassembly and is configured to provide brewed coffee to a drinking receptacle after a brew cycle.

In another embodiment, a system for brewing a beverage is provided wherein the system comprises at least one brew module. The at least one brew module comprises a doser assembly, an upper subassembly, and an interior subassembly. The doser assembly is engaged with the upper subassembly and is configured to receive one or more hoppers. The upper subassembly is engaged with the interior subassembly such that the upper subassembly and the interior subassembly interact with each other during a brew cycle. The at least one brew module is configured to automatically brew a single-cup portion of a beverage.

In another embodiment, an apparatus for brewing a beverage is provided. The apparatus comprises at least one brew module configured to brew a single-cup portion of a beverage. The at least one brew module comprises an upper subassembly configured to automatically clean interior components of the at least one brew module after a brew cycle. The upper subassembly comprises a plow and a spray feature, wherein the plow is configured to translate across a surface of the upper subassembly such that the plow is configured to remove debris from the upper subassembly and the spray feature is configured to rinse components of the upper subassembly to automatically clean the at least one brew module after a brew cycle.

In another embodiment, an apparatus for brewing a beverage is provided. The apparatus comprises a dispensing portion configured to dispense a brewed beverage. The dispensing portion comprises a control member, wherein the control member is configured to be disposed in a first position during a brew cycle and a second position after a brew cycle is substantially complete. The control member is in communication with a plunger mechanism to move the control member from the first position to the second position.

In another embodiment, an apparatus for receiving material and providing a controlled dose of material to a grinder mechanism is provided. The apparatus comprises a doser that is configured to provide a controlled dose of material to a grinder mechanism based on volume of the material. The doser comprises a body defining a first opening configured to receive material from a hopper and a second opening configured to provide material to the grinder mechanism. A first piston and a second piston define an interior volume of the doser that is generally disposed between the first piston and the second piston. The first piston is configured to move relative to the second piston to increase or decrease the interior volume of the doser. The first piston and the second piston are configured to move substantially in tandem relative to the body of the doser to move the interior volume generally from the first opening to the second opening to provide the material to the grinder mechanism.

In another embodiment, an apparatus for brewing a beverage is provided. The apparatus comprises a grinder mechanism configured to grind a material. The grinder mechanism is in communication with an exit port at a distal end of the grinder. The exit port is configured transfer ground material from the grinder mechanism to a brewing area of the apparatus. A fan is in communication with the exit port and configured to provide airflow through the exit port toward the brewing area. The fan is configured to provide substantially continuous airflow through the exit port of the grinder mechanism during normal operation to substantially prevent steam and moisture generated by the apparatus during a brew cycle from entering the grinder mechanism.

In another embodiment, an apparatus for brewing a beverage is provided. The apparatus comprises at least one brew module configured to brew a single-cup portion of a beverage. The at least one brew module comprises an upper subassembly and a chamber configured to receive ground material and configured to engage with a nozzle. The nozzle is inclined with respect to a horizontal plane of the apparatus such that a face of the nozzle defines an angle between about 5° and 60° with respect to a horizontal plane of the apparatus. The nozzle is configured to direct water to an inner portion of the chamber during a brew cycle to agitate ground material during the brew cycle.

For purposes of the present disclosure and summarizing distinctions from the prior art, certain aspects of the apparatus, systems, and methods have been described above and will be described further below. Of course, it is to be understood that not necessarily all such aspects may be present in any particular embodiment. Thus, for example, those skilled in the art will recognize that the apparatus, systems, and methods may be embodied or carried out in a manner that achieves or optimizes one aspect or group of aspects as taught herein without necessarily achieving other aspects as may be taught or suggested herein. All of these embodiments are intended to be within the scope of the present disclosure herein disclosed.

BRIEF DESCRIPTION OF THE DRAWINGS

These and other features, aspects, and advantages of the disclosed apparatus, systems, and methods will now be described in connection with embodiments shown in the accompanying drawings. The illustrated embodiments are merely examples and are not intended to limit the apparatus, systems, and methods. The drawings include the following figures, which can be briefly described as follows:

FIG. 3 is a front side view of the system shown in FIG. 2.

FIG. 4 is a rear side view of the system shown in FIG. 2.

FIG. 11 is a left side view of the brew module of FIG. 9.

FIG. 12 is a right side view of the brew module of FIG. 9.

FIG. 22A is a front perspective view of the upper subassembly shown in FIG. 20 with certain components removed to illustrate the structure of an embodiment of a baffle device of the upper subassembly.

FIG. 22B is an enlarged view of a portion of the upper subassembly of FIG. 22A.

FIG. 23 is a front perspective view of another embodiment of a system for brewing a beverage where three brew modules are installed in a beverage brewing machine.

FIG. 32 is a left side view of the brew module of FIG. 30.

FIG. 33 is a right side view of the brew module of FIG. 30.

FIG. 37A is a cross-sectional view of the brew module of FIG. 36A.

FIG. 37B is a cross-sectional view of the brew module of FIG. 36B.

FIG. 49 shows a perspective view of the fan system of FIG. 46 where a grinder and an exit port have been removed.

DETAILED DESCRIPTION

Figure 1:
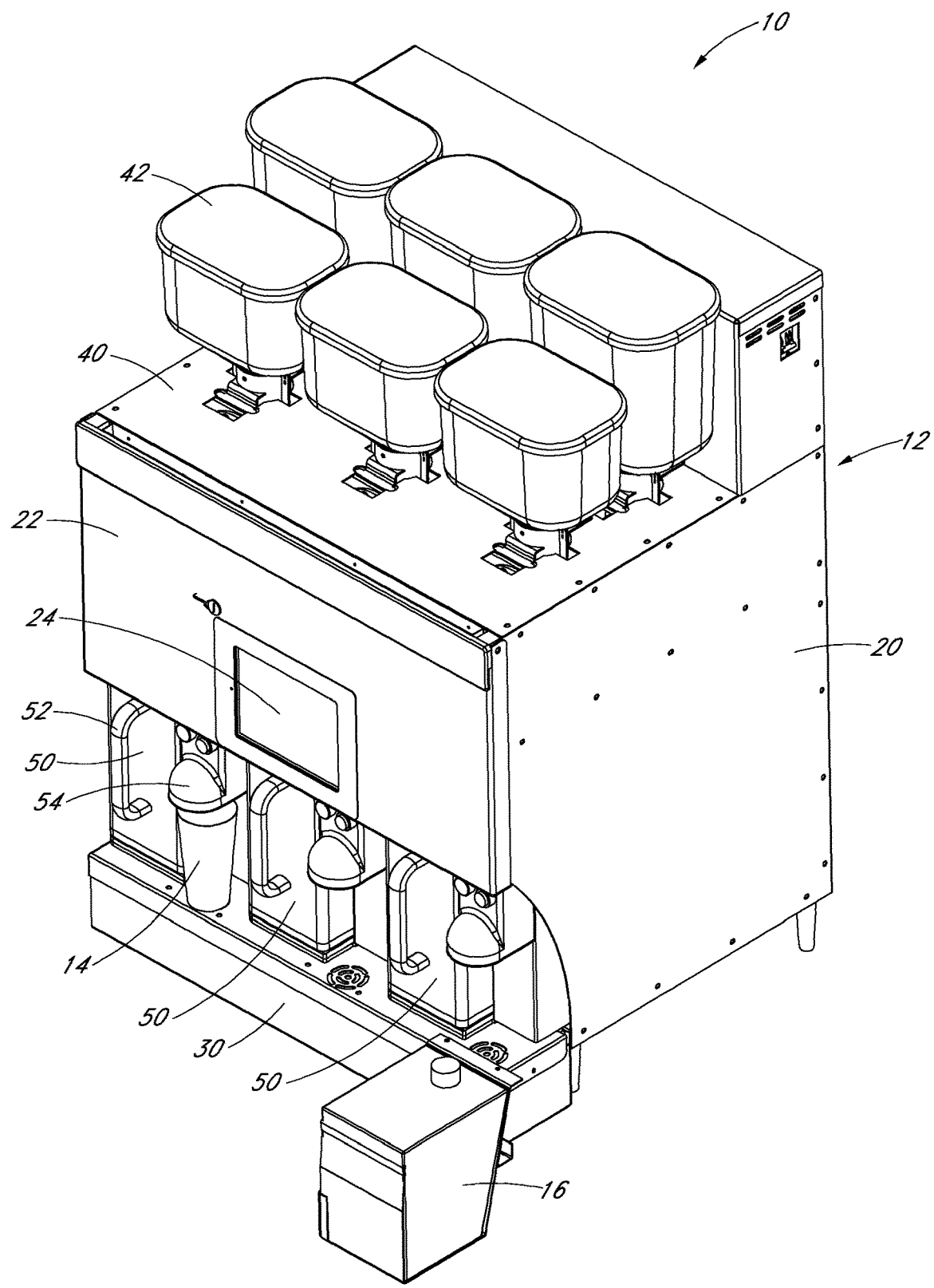
FIG. 1 is a front perspective view of an embodiment of a system for brewing a beverage where three brew modules are installed in a beverage brewing machine.
Figure 14:
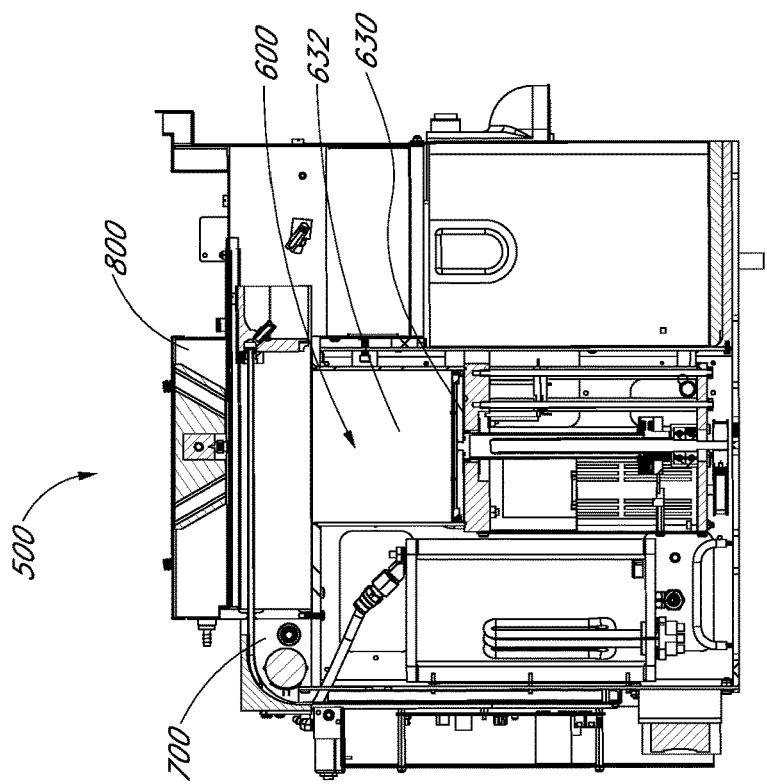
FIG. 14 is a cross-sectional view of the brew module of FIG. 9 taken along the line 14-14 of FIG. 9 (e.g., a cross-sectional view from the perspective of one oriented in a position in the general direction of the arrows designated 14).
Figure 15:
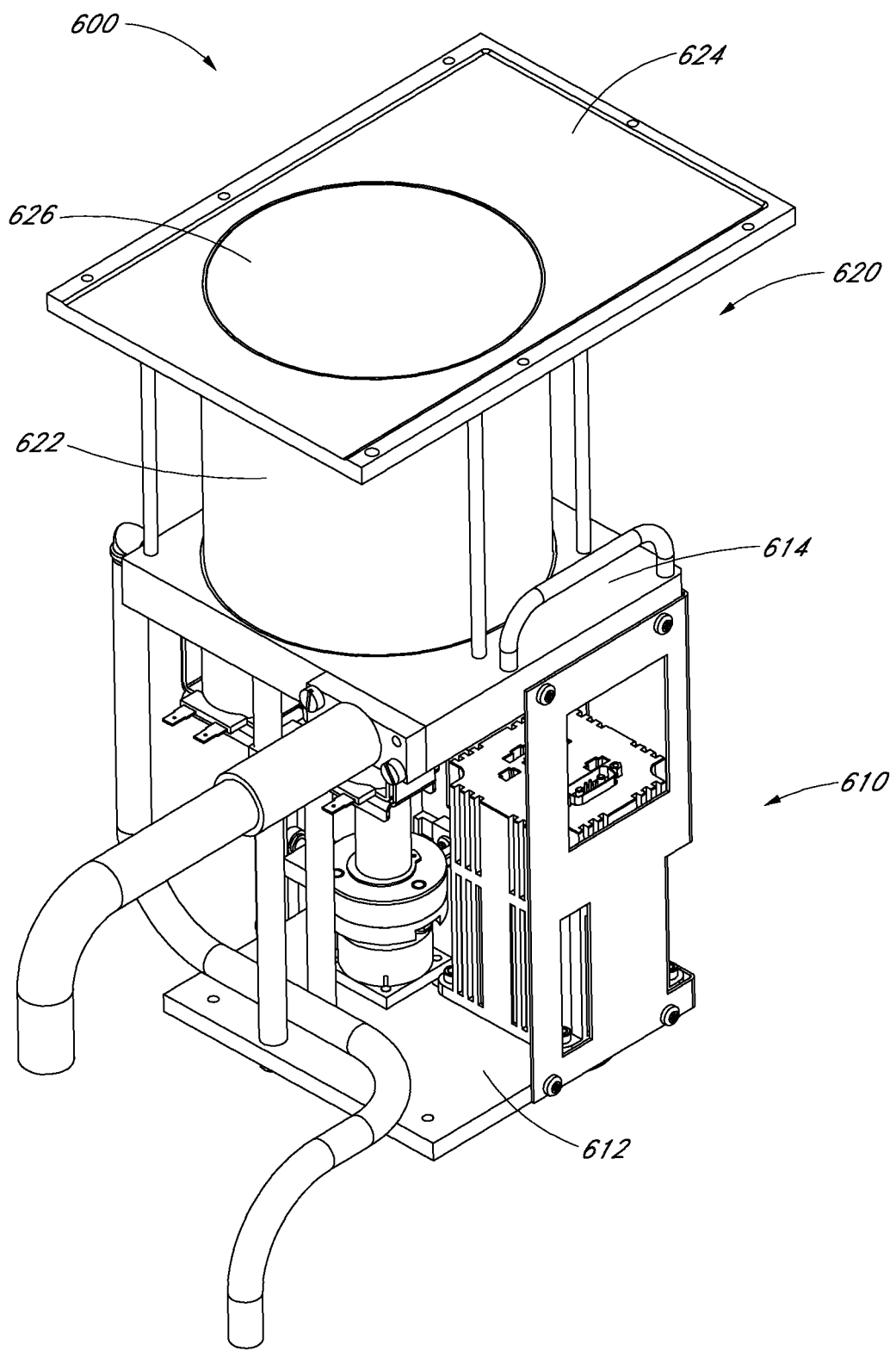
FIG. 15 is a front perspective view of an embodiment of an interior subassembly of the brew module of FIG. 9.
Figure 18:
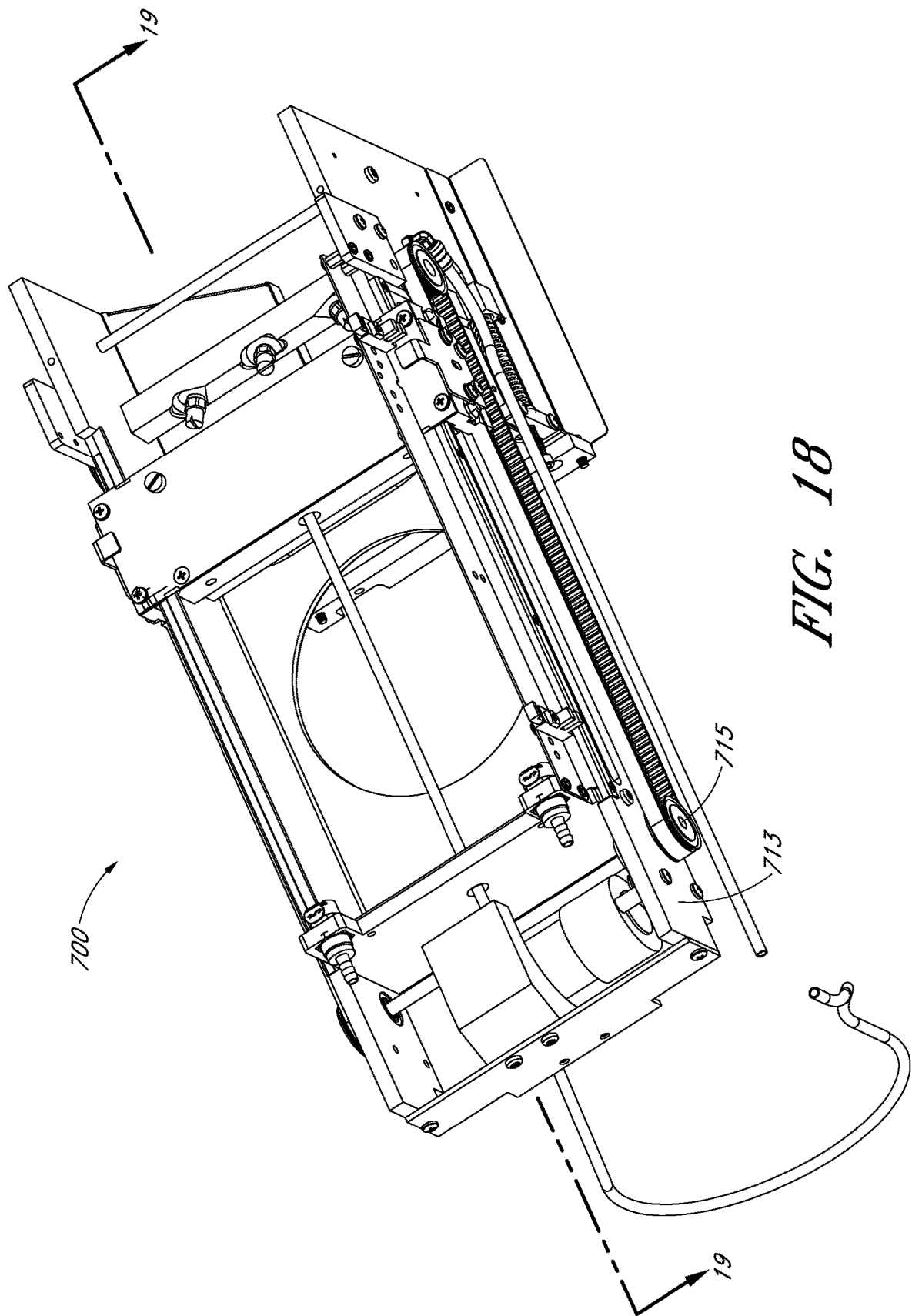
FIG. 18 is a rear perspective view of the wiper assembly of FIG. 16.
Figure 19:
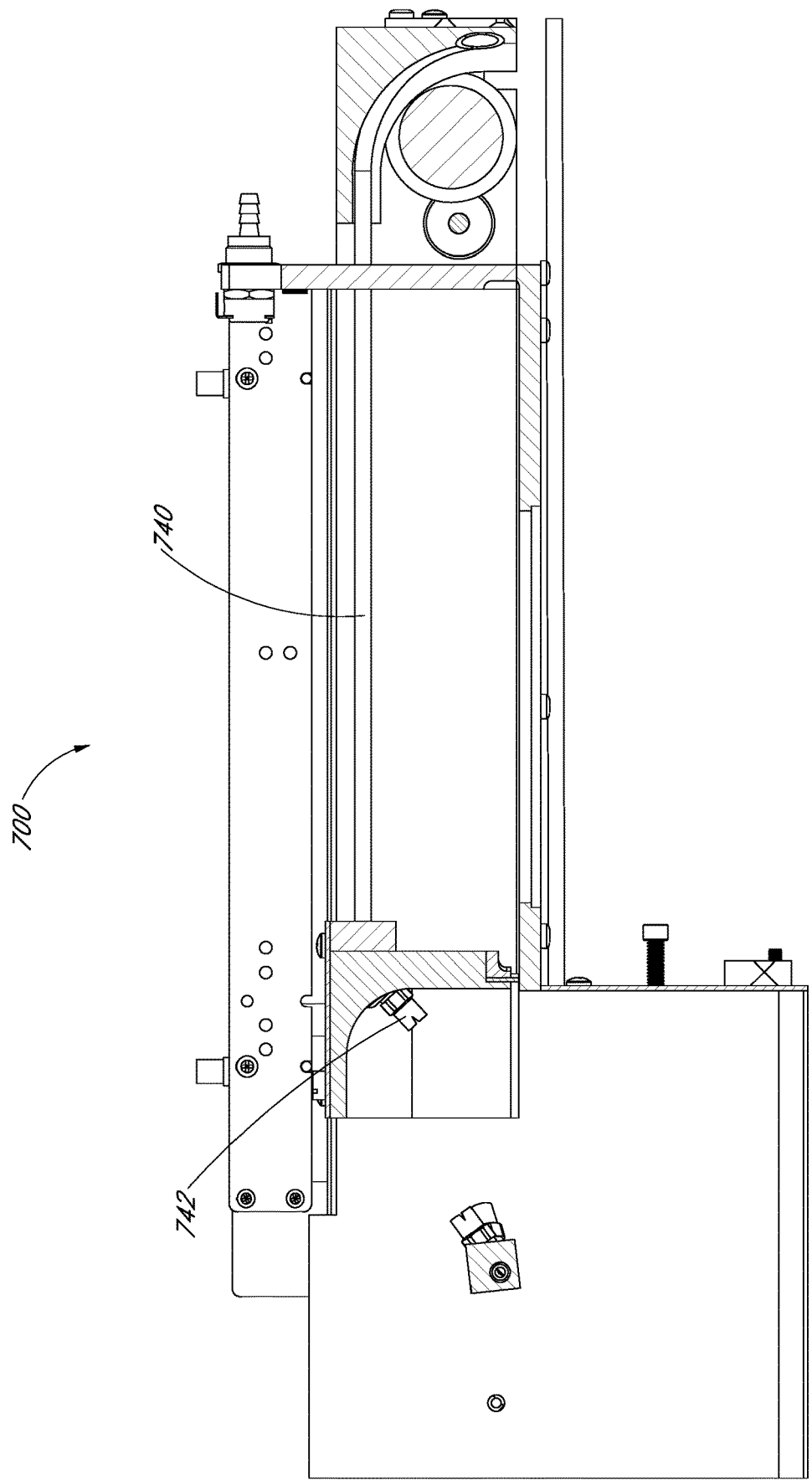
FIG. 19 is a right side view of the wiper assembly of FIG. 16.
Figure 20:
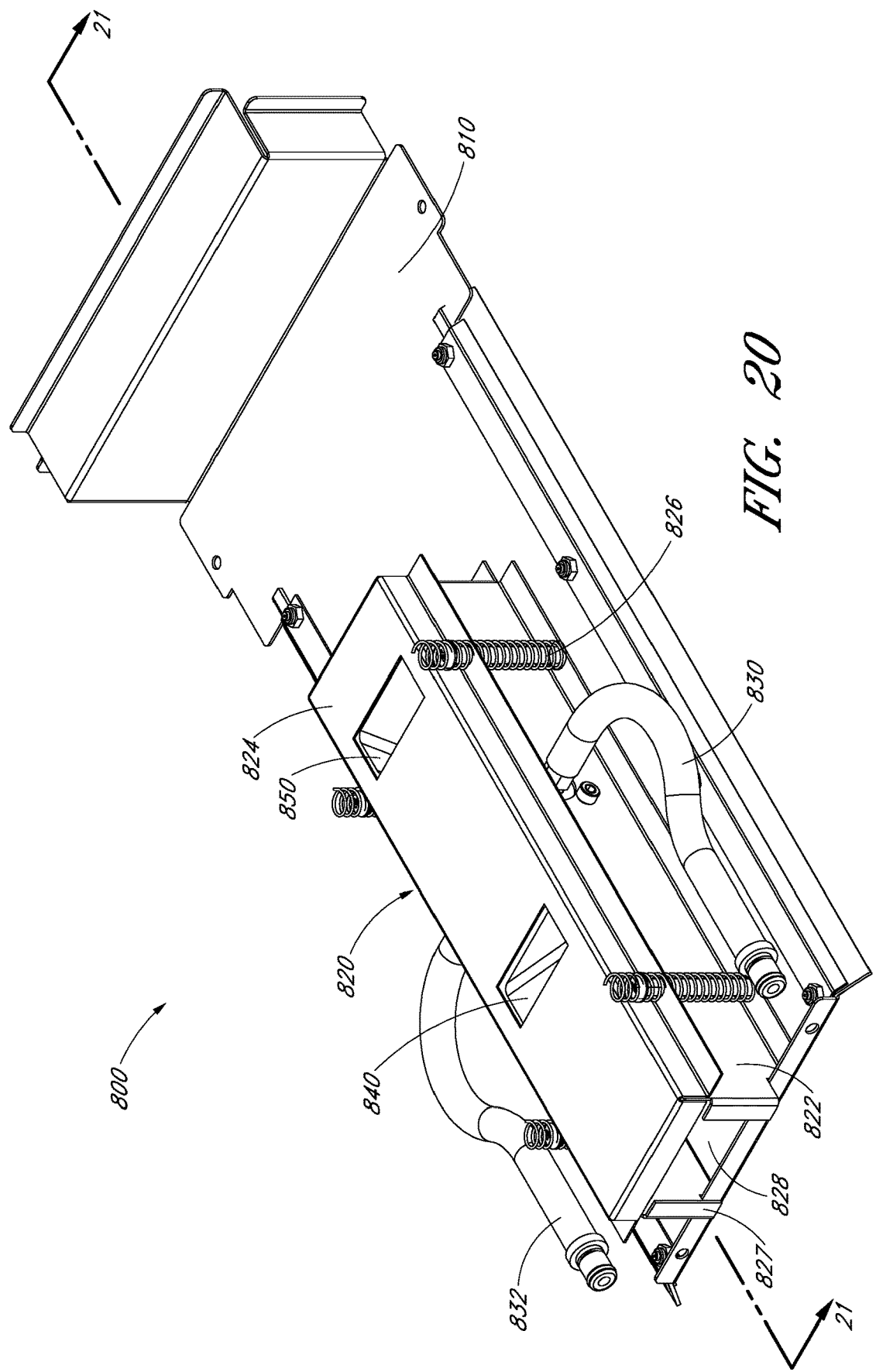
FIG. 20 is a rear perspective view of an embodiment of an upper subassembly of the brew module of FIG. 9.
Figure 21:
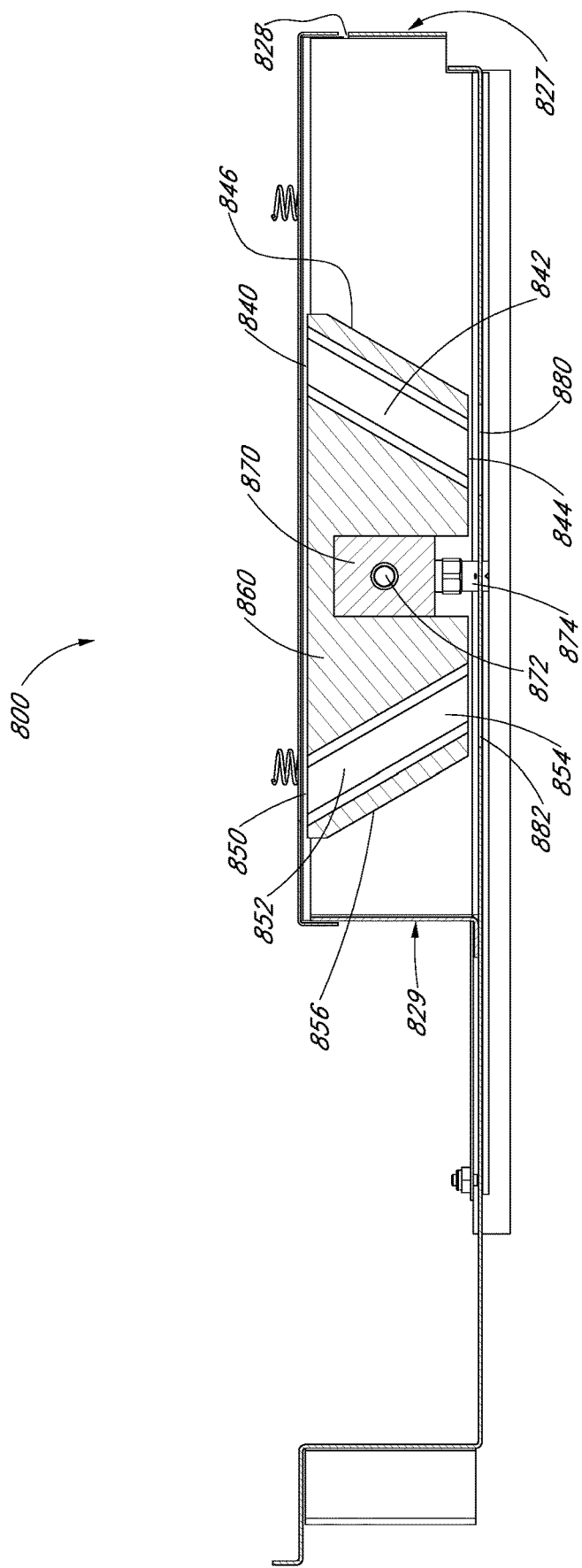
FIG. 21 is a cross-sectional view of the upper subassembly shown in FIG. 20 taken along line 21-21 of FIG. 20.

To briefly summarize the drawings, FIGS. 1-22 illustrate embodiments of a system for brewing a beverage. Specifically, FIG. 1 illustrates an embodiment of a system for brewing a beverage where three brew modules are installed in a beverage brewing machine. FIGS. 2-7 illustrate an embodiment of a system for brewing a beverage where one brew module is installed in a beverage brewing machine. FIG. 8 illustrates an embodiment of a grinder plate assembly for a system for brewing a beverage. FIGS. 9-14 illustrate an embodiment of a brew module for a system for brewing a beverage. FIG. 15 illustrates an embodiment of an interior subassembly of a brew module. FIGS. 16-19 illustrate an embodiment of a wiper assembly of a brew module. FIGS. 20-22 illustrate an embodiment of an upper subassembly of a brew module, where the upper subassembly has a baffle device.

FIGS. 23-49 illustrate additional embodiments of a system for brewing a beverage. The embodiments of FIGS. 23-49 are similar in many respects to the embodiments of FIGS. 1-22. However, the embodiments of FIGS. 23-49 may include additional, or alternative, features not necessarily included in the embodiments of FIGS. 1-22. Similarly, the embodiments of FIGS. 1-22 may include additional, or alternative, features not necessarily included in the embodiments of FIGS. 23-49. For example, one difference illustrated in FIGS. 23-49 is that the system for brewing a beverage may include substantially cylindrical hoppers that are inclined and disposed generally on their side.

Figure 34A:
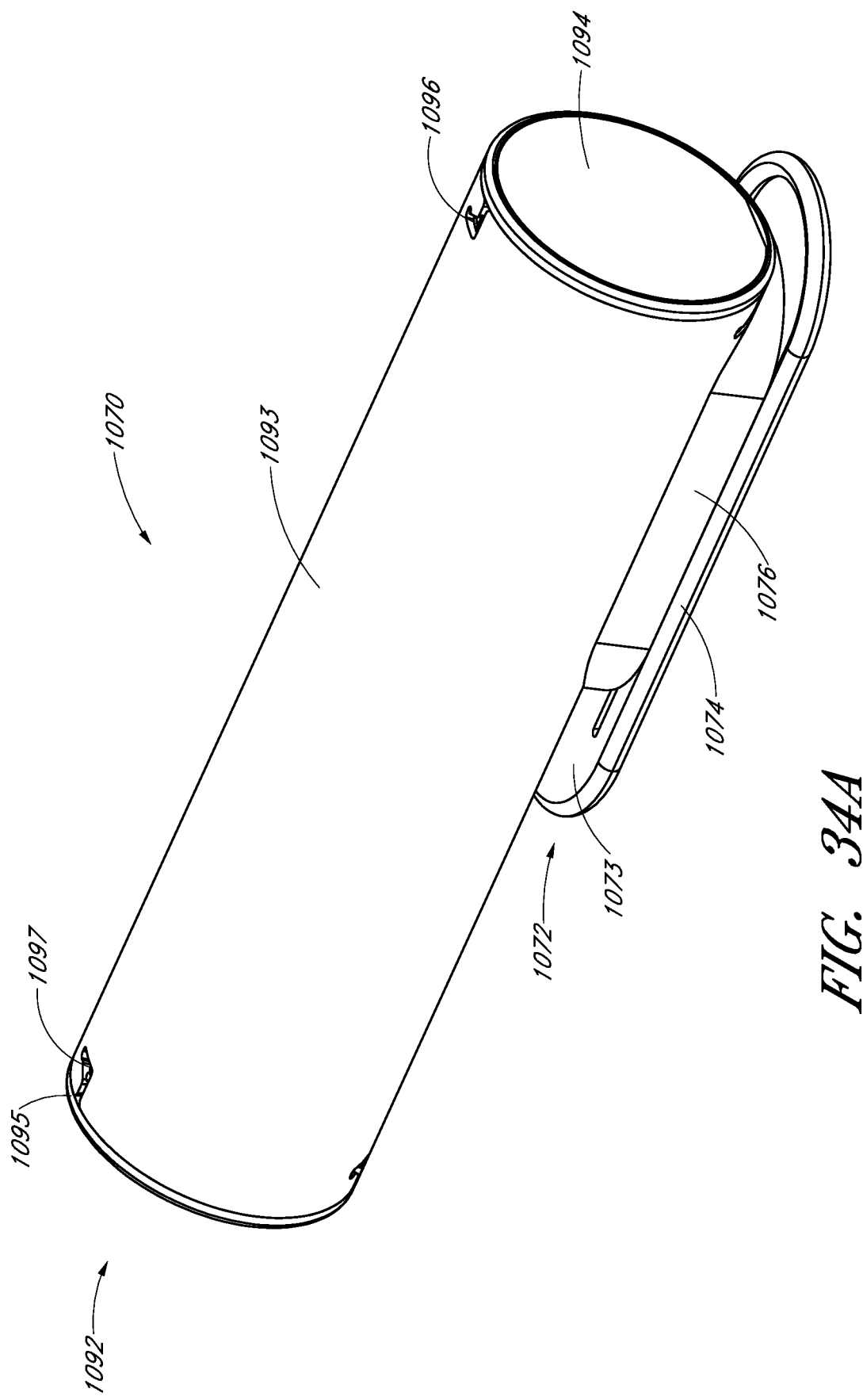
FIG. 34A is a perspective view of an embodiment of a hopper of the system shown in FIG. 23.
Figure 34B:
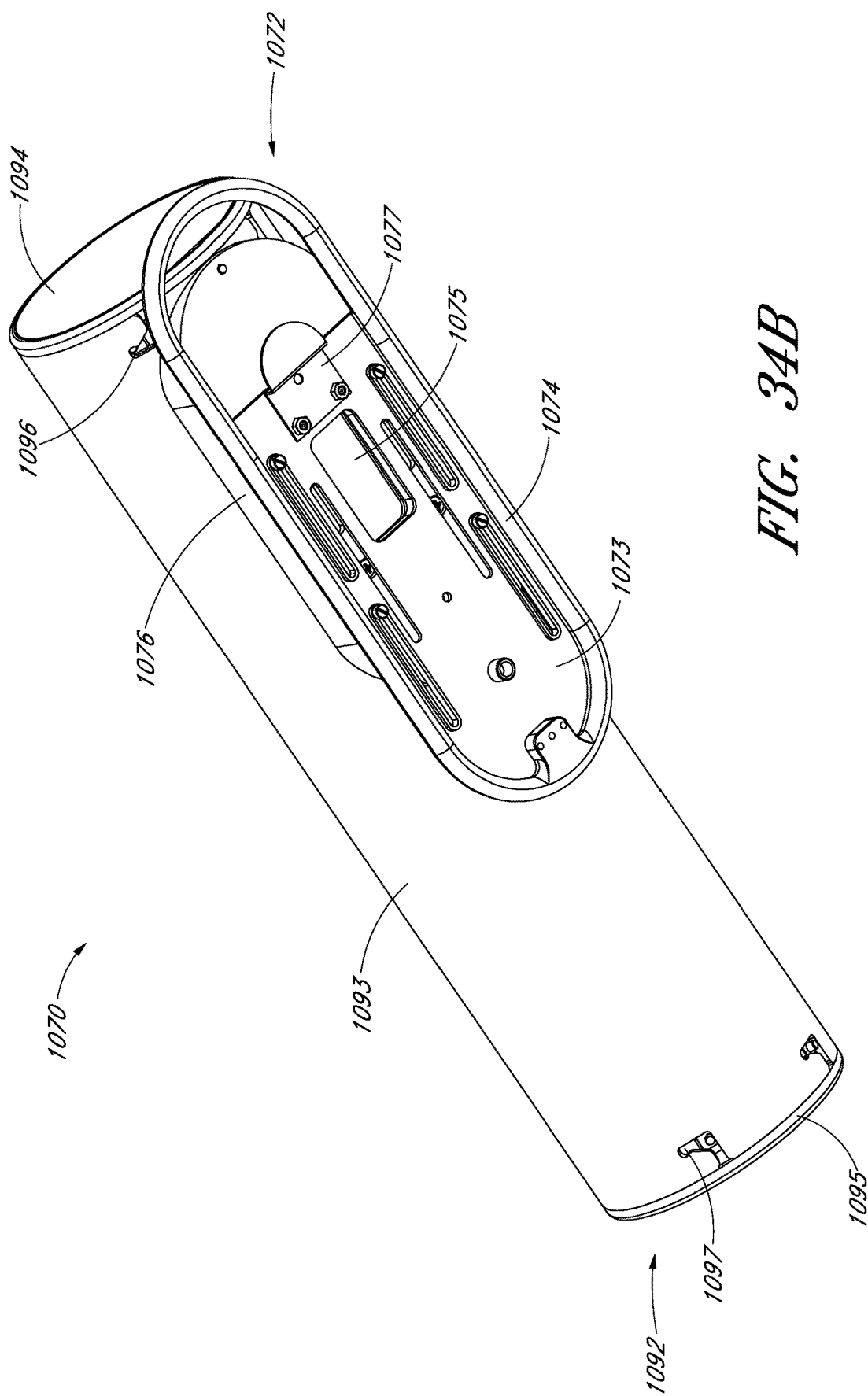
FIG. 34B is a perspective view of the hopper of FIG. 34A showing features of a base portion of the hopper.
Figure 35A:
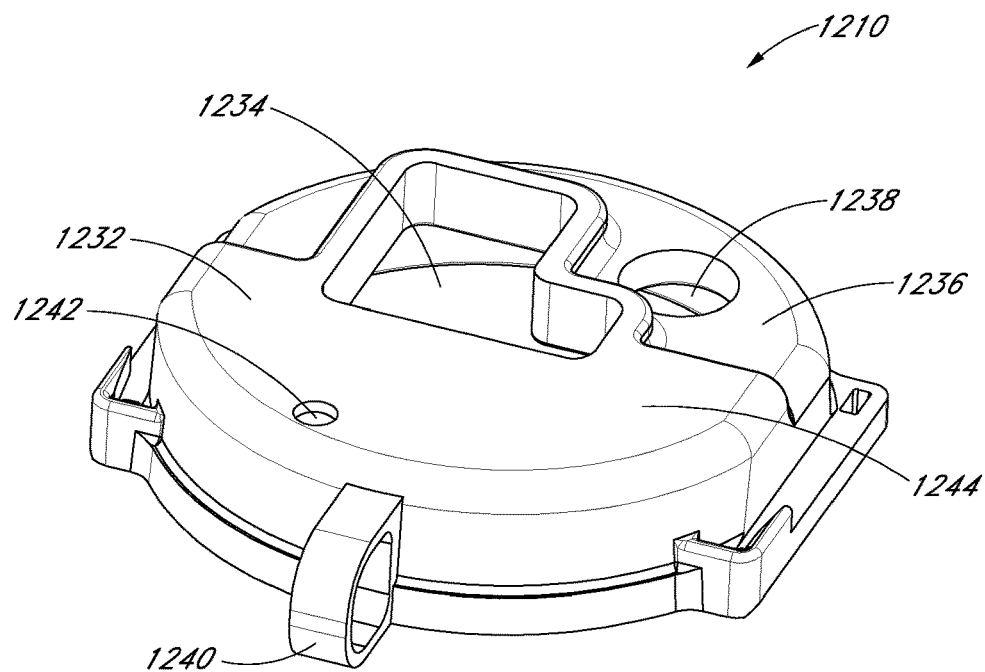
FIG. 35A is a perspective view of an embodiment of a brewing chamber of the brew module of FIG. 30 showing an outer portion of the chamber.
Figure 35B:
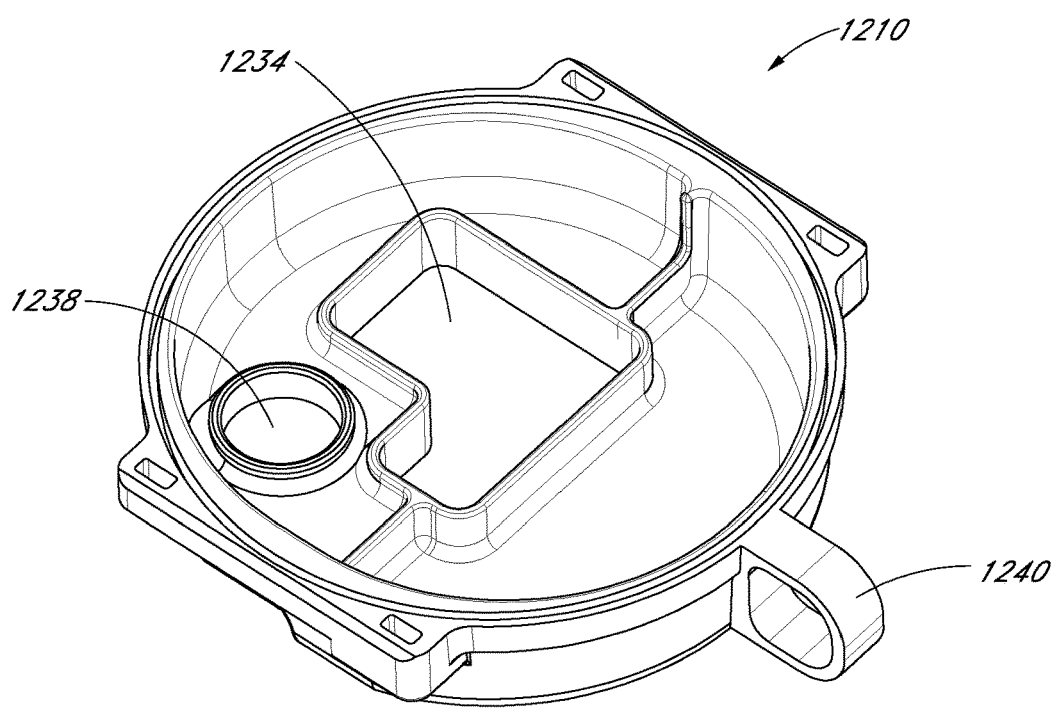
FIG. 35B is a perspective view of the chamber of FIG. 35A showing an inner portion of the chamber.
Figure 38:
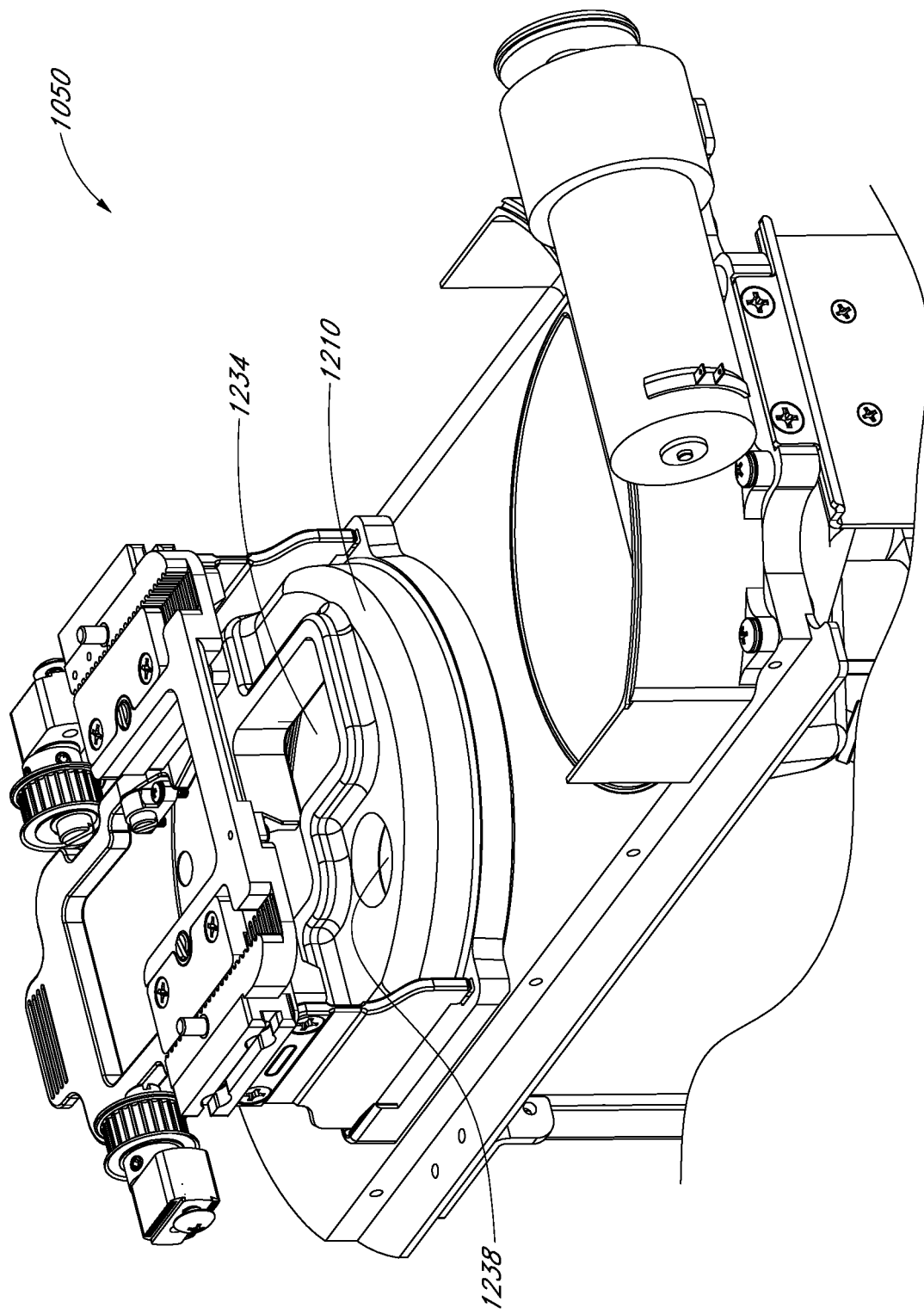
FIG. 38 is partial perspective view of the brew module of FIG. 36A where additional components have been removed.
Figure 39:
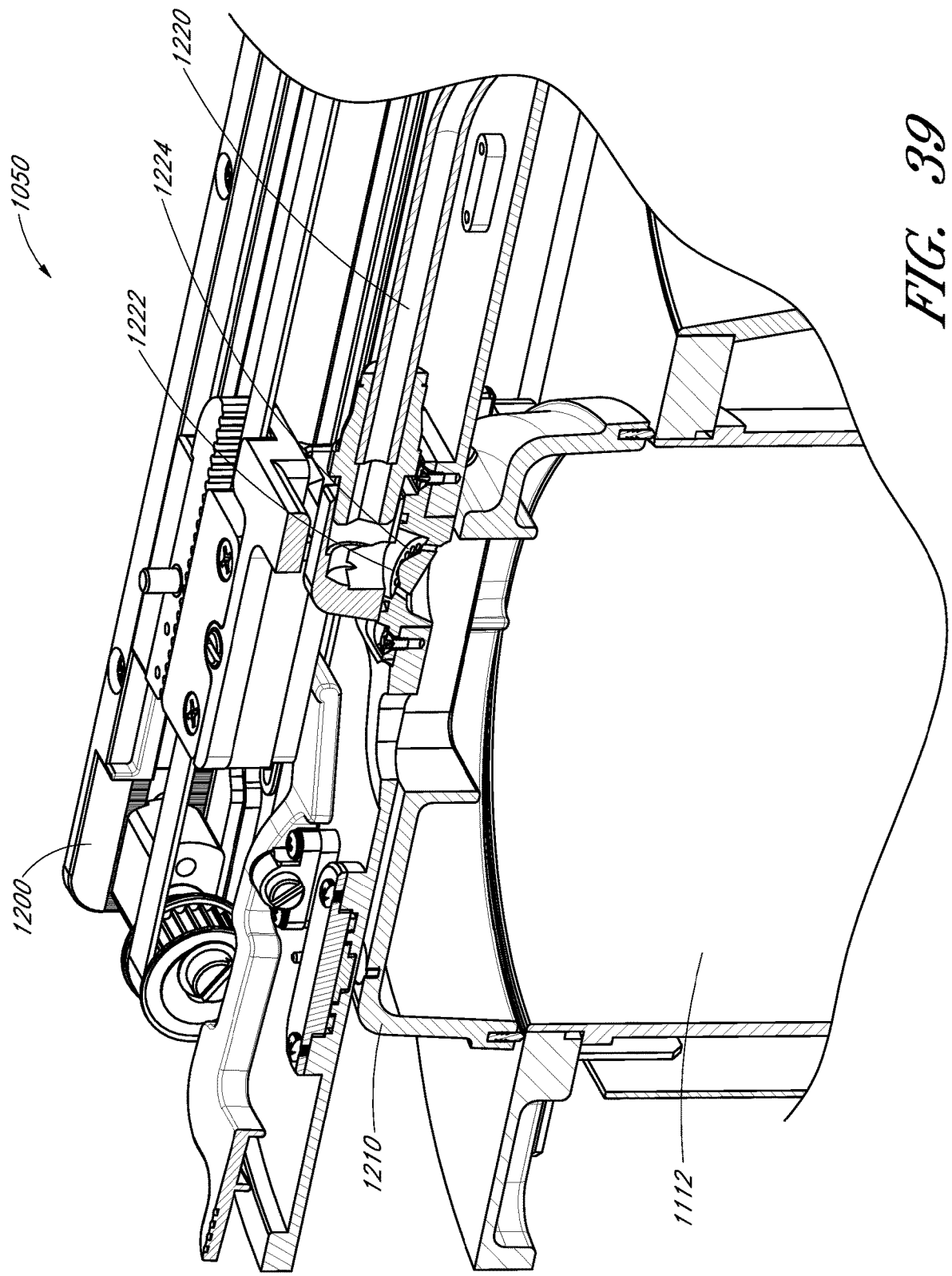
FIG. 39 is partial cross-sectional perspective view of the brew module of FIG. 30.
Figure 40:
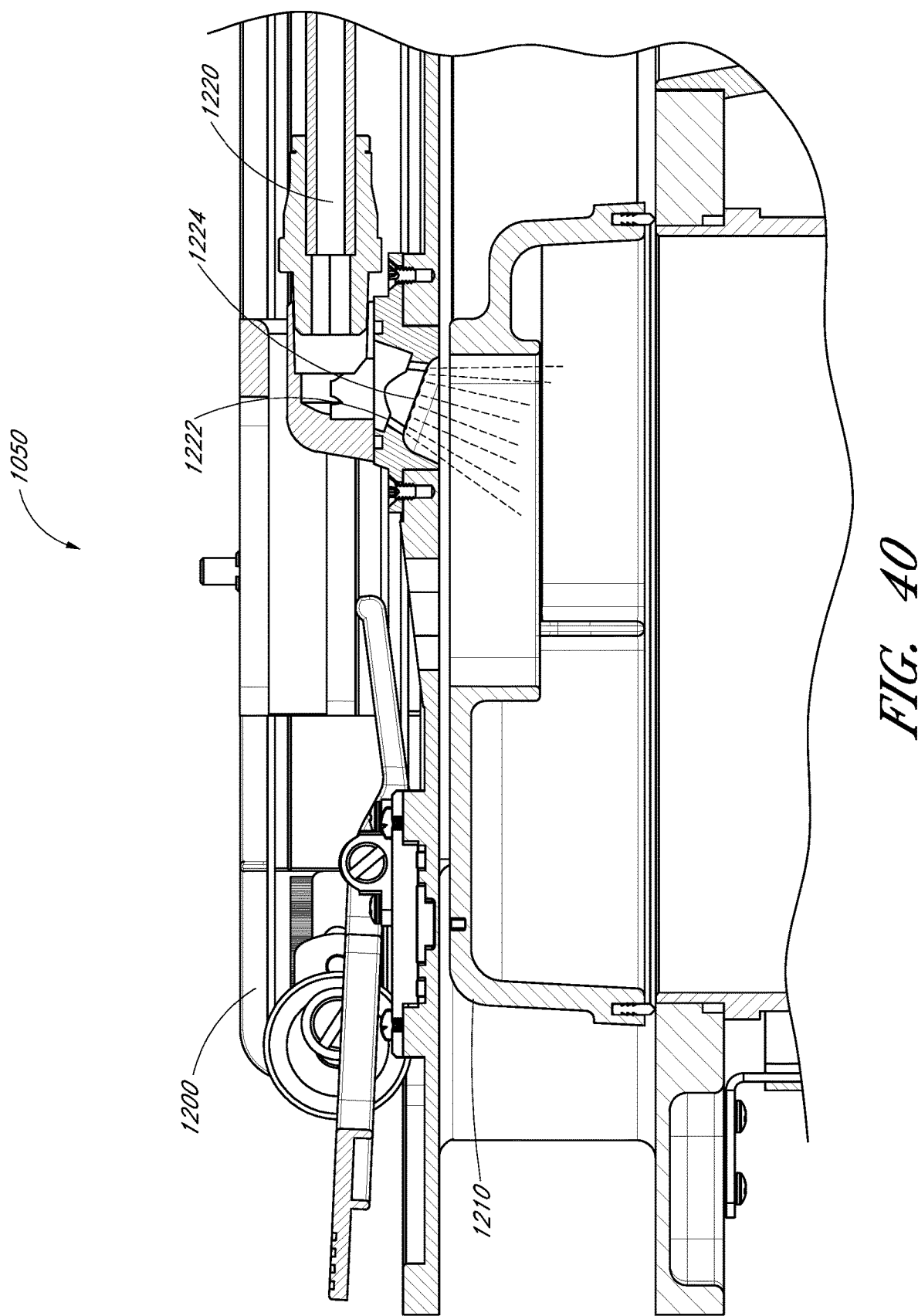
FIG. 40 is partial cross-sectional side view of the brew module of FIG. 39.
Figure 41:
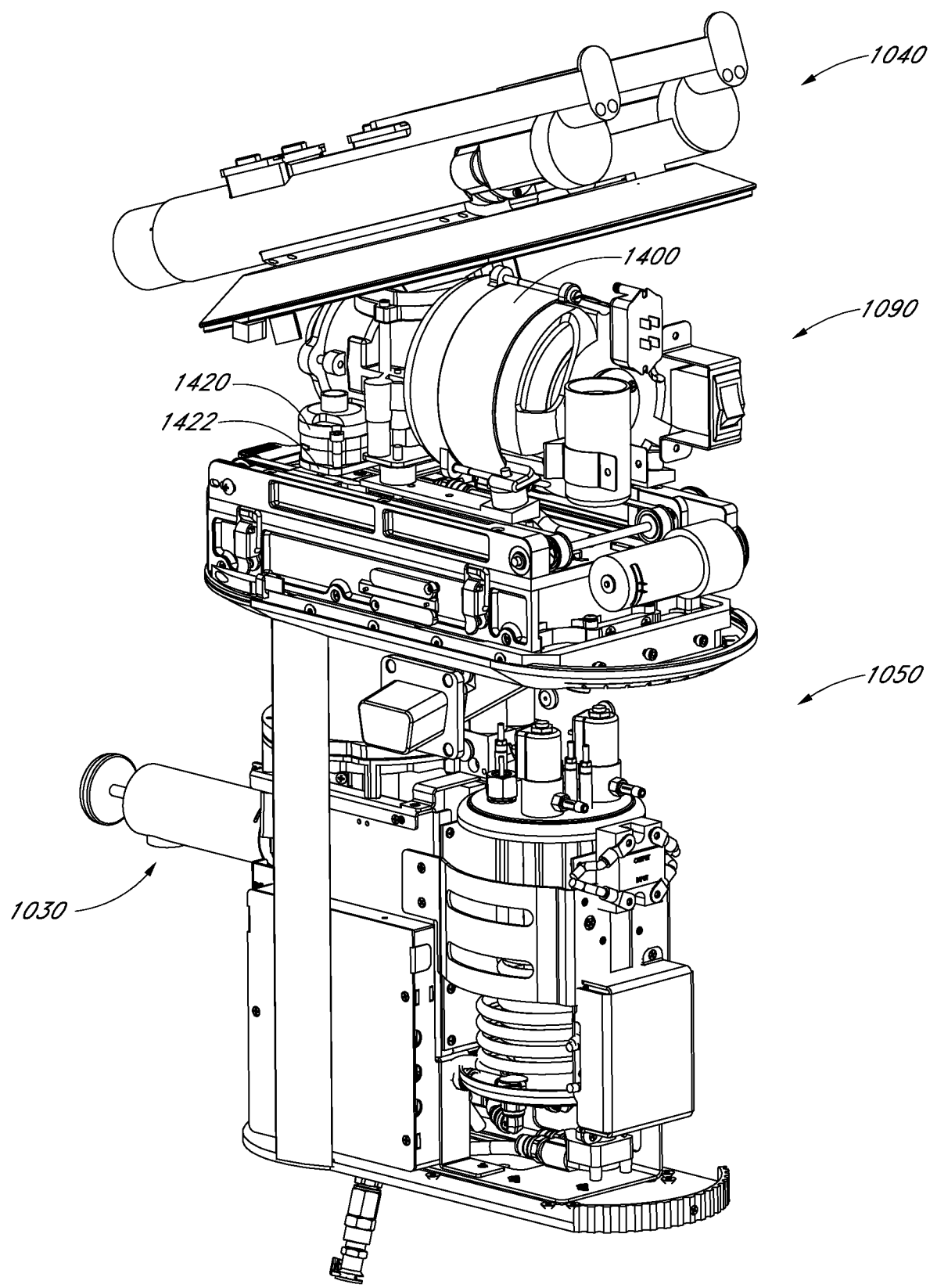
FIG. 41 is a rear perspective view of the brew module of FIG. 30 where certain components have been removed.
Figure 42:
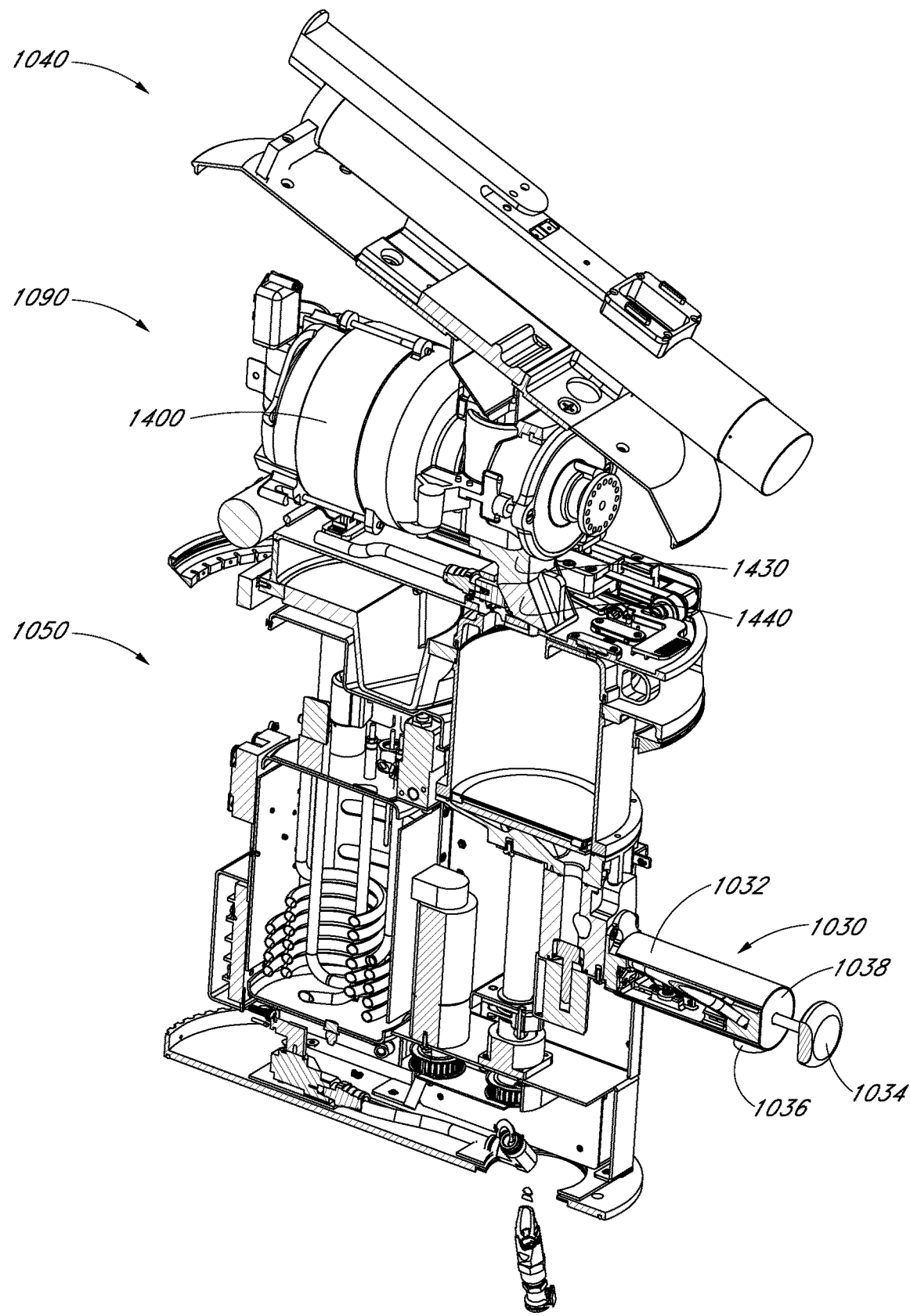
FIG. 42 is a cross-sectional front perspective view of the brew module of FIG. 30 where certain components have been removed.

In particular, FIGS. 23-28 illustrates an embodiment of a system for brewing a beverage where three brew modules are installed in a beverage brewing machine. FIG. 29-33 illustrate embodiments of a brew module configured to be used with a beverage brewing machine. FIGS. 34A and 34B show an embodiment of a hopper of a brew module. FIGS. 35A and 35B illustrate an embodiment of a brewing chamber of a brew module. FIGS. 36 and 37 illustrate partial views of a brew module where a brewing chamber is disposed in a first position and in a second position. FIGS. 38-40 illustrate partial views of a brew module where certain components have been removed to help show a brewing chamber of the brew module. FIGS. 41 and 42 are additional views of a brew module where certain components have been removed to help show interior components of the brew module. FIGS. 43-45 illustrate embodiments of a doser assembly and a volumetric doser. FIGS. 46-49 show components of a fan assembly configured to provide airflow at or near a grinder outlet.

As discussed in more detail below, one embodiment provides a system for automatically brewing a single-cup portion or a traveler portion of coffee. The system has more than one brew module, where each brew module has more than one hopper. The system allows a user to quickly and easily brew a variety of types of single-cup portions of coffee. In one particular embodiment, the system comprises three brew modules each comprising two hoppers. In that particular embodiment, the system is configured to contain and brew six different types of coffee. In other embodiments, the system may comprise more or less than three brew modules and each brew module may be in communication with more or less than two hoppers. In some embodiments, the brew modules may be in communication with one or more shared hoppers such that relatively few hoppers may provide grounds to many brew groups.

In another embodiment, a system is provided that brews a faster cup of coffee based on a combination of the following parameters: finely ground coffee, high brewing temperature, fan spray during brewing process, fine filter, and a relatively large piston. In another embodiment, a system is provided that brews a faster cup of coffee based on a combination of the following parameters: finely ground coffee, faster grinder, grinder-brewer integration, lower steep time, high brewing temperature, hotter brew vessel, and a motor configured to provide sufficient power and force to the piston. In one particular embodiment, the system is configured to grind, brew, and dispense a single-cup portion of coffee in about 30 seconds or less. In some embodiments, fan spray is provided to agitate coffee grounds to improve extraction.

In another embodiment, a system is provided to clean interior components of a brew module, where the system uses one or more fan sprays to remove coffee grounds and residue to clean the components between brewing cycles. They system may also include a plow feature that mechanically moves a large portion of the grounds and residue. The cleaning system may be automatic such that a user does not need to manually clean components of a brewing machine between brewing cycles.

In another embodiment, a baffle device is provided that is configured to prevent steam and condensation from rising and entering a grinder and hopper of a beverage brewing system. The baffle device may be disposed on an upper portion of a brew module between a wiper assembly of the brew module and a grinder plate assembly that supports the grinder and hopper. A fan may provide airflow about the baffle device to reduce condensation that accumulates on surfaces of the baffle device and to prevent steam and moisture from rising and contacting grinder components and coffee beans. In some embodiments, airflow is provided from outside a beverage brewing machine. In other embodiments, airflow is provided from inside the beverage brewing machine, such as from inside a chassis of the machine. In some embodiments, airflow may be provided from both outside and inside the beverage brewing machine.

In another embodiment, an apparatus for brewing a beverage is provided. The apparatus comprises at least one brew module configured to brew a single-cup portion of a beverage. The at least one brew module comprises a grinder subassembly, an upper subassembly, a fan, and a baffle device configured to provide a positive pressure inlet at or near a coffee grounds outlet to prevent steam and condensation from rising and entering the grinder subassembly. The baffle device is disposed on an upper portion of the at least one brew module and generally below the grinder subassembly. The fan is configured to provide airflow about the baffle device. The baffle device is suspended with respect to a lower face of the upper subassembly.

In another embodiment, a beverage brewing machine includes an apparatus to lower the coffee bean hoppers relative to the brewing machine so that a user may easily refill and maintain the hoppers. The apparatus may comprise a handle in communication with a frame of the machine to allow translation of the hopper without disassembly to relocate the hopper to a more serviceable location. The apparatus may reduce the labor and time involved in maintaining the hoppers and refilling the hoppers with beans.

In another embodiment, a beverage brewing machine includes a plurality of hoppers that are disposed generally on their side and at least partially inclined. The hoppers may be advantageously arranged in a side-by-side configuration in a serviceable location so that a user may easily refill and maintain the hoppers without necessarily having to lower the hoppers or having to use a stool or step, for example, to access the hoppers. Such an apparatus may reduce the labor and time involved in maintaining the hoppers, refilling the hoppers with beans, and exchanging one hopper for another hopper.

While the drawings show embodiments of systems for brewing a beverage having one brew module and embodiments having three brew modules, the disclosed embodiments may also include systems having other numbers of brew modules, such as systems having two brew modules, four brew modules, five brew modules, six brew modules, or more brew modules. Further, each brew module may be in communication with more or less than two hoppers. In some embodiments, the brew modules collectively may be in communication with one or more shared hoppers. For example, the system may transport coffee beans or grounds from relatively few hoppers to many brew groups or modules. The drawings will now be described in greater detail below.

FIG. 1 illustrates one embodiment of a system 10 for brewing a beverage such as coffee. The system 10 may include a beverage brewing machine 12, a coffee cup 14, and a coffee traveler container 16. The beverage brewing machine 12 comprises an outer cover 20, a dispensing portion 30, a grinder plate assembly 40, and three brew groups or modules 50. The outer cover 20 has a front panel 22 that covers a front portion of the beverage brewing machine 12. The outer cover 20 may include a display screen 24 configured to display data or information relating to the system 10 for brewing a beverage. The dispensing portion 30 provides a surface to place a cup 14 and/or a traveler container 16 to receive and contain coffee brewed by the brewing machine 12. The cup 14 may be configured to contain a single serving of coffee, while the traveler container 16 may hold a larger quantity of coffee to serve multiple customers or consumers.

The grinder plate assembly 40 is configured to interact with the brew modules 50 to contain coffee beans, grind the beans, and provide the grounds to the brew modules 50. The brew modules 50 then brew coffee, such as a single-cup portion or a larger traveler-size portion, and automatically clean interior components of the brew modules 50 to prepare for the next brew cycle. The grinder plate assembly 40 may include six hoppers 42 such that two hoppers 42 are configured to interact with each brew module 50. In one embodiment, each hopper 42 provides beans to a grinder, which is not shown in FIG. 1, of the grinder plate assembly 40. The brew modules 50 include a waste bin 52 with a handle to easily remove used coffee grounds and other waste, such as excess water, from the brewing machine 12. The brew modules 50 also include a dispenser 54 to dispense coffee into a cup 14 or traveler 16.

In some embodiments, the brew module 50 may include one or more sensors to detect and monitor qualities of the finished beverage. Data obtained from the one or more sensors may be stored and logged in a data storage device. The one or more sensors may include sensors configured to detect qualities such as temperature, opacity, total dissolved solids (or TDS), and Brix (e.g., sugar content of the beverage). The data may be used to provide information about the beverage brewing machine 12. The one or more sensors may be configured to conduct a final quality control check for the brewed beverage and identify potential issues if certain data falls outside of predetermined tolerance ranges. For example, if the coffee temperature is low at the dispenser 54, then a user may discover that a heating element of the machine 12 has failed. In some embodiments, the one or more sensors are disposed at or near the dispenser 54. In some embodiments, the one or more sensors may conduct initial and/or intermediate quality control checks in addition to, or in place of, a final quality control check.

In some embodiments, the brew module 50 may include one or more sensors to detect and monitor qualities regarding the size and volume of a container for the brewed beverage. The one or more sensors may detect the size of a beverage cup 14 and provide information to the beverage brewing machine 12 to ensure that the appropriate quantity of beverage is dispensed. An interlock feature can activate to dispense only an appropriate amount of brewed beverage. For example, the one or more sensors are configured to ensure that the system 10 does not dispense 20 ounces of beverage when an 8-ounce cup is present. In addition, the one or more sensors could detect a beverage traveler container 16 is present and dispense an appropriate amount of brewed beverage to the traveler 16. The one or more sensors may also ensure that the dispenser 54 does not dispense brewed beverage when a container, such as a cup 14, is not present. In some embodiments, the one or more sensors are disposed at or near the dispenser 54. In some embodiments, the interlock feature may comprise a motion interlock feature and/or an ultrasonic interlock feature.

While the embodiment of FIG. 1 shows a system 10 having three brew modules 50 and six hoppers 42, other configurations may be used. For example, the system 10 may include more or less than three brew modules 50. In addition, the brew modules 50 may be configured to interact with more or less than two hoppers 42, and each brew module 50 does not necessarily need to interact with the same number of hoppers 42 as other brew modules 50. In some embodiments, the brew modules 50 communicate with one or more hoppers 42 shared among some or all of the brew modules 50. In one embodiment, the system 10 comprises two brew modules 50 each having two hoppers 42.

In some embodiments, the system for brewing a beverage (such as, for example, the systems shown in FIG. 1 and/or FIG. 23) may brew a faster cup of coffee than other systems by speeding up the brewing process based on one or a combination of some or all of the following parameters: finely ground coffee, faster grinder, grinder-brewer integration, lower steep time, high brewing temperature, hotter brew vessel, and a motor configured to provide sufficient power and force to the piston. The motor may comprise a torquey motor that is configured to generate high torque at low RPMs. In some embodiments, the motor provides sufficient force and power to the piston such that desired speed and movement of the piston is not limited by the motor of the brewing machine. Other parameters may include fan spray during the brewing process, a fine filter, and a relatively large piston. A system having a relatively large piston and filter facilitates filtering a large volume of coffee grounds quickly by maintaining a relatively thin puck of coffee grounds. A fine filter may be used with finer coffee grinds to appropriately filter the coffee.

In one particular embodiment, the system is configured to grind, brew, and dispense a single-cup portion of coffee in approximately 30 seconds or less. For example, the system may complete a grind and brew cycle in approximately 26 seconds and dispense the coffee in approximately 4 seconds. Existing brew processes for single-cup portions of coffee may take more than 60 seconds. Thus, reducing the cycle time to approximately 30 seconds results in a significant time savings to a user and customer.

Providing finely ground coffee typically will result in a faster brew time. However, there are some limitations with finely ground coffee. For example, when using fine grounds, an operator typically has less control over the brewing process and ultimately less control over the taste of the coffee. Thus, some brewing systems use finely ground coffee to reduce the brew time, but those systems may produce coffee having a poor taste. In addition, typically there is less margin for error with finely ground coffee. For instance, finer grinds can require greater process control because extraction becomes more sensitive than with coarser grinds.

Other parameters may also improve the brewing process. For example, it may be desirable to provide a relatively high temperature of water, such as water having a temperature of approximately 210 degrees. In some embodiments, water having a temperature of about 200 degrees to 220 degrees is provided during a brew cycle. A relatively high temperature of water can speed up the brewing process. During the brewing process, it may also be desirable to provide a fan spray of hot water to the coffee grounds. The fan spray provides agitation and wetting advantages such that it speeds up extraction of flavor from the coffee grounds. In some prior brewing systems, a barista would manually agitate the coffee grounds. In some embodiments of the disclosed system, providing a fan spray eliminates or reduces the need for a barista to manually agitate the coffee grounds. A relatively fine filter may be provided so that the dispensed coffee has an appropriate texture and is not too murky. The filter may be configured to compensate for finer grinds and to produce a cup of coffee with appropriate clarity. A relatively large piston also has been found to be advantageous because a large piston allows the machine to provide a more aggressive and faster filtering process. The large piston also allows the puck of coffee grounds to be relatively thin to provide more efficient filtration. In some embodiments, the piston has a diameter approximately one inch larger than pistons in standard brewing machines.

In some applications, it might be advantageous to modify the flavor profile of the brewed beverage. Varying water temperature during the brew process may modify the flavor of a brewed beverage. Water having a higher temperature tends to speed up extraction and produce a stronger, more aggressive flavor. Water having a lower temperature tends to slow down extraction and produce coffee having a mellower flavor. Water temperature may be varied during the brewing process through flow rate of the water, providing water at different temperatures, and/or providing water at different times during the brewing process. For example, the beverage brewing system may add water during the steeping process to change the water temperature. In some embodiments, hot water may be added mid-steep and in other embodiments cool water may be added mid-steep. Changing the water temperature during the steeping process can allow the system to customize a particular flavor of the brewed beverage. In some embodiments, the system has two or more boilers each configured so that the system may provide water having different temperatures during the steeping process. In some embodiments, water pressure may be varied to modify the flavor of a brewed beverage.

In addition, grind size may be used to modify the flavor profile of a brewed beverage. A coarser grind tends to slow down extraction from the coffee grounds and to produce a relatively mellow coffee. A finder grind tends to increase extraction speed and produce coffee having a stronger flavor. The system may provide coffee grounds having multiple grind sizes to modify the flavor profile. For instance, coffee grinds having different sizes may be added at different points during the steep process to mix the differently-sized coffee grinds. This can also allow the system to customize a particular flavor of the brewed beverage. In some embodiments, more than one grinder may be used to create different grind sizes. In some embodiments, both changing water temperature mid-steep and mixing multiple grind sizes may be employed to modify the flavor profile of brewed coffee. In other embodiments, the flavor of the brewed beverage may be determined by adjusting and/or controlling one or more of the following parameters: brew time, water temperature, grind size, and dose ratio. Any or all of the considerations and parameters described in the paragraphs above may be applied to embodiments of the systems 100, 1000 shown in FIG. 1 and/or FIG. 23, respectively.

FIGS. 2-7 show an embodiment of a system 100 for brewing a beverage where one brew module 500 is installed in a beverage brewing machine 110. The system 100 of FIGS. 2-7 is substantially similar to the system 10 of FIG. 1 except that only one brew module 500 is shown in FIGS. 2-7. FIGS. 2-7 illustrate the modular nature of the system 100 in that one or more brew modules 500 may be removed from or attached to the brewing machine 110. The system 1000 for brewing a beverage illustrated in FIG. 23 may also be modular in that one or more brew modules 1050 of the system 1000 may be removed from or attached to the beverage brewing machine 1010 illustrated, for example, in FIGS. 23-28.

Figure 2:
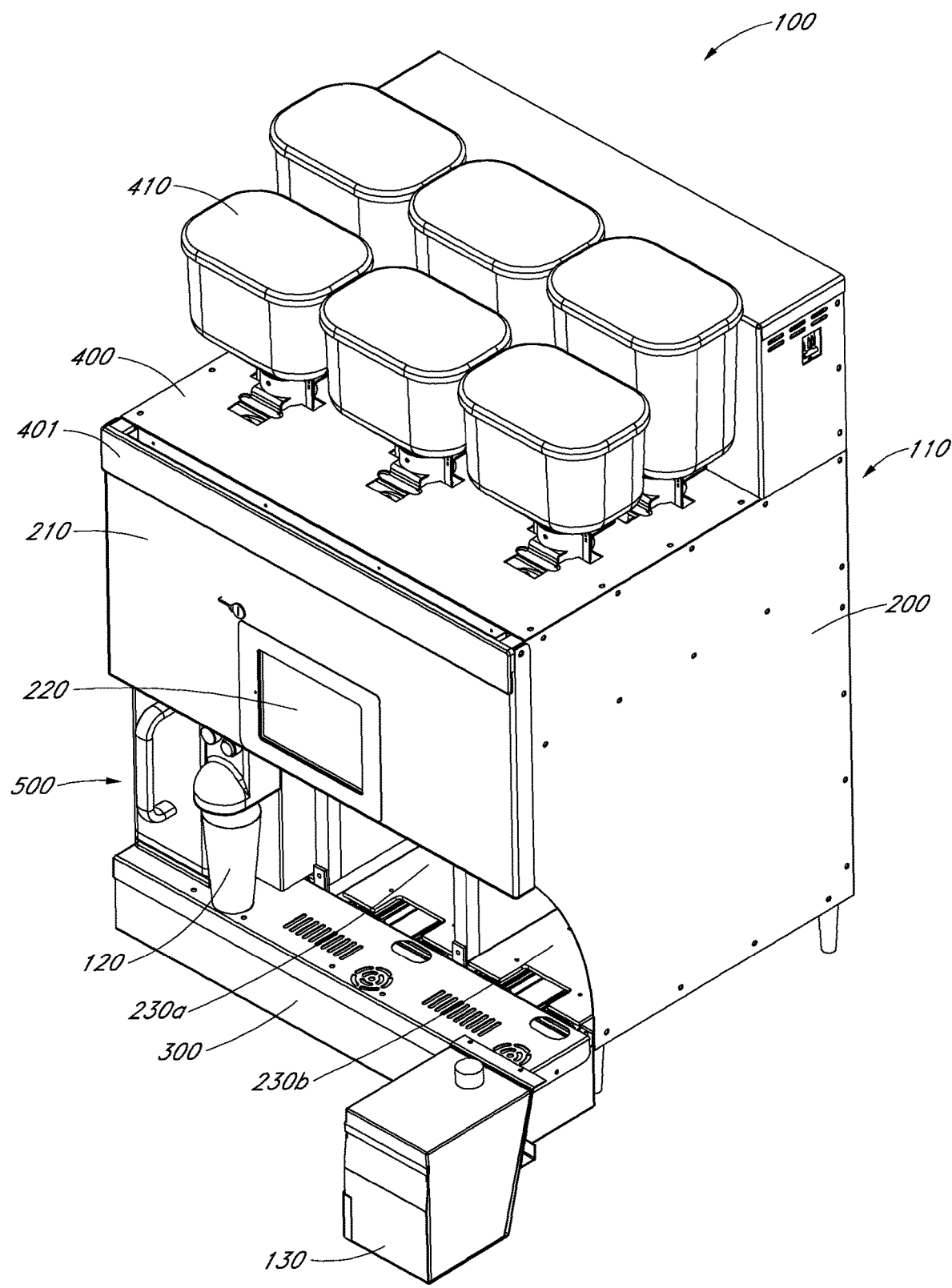
FIG. 2 is a front perspective view of an embodiment of a system for brewing a beverage where one brew module is installed in a beverage brewing machine.

With reference to FIG. 2, the system 100 may include a beverage brewing machine 110, a coffee cup 120, and a traveler container 130. The beverage brewing machine 110 may comprise an outer cover 200, a dispensing portion 300, a grinder plate assembly 400, and a brew group or module 500. The outer cover 200 has a front panel 210 that may include a display screen 220. The beverage brewing machine 110 defines a brew module receiving area 230 configured to receive a brew module 500. In the illustrated embodiment, a center brew module receiving area 230a and a right brew module receiving area 230b do not contain a brew module 500 and portions of those receiving areas 230a, 230b may be seen in FIG. 2. The dispensing portion 300 provides a surface to place a cup 120 and/or a traveler container 130 to receive and contain coffee brewed by the brewing machine 110.

The grinder plate assembly 400 is configured to interact with the brew module 500 similar to the interaction described above with respect to the system 10 of FIG. 1. The brew module 500 is shown on a left portion of the brewing machine 110 and interacts with two hoppers 410 disposed on a left side of the grinder plate assembly 400. The grinder plate assembly 400 may comprise a vent feature 401 to allow steam and air generated during and after the brew cycle to travel out of the brewing machine 110 and to be released into the surrounding environment.

Figure 5:
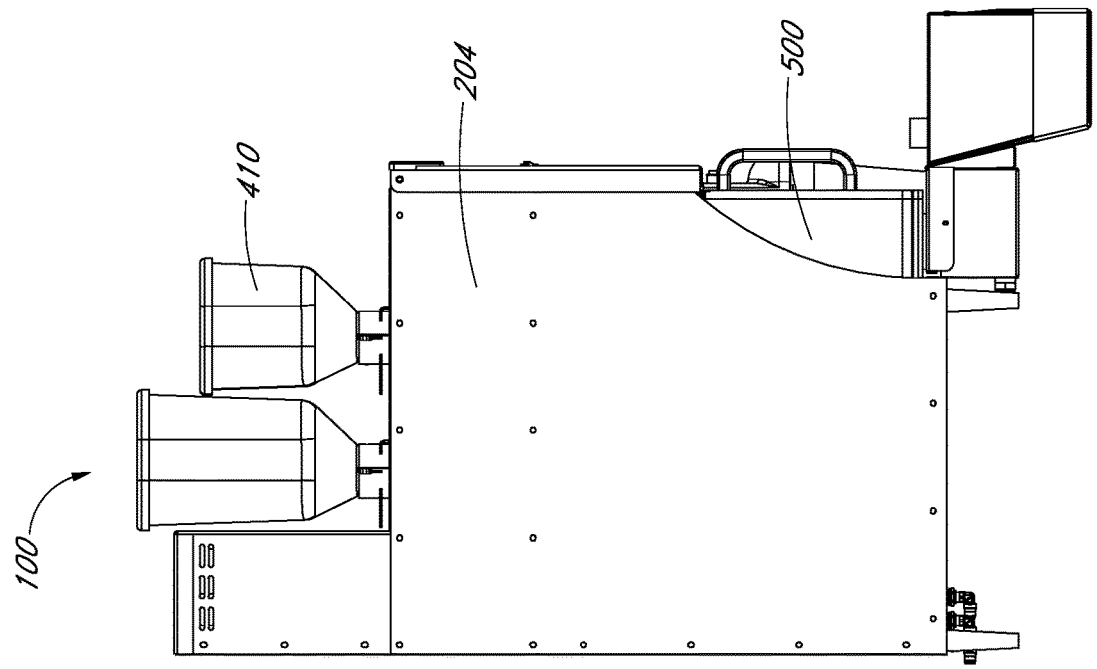
FIG. 5 is a right side view of the system shown in FIG. 2.
Figure 6:
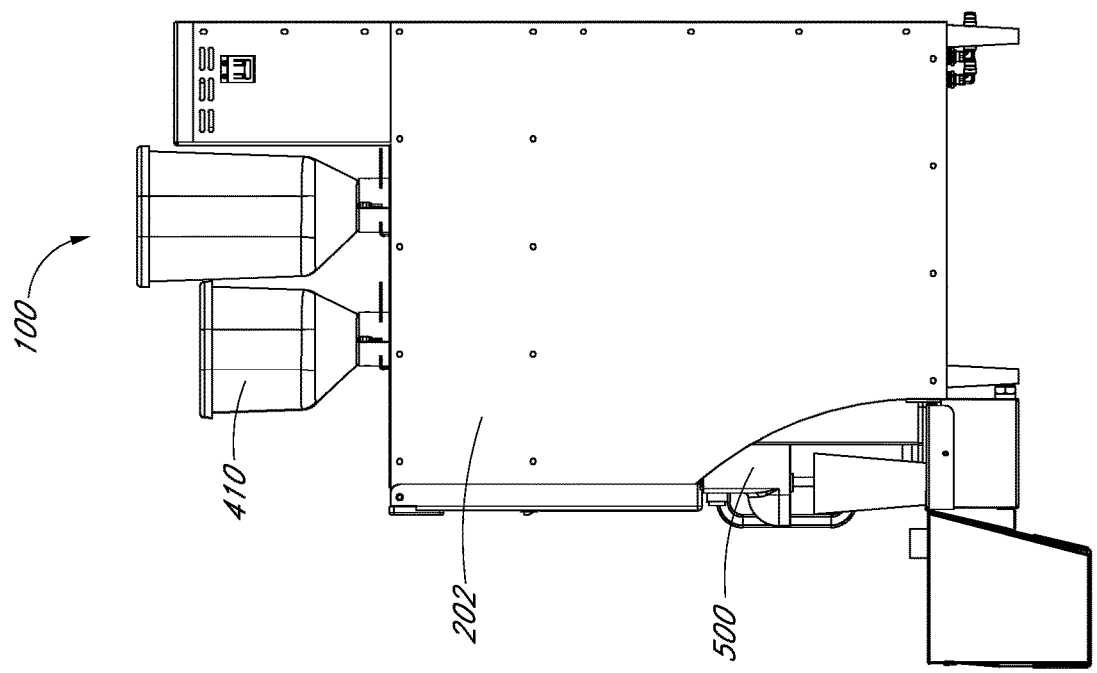
FIG. 6 is a left side view of the system shown in FIG. 2.
Figure 7:
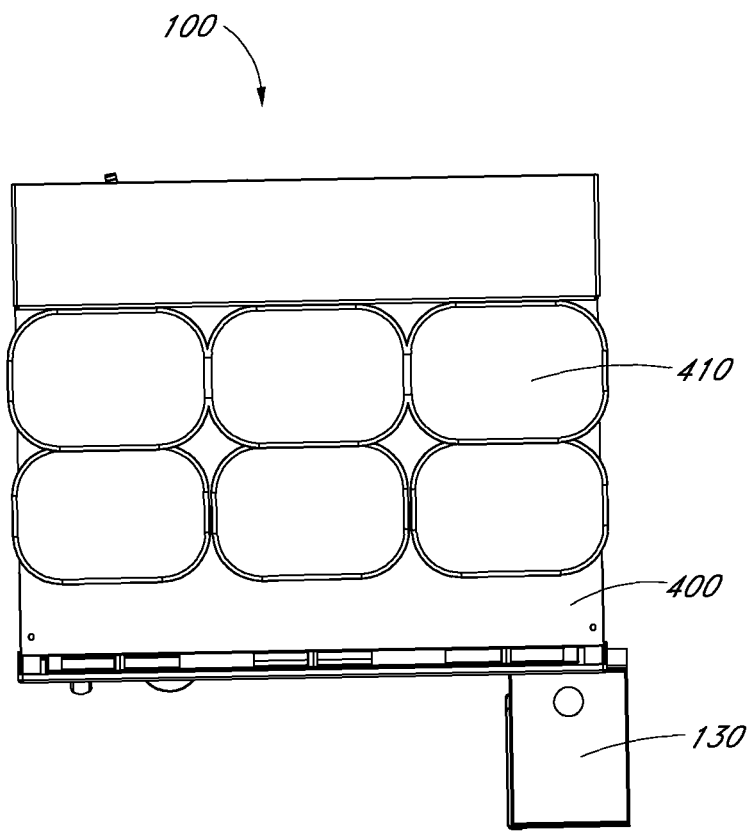
FIG. 7 is a top plan view of the system shown in FIG. 2.
Figure 8:
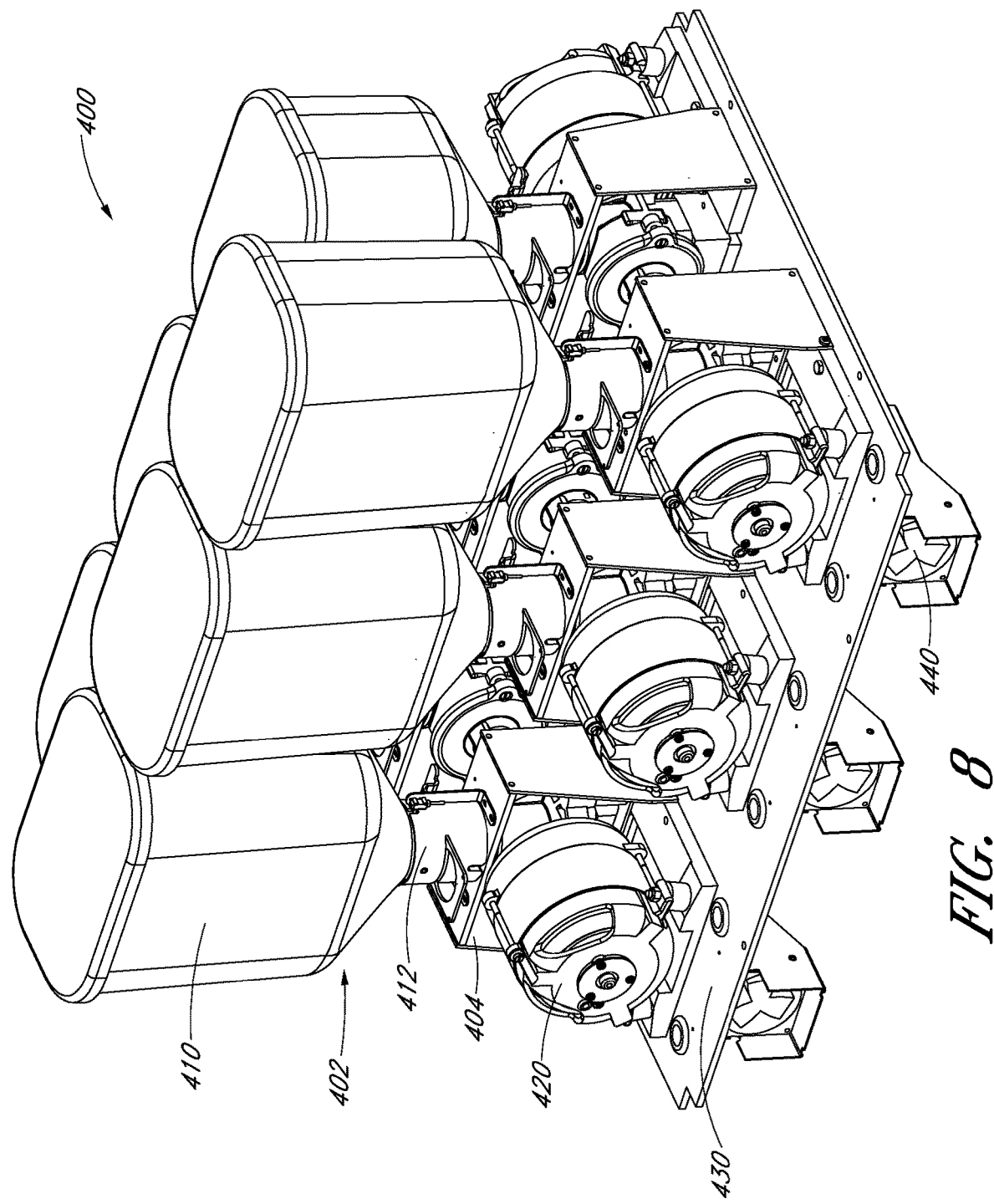
FIG. 8 is a front perspective view of an embodiment of a grinder plate assembly of the system of FIG. 2.

FIGS. 3-7 illustrate other views of the system 100. Many of the features and components of the system 100 described above with respect to FIG. 2 may be further seen in FIGS. 3-7. In particular, FIGS. 3 and 4 show a front side and a rear side, respectively, of the system 100. FIG. 4 shows a rear panel 240 that covers a rear portion of the beverage brewing machine 110. FIGS. 5 and 6 illustrate a right side and a left side, respectively, of the system 100. FIG. 5 shows a right side panel 202 that covers a right side of the brewing machine 110, and FIG. 6 shows a left side panel 204 that covers a left side of the brewing machine 110. FIG. 7 shows a top view of the system 100, which illustrates how the hoppers 410 may be oriented, in some embodiments, with respect to the grinder plate assembly 400.

Turning to FIG. 8, an embodiment of the grinder plate assembly 400 of the brewing machine 110 is shown. The grinder plate assembly 400 comprises a base plate 430 that supports each hopper and grinder subassembly 402. The hopper and grinder subassembly 402 comprises a grinding mechanism 420 attached to the base plate 430. A support plate 404 supports the hopper 410 and a chute portion 412 of the hopper 410 interacts with the grinding mechanism 420 to deliver coffee beans to the grinding mechanism 420. A fan 440 is attached to base plate 430 and is disposed on the underside of the base plate 430. The fan 440 may interact with an upper subassembly 800 of the brew module 500 to provide airflow to a baffle device 860. The brew module 500 is described below in connection with FIGS. 9-14, and the upper subassembly 800 and baffle device 860 are described below in connection with FIGS. 20-22.

Other embodiments of the system 100 may comprise different configurations of components of the system 100, such as different configurations of the beverage brewing machine 110, the grinder plate assembly 400, the brew module 500, and the upper subassembly 800. Other embodiments of the grinder plate assembly 400 may comprise different configurations and components. In addition, one or more of the embodiments of the system 1000 and/or the beverage brewing machine 1010 illustrated in FIGS. 23-42 may also include a grinder plate assembly with similar structure and function as the grinder plate assembly 400 illustrated, for example, in FIGS. 2 and 8.

In the embodiment illustrated in FIG. 8, the grinder plate assembly 400 has six hoppers 410, six grinding mechanisms 420, and six fans 440. However, other embodiments may include less or more hoppers 410, grinding mechanisms 420, and/or fans 440. For example, other embodiments may comprise a grinder plate assembly with four hoppers 410, four grinding mechanisms 420, and four fans 440. In some embodiments, the grinder plate assembly does not have the same number of hoppers 410, grinding mechanisms 420, and/or fans 440. For example, in one such embodiment, the grinder plate assembly 400 could include four hoppers 410, more or less than four grinding mechanisms 420, and more or less than four fans 440. In some embodiments, coupling between the grinding mechanisms 420 and the brew groups 500 may be less direct and not in a one-to-one relationship. In some embodiments, a single fan may provide sufficient airflow to, or within, the system 100.

In some embodiments, the grinder mechanism 420 comprises a stopping mechanism. In one embodiment, the stopping mechanism comprises a disc brake. The stopping mechanism may control the spin-down of grinder components. The stopping mechanism is configured to provide highly-accurate, timed whole bean dosing to the brew module 500. In other embodiments, one or more hoppers and/or the grinding mechanism are configured to provide volumetric dosing instead of, or in addition to, timed dosing. Controlled dosing may provide a repeatable and consistent amount of beans and/or grounds during the brewing process.

Figure 10:
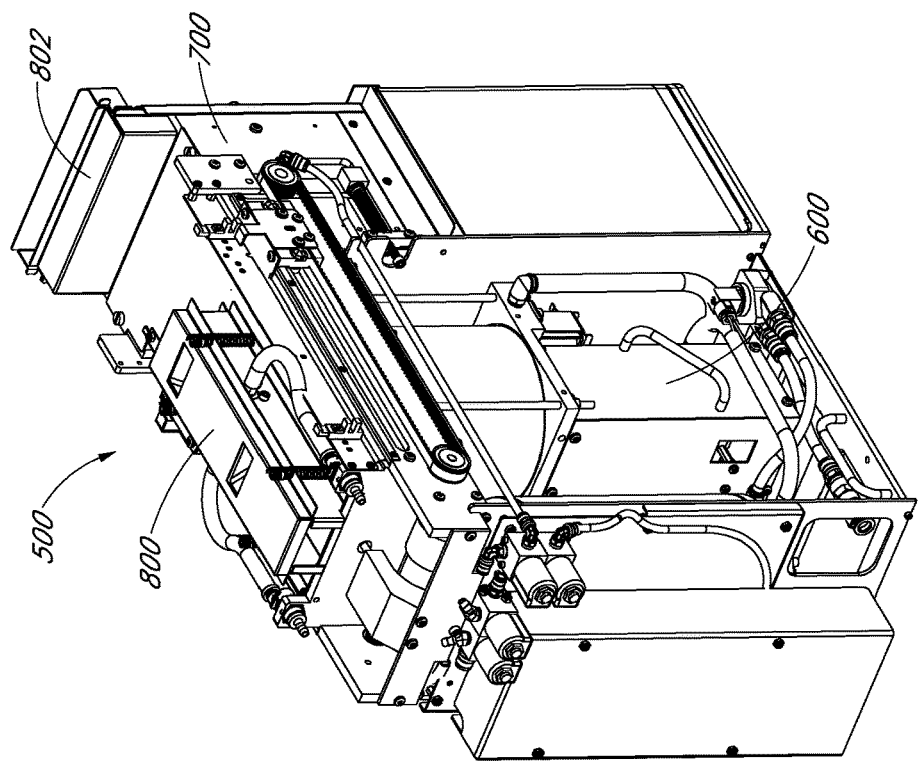
FIG. 10 is a rear perspective view of the brew module of FIG. 9.
Figure 9:
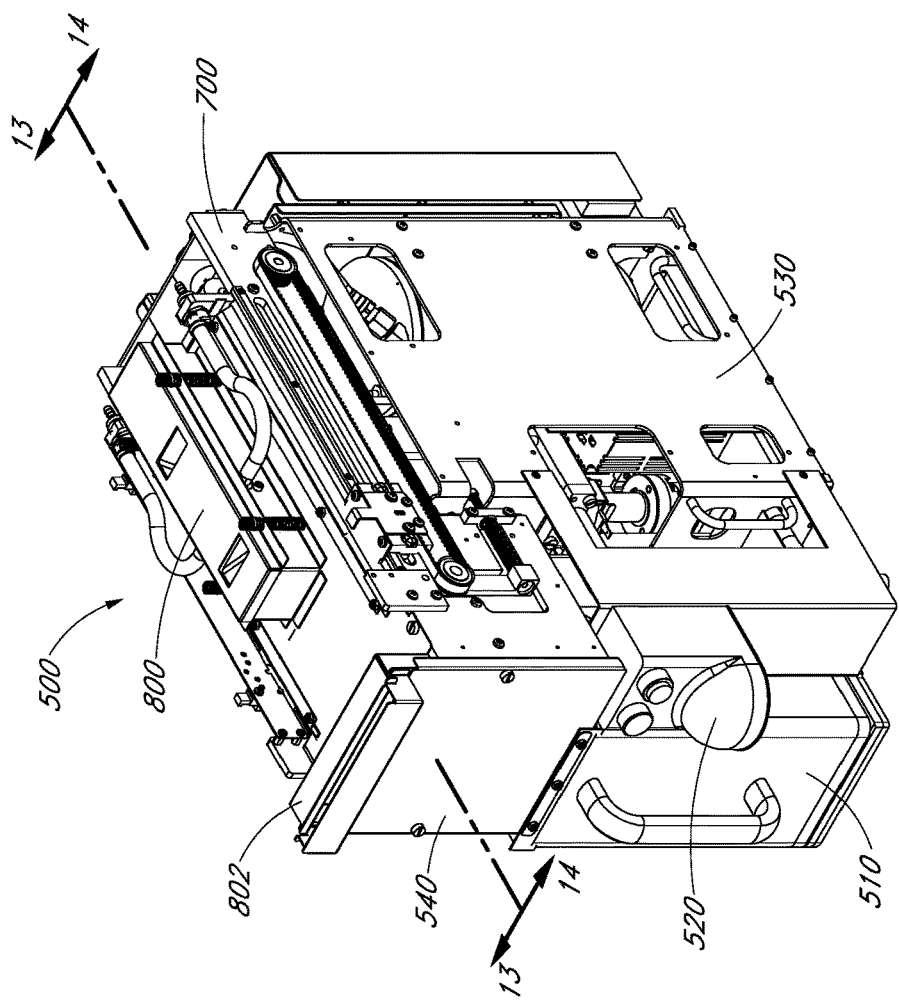
FIG. 9 is a front perspective view of an embodiment of a brew module of the system of FIG. 2.

FIGS. 9-14 illustrate an embodiment of a brew module 500. With reference to FIGS. 9 and 10, the brew module 500 comprises an interior subassembly 600, a wiper assembly 700, and an upper subassembly 800. The upper subassembly 800 is configured to receive coffee grounds from a hopper 410 (shown in FIG. 2) and deliver the grounds to the interior subassembly 600 for brewing a single-cup portion of coffee. The wiper assembly 700 is configured to interact with the interior subassembly 600 to clean components of the brew module 500. For example, the wiper assembly 700 may clean components of the interior subassembly 600 between brewing cycles. One or more of the embodiments of the system 1000 and/or the beverage brewing machine 1010 illustrated in FIGS. 23-42 may also include an interior subassembly, a wiper assembly, and an upper subassembly with similar structure and function as the interior subassembly 600, the wiper assembly 700, and the upper subassembly 800 illustrated, for example, in FIGS. 9-14.

The brew module 500 may also include a waste bin 510 that collects used coffee grounds and other waste. The waste bin 510 preferably allows a barista to remove the bin 510 from the brew module 500 to easily dispose of its contents. The waste bin 510 is illustrated near a front portion of the brew module 500. A dispenser 520 to dispense coffee is also shown on a front portion of the brew module 520. The brew module 500 may also include a side cover 530 to cover a right side of the brew module 500 and a front cover 540 to cover an upper front portion of the brew module 500. In some embodiments, the brew module 500 comprises an inner vent feature 802 that interacts with the outer vent feature 401 (see FIG. 2) of the brewing machine 110 to permit steam generated during a brew cycle to vent from the brewing machine 110 and into the surrounding environment. One or more of the embodiments of the brew module 1050 illustrated, for example, in FIGS. 23-33 may also include an inner vent feature and an outer vent feature similar in structure and function to the inner vent feature 802 and the outer vent feature 401 described above with respect to FIGS. 9-14. Other embodiments of the brew module 500 may comprise different configurations and components.

Figure 13:
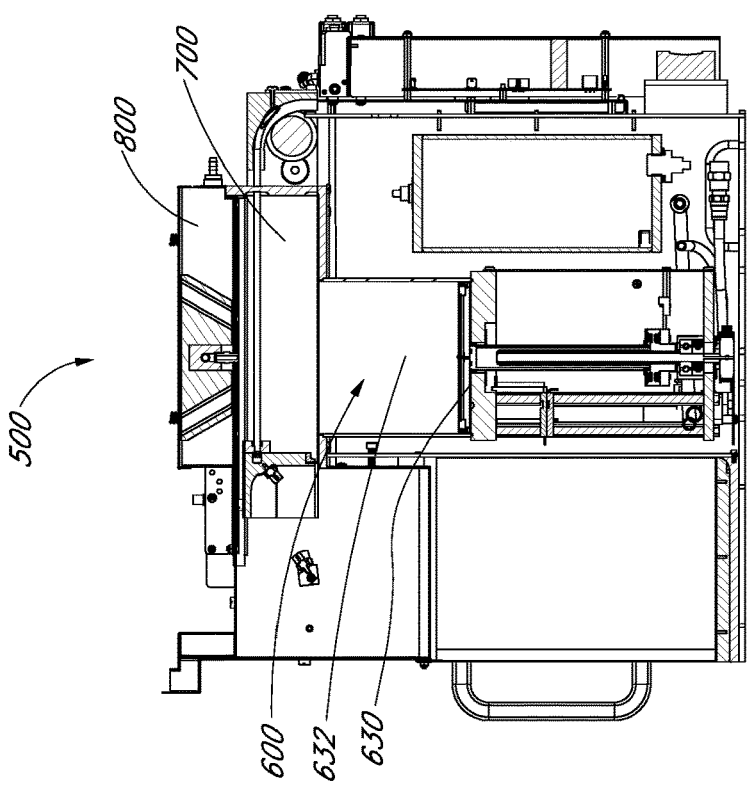
FIG. 13 is a cross-sectional view of the brew module of FIG. 9 taken along the line 13-13 of FIG. 9 (e.g., a cross-sectional view from the perspective of one oriented in a position in the general direction of the arrows designated 13).

The components described above are further illustrated in FIGS. 11-14. For example, FIGS. 11 and 12 show left side and right side views, respectively, of the brew module 500. FIGS. 13 and 14 show cross-sectional views of the brew module 500 taken along the lines 13-13 and 14-14, respectively, of FIG. 9. FIGS. 13 and 14 show certain interior components and features of the brew module 500, such as a piston 630 disposed near a lower portion of a piston chamber 632.

FIG. 15 illustrates an embodiment of an interior subassembly 600 of a brew module 500. The interior subassembly 600 may comprise a lower portion 610 and an upper portion 620. The lower portion 610 includes a first support surface 612 that is attached to a lower portion of the brew module 500 to secure the interior subassembly 600 to the brew module 500. The lower portion 610 also includes a second support surface 614 to support components of the upper portion 620 of the interior subassembly 600. The upper portion 620 may include a piston housing 622 that houses a piston 630 (shown in FIGS. 13 and 14). The piston housing 622 extends from the second support surface 614 to a third support surface 624. The third support surface 624 defines an opening 626. The piston housing 622 defines a hollow piston chamber 632 (shown in FIGS. 13 and 14) to allow the piston 630 to translate vertically and extend above the piston housing 622 and third support surface 624. The third support surface 624 may also interact with a wiper assembly 700 (which is described in more detail below). Other embodiments of the interior subassembly 500 may comprise different configurations and components.

FIGS. 16-19 illustrate an embodiment of a wiper assembly 700 of a brew module 500. The wiper assembly 700 may include one or more fan sprays attached to a moving filter wiper to pressure wash the filter either after or during a primary wipe that disposes of used coffee grounds. In particular, the wiper assembly 700 can mechanically clear the bulk of used coffee grounds and a pressure washer system may spray off remaining fine grinds, oils, and other unwanted substances. The used coffee grounds can be directed into a waste bin for easy removal by a user. One or more of the embodiments of the system 1000 and/or the beverage brewing machine 1010 illustrated in FIGS. 23-42 may also include a wiper assembly similar in structure and function to the wiper assembly 700 illustrated, for example, in FIGS. 16-19.

In some embodiments, hot water is used to remove fine grinds, oils, and/or unwanted substances. Hot water typically is better for breaking down oils than cold water. However, hot water may require more power to heat the water. In some embodiments, cold water may be used to remove fine grinds, oils, and/or unwanted substances to improve efficient use of power by the system 100.

Figure 16:
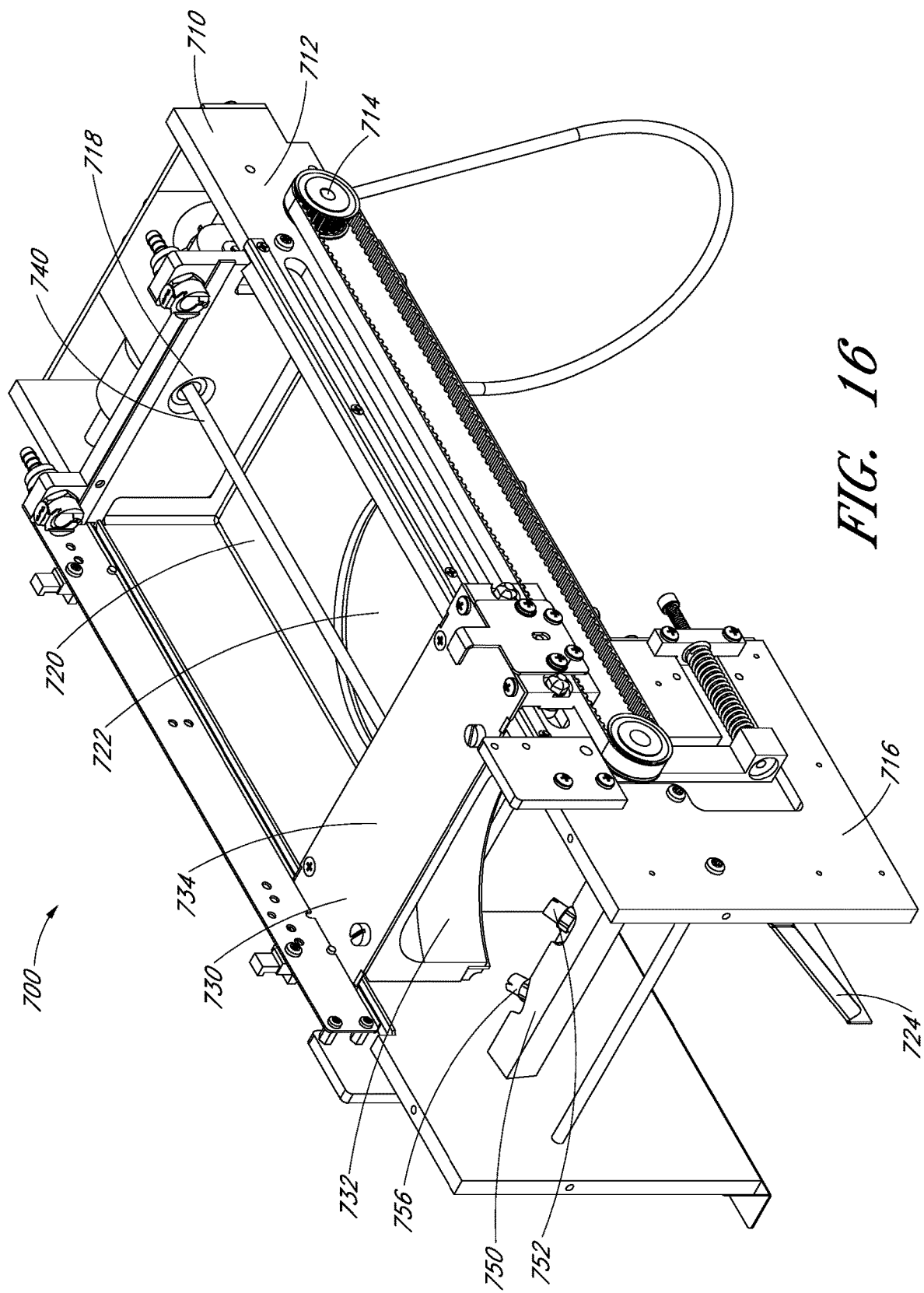
FIG. 16 is a front perspective view of an embodiment of a wiper assembly of the brew module of FIG. 9.
Figure 17:
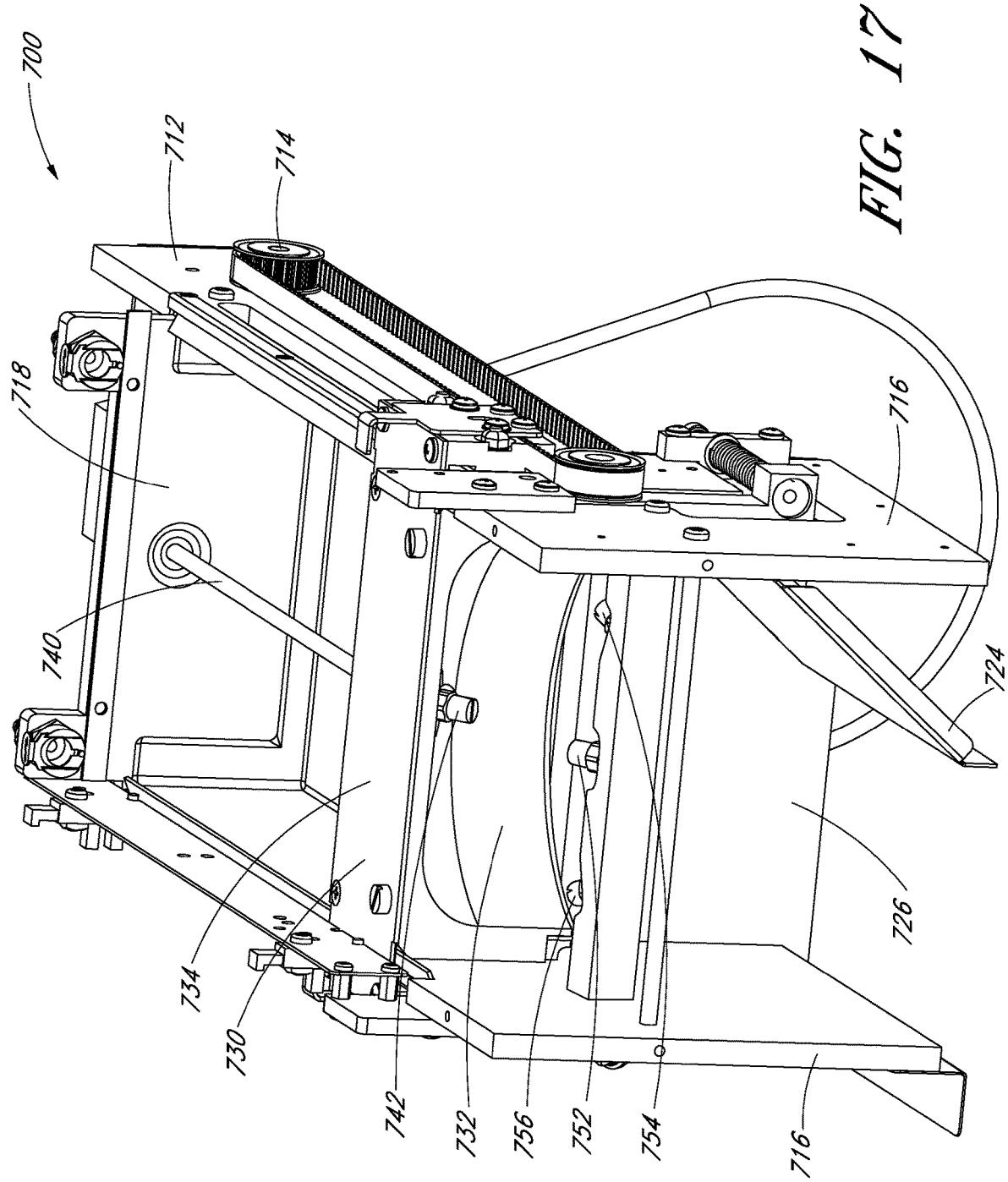
FIG. 17 is a slanted front perspective view of the wiper assembly of FIG. 16 showing four nozzles of the wiper assembly.

With reference to FIGS. 16 and 17, the wiper assembly 700 comprises a frame 710, a wiper mechanism 730, a first spray feature 740, and a second spray feature 750. The frame 710 includes a first sidewall 712 having a first belt assembly 714. The belt assembly 714 extends from a portion of the frame 710 near a distal wall 718 to a portion of the frame 710 near a proximal wall 726 (which may be seen in FIG. 17). The frame 710 also includes a base portion 720 that defines an opening 722. The opening 722 is configured to allow the piston 630 (which may be seen in FIGS. 13 and 14) to pass therethrough. The frame 710 comprises a front portion 716 that includes a deflector 724. The deflector 724 is configured to direct waste toward the waste bin 510 (which may be seen in FIG. 9) and may protect certain components of the brew module 500, such as electronic components. The illustrated embodiment is shown having two sidewalls and two belt assemblies, each disposed on opposing sides of the frame 710. In particular, FIG. 18 shows a second sidewall 713 and a second belt assembly 715 on an opposing side of the frame 710 from the first sidewall 712 and first belt assembly 714. The belt assemblies 714, 715 may comprise timing belts.

Returning to FIGS. 16 and 17, the wiper mechanism 730 comprises an upper portion 734 and a plow 732 attached to the upper portion 734. The wiping portion 734 is configured to contact an upper surface of the base portion 720 to wipe and clean the base portion 720 and other components of the brew module 500. The first spray feature 740 extends from the distal wall 718 to the wiper mechanism 730. The first spray feature 740 may extend through a portion of the wiper mechanism 730. The first spray feature 740 also may include a nozzle 742 that is directed away from the distal wall 718 of the frame 710 (see FIG. 17). The second spray feature 750 may comprise a structure that extends between walls of a front portion 716 of the wiper mechanism 730. In one embodiment, the second spray feature 750 includes three nozzles. The nozzles may comprise a central nozzle 752, a right nozzle 754, and a left nozzle 756. The nozzles 752, 754, 756 of the second spray feature 750 may be directed generally toward a distal wall 718 of the frame 710. In the illustrated embodiment, the nozzles 752, 754, 756 of the second spray feature 750 are configured in a direction generally opposite from the direction of the nozzle 742 of the first spray feature 740. FIGS. 18 and 19 show a rear perspective view and a right side view, respectively, of the wiper mechanism 730. Other embodiments of the wiper assembly 700 may comprise different configurations and components.

The operation of the wiper assembly 700 will now be described with references to FIGS. 16-19. In one embodiment, as described below, the wiper mechanism 730 passes the opening 722 four times in a complete cycle. The wiper mechanism 730 begins in a first position near the distal wall 718 of the frame 710. The wiper mechanism 730 is not shown in this position in the drawings. After the beverage brewing machine 110 brews a single-cup portion of coffee, the piston 630 (show in FIGS. 13 and 14) can raise to provide used coffee grounds to the wiper assembly 700. The coffee grounds can extend upward through the opening 722 of the base portion 720. The wiper mechanism 730 may be actuated such that the belt assemblies 714, 715 activate to move the wiper mechanism 730 linearly toward a front portion 716 of the wiper assembly 700. As the wiper mechanism 730 passes through the exposed coffee grounds, the plow 732 collects coffee grounds and directs them toward the deflector 724 and waste bin 510 (see FIG. 9). The wiper mechanism 730 continues to move toward the front portion 716 until it reaches a second position near the front portion 716 of the wiper assembly 700. FIGS. 16-19 show the wiper mechanism 730 disposed near this second position.

After the wiper mechanism 730 has reached the second position, it will have mechanically moved much of the used coffee grounds and unwanted materials from the piston and filter to the waste bin. The second spray feature 750 may activate such that one, some, or all of the central nozzle 752, right nozzle 754, and left nozzle 756 spray a cleaning fluid, such as water, toward the wiper mechanism 730 to clean grounds and debris from wiper mechanism 730. At this point, the piston lowers slightly before or during retraction of the wiper mechanism 730 to avoid dirtying a rear portion of the wiper mechanism 730 with the piston 630, which has not yet been pressure washed. In one embodiment, the piston 630 lowers so that it is not elevated above the opening 722 of the base portion 720. The wiper mechanism 730 may then linearly translate from the second position near the front portion 716 to the first position near the distal wall 718. At this point, the cleaning cycle is approximately halfway complete.

Once the wiper mechanism 730 reaches a retracted position, the piston 630 raises to flush again for a secondary spray wash. For example, when the wiper mechanism 730 has returned to the first position near the distal wall 718, the first spray feature 740 may activate such that it directs a cleaning fluid, such as water, out of the nozzle 742. The nozzle 742 may direct the cleaning fluid across the base portion 720 and piston 630 toward the front portion 716 of the wiper assembly 700. This step is intended to remove remaining debris from the wiper assembly 700. For example, the first spray feature 740 may serve as a pressure washer to sufficiently clean exposed surfaces of the wiper assembly 700. In some embodiments, the first spray feature 740 may also activate during the previous step described above where the plow 732 mechanically clears the bulk of the used coffee grounds.

After the first spray feature 740 activates and sprays the piston, filter, and surrounding surfaces, the wiper mechanism 730 may once again move from the first position to the second position. Such movement causes the plow 732 to push and direct remaining unwanted grounds, oils, and excess water toward the waste bin. Finally, the wiper mechanism 730 moves from the second position near the front portion 716 back to its original position near the distal wall 718. A two-step process involving mechanically removing the bulk of the grinds in one step and then using the first spray feature 740 to clear remaining grounds in a second step has been found to be advantageous in some applications because, among other reasons, such a process results in less waste water than a single-step cleaning process employing only a spraying step. Other embodiments of the wiper assembly 700 may comprise different configurations and components. One or more of the embodiments of the system 1000 and/or the beverage brewing machine 1010 illustrated in FIGS. 23-42 may include a wiper assembly having an operation similar to the wiper assembly 700 described above with reference to FIGS. 16-19.

FIGS. 20-22 illustrate an embodiment of an upper subassembly 800 of a brew module 500. The upper assembly 800 includes a baffle device 860 that is configured to provide a positive pressure inlet at or near a coffee grounds outlet to prevent steam and condensation from rising and entering the hoppers and/or grinders. When moisture enters the hoppers and/or grinders, it may interact with whole or partial coffee beans and negatively affect the quality of the beans, the operation of the grinder and the brewing machine, and the quality of ground coffee. By suspending a baffle device 860, air may flow across a lower portion of the upper subassembly 800 to, for example, reduce wicking of moisture. A fan 440 of the grinder plate assembly 400 (see FIG. 8) may interact with the upper subassembly 800 to provide such airflow to the baffle device 860. In some embodiments, the baffle device 860 is configured to minimize damage or corrosion of the grinder motor and burrs from moisture and/or steam. In addition, the baffle device 860 may be configured to prevent the grounds chute from becoming wet and sticky and retaining accumulated and unwanted coffee grounds. One or more of the embodiments of the system 1000 and/or the beverage brewing machine 1010 illustrated in FIGS. 23-42 may include a baffle device having similar structure and function as the baffle device 860 illustrated, for example, in FIGS. 20-22 and described herein.

The fan 440 may provide airflow about the baffle device 860 to reduce condensation that accumulates on surfaces of the baffle device 860 and to prevent steam and moisture from rising and contacting coffee beans. In some embodiments, airflow is provided from outside the beverage brewing machine 110. In other embodiments, airflow is provided from inside the beverage brewing machine 110, such as from inside a chassis of the machine 110. In some embodiments, airflow may be provided from both outside and inside the beverage brewing machine 110. In some embodiments, it is advantageous to pull air from inside the chassis of the machine 110 because the machine 110 may consume up to approximately 10 kW of power during the brewing process and, as a result, the machine 110 may become relatively hot. Thus, the airflow may also cool components of the machine 110 when pulled from inside the machine 110. In addition, providing air from outside the machine 110, such as by blowing ambient air through the brew group 500, tends to cool the water and brew cylinder as it flows through the brew group 500. In some applications, it is preferable to maintain a higher temperature inside the brew chamber.

With reference to FIGS. 20-22, the upper assembly 800 comprises a baffle housing 820 attached to a base plate 810. The baffle housing 820 includes a base portion 822 and a cover 824. The baffle housing 820 houses a baffle device 860, which is shown in FIGS. 21 and 22. In one embodiment, the baffle device 860 is attached to a support member 870 of the baffle housing 820 such that the baffle device 860 is suspended with respect to the base plate 810. For example, the baffle device 860 does not directly contact the base plate 810 and may be elevated a certain distance with respect to the base plate 810. The cover 824 of the baffle housing 820 can define a first upper opening 840 and a second upper opening 850. The first upper opening 840 and the second upper opening 850 each are configured to receive coffee grounds from a hopper 410 (shown in FIG. 2).

The upper subassembly 800 may also include a first hose 830 and a second hose 832 for providing hot liquid through a portion of the baffle device 860 and then to a portion of the interior subassembly 600 (see FIG. 15) for interacting with coffee grounds to brew coffee. The upper subassembly 800 may also include one or more springs 826 that interact with the baffle housing. The springs 826 may engage with a portion of the grinder plate assembly 400 (see FIG. 8) such that the cover 824 of the baffle housing 820 mates with a portion of the grinder plate assembly 400.

With reference to FIG. 21, the baffle device 860 defines a first channel 842 that extends from the first upper opening 840 near an upper portion of the baffle device 860 to a first lower opening 844 near a lower portion of the baffle device 860. The baffle device 860 also defines a second channel 852 that extends from the second upper opening 850 to the second lower opening 854. The channels 840, 850 are configured to direct coffee beans through the baffle device 860 and out of the first lower opening 844 and second lower opening 854, respectively, to the coffee filter and piston of the brew module 500.

The baffle device 860 defines a first outer sloped surface 846 and a second outer sloped surface 856. The outer sloped surfaces 846, 856 are generally configured to direct airflow downward toward a lower portion of the baffle device 860. The baffle device 860 includes a proximal end 829 near the second outer sloped surface 856. The proximal end 829 includes a wall that generally closes that end of the baffle device 860. In contrast, in some embodiments, as described in more detail below, the distal end 827 of the baffle device 860 includes an opening 828 to allow air to pass therethrough.

With reference primarily to FIGS. 20 and 21, the baffle housing 820 also includes a distal end 827 that is configured to be disposed near a rear portion of the brew module 500. The distal end 827 defines an opening 828. When a fan 440 of the grinder plate assembly 400 (see FIG. 8) interacts with the upper subassembly 800, the fan 440 may deliver a current of air through the opening 828 toward the baffle device 860. After passing through the opening 828 in the distal end 827, the airflow travels generally toward the first outer sloped surface 846 of the baffle device 860. Because of the generally closed configuration of the baffle housing 820 (apart from the opening 828), the air is directed downward and out of the upper subassembly 800 through the first lower opening 844 and the second lower opening 854. In some embodiments, steam may exit the brewing machine to highlight the brewing process and the freshness of brewed coffee to customers and users. In addition, the steam may direct desirable brew chamber smells to customers and users. The steam may also provide a type of visual theater to enhance the atmosphere at, for example, a coffee shop setting by allowing users and/or customers to watch steam exit the brewing machine during a brew cycle.

FIGS. 22A and 22B show the baffle device 860 and portions of the upper subassembly 800 in greater detail. In the illustrated embodiment, a lower portion of the baffle device 828 is separated from and not in contact with a proximal portion 812 of the base plate 810. With reference to FIGS. 20-22, the upper subassembly 800 may include a support member 870 that supports the baffle device 860. The support member 870 extends from sidewalls of the base portion 822 of the baffle housing 820. The support member 870 defines a horizontal fluid opening 872. The first hose 830 and the second hose 832 engage the fluid opening 872 to deliver hot water through the baffle device 860. The horizontal fluid opening 872 leads to a vertical fluid opening 874 (see FIG. 21) so that water may be dispensed out of the upper subassembly 800. In some embodiments, the vertical fluid opening 874 includes two nozzles arranged at approximately 90 degrees with respect to each other to provide fan sprays of hot water to adequately cover a relatively large piston of the brew module 500. Proper fan spray coverage can result in complete, or near complete, wetting of the coffee grounds, which facilitates full extraction from the coffee grounds.

The support member 870 is configured to receive and support the baffle device 860. The baffle device 860 includes a recess in a central portion such that the baffle device 860 may rest on the support member 870. By positioning the baffle device 860 on the support member 870, the baffle device may be elevated with respect to the base plate 810 of the upper subassembly 800. Thus, the support member 870 serves as both a support for the baffle device 860 and as a manifold to deliver hot water to internal components of the brew module 500. Other embodiments of the upper subassembly 800 and/or the baffle device 860 may comprise different configurations and components than the illustrated embodiments described above.

Parallel dosing may refer to delivering hot water and coffee grounds simultaneously to a piston and filter for brewing coffee. A problem with parallel dosing sometimes occurs because providing hot water through internal components of a coffee brewing machine typically results in significant condensation on surfaces of internal components of the machine. Such condensation may result in wet coffee grounds near openings and orifices of the machine and may create a dense, tar-like accumulation of wet coffee grounds. Such build-up may block passageways and openings of the coffee brewing machine and affect the performance of the machine by slowing down the brew cycle and impairing the quality of the brewed coffee.

One advantage of the upper subassembly described above is that it allows a brewing machine to conduct parallel dosing of coffee grounds and hot water to brew coffee without negatively affecting the quality of the coffee or performance of the machine. That is, the machine may deliver hot water and coffee grounds simultaneously to a piston and filter for brewing. This results in a faster brew cycle and reduces the time it takes to brew a single-portion cup of coffee. In addition, coffee grounds typically wet better when sprayed while airborne as opposed to when they are disposed in an accumulated mass on the piston and filter.

The upper subassembly 800 facilitates parallel dosing by providing airflow through the opening 828 in the distal end 827 of the baffle housing 820. The airflow is then directed toward the first outer sloped surface 846. The airflow tends to travel around outer surfaces of the baffle device 860. The suspended nature of the baffle device 860 allows airflow to travel easily about the baffle device 860. Such airflow about outer surfaces of the baffle device 860 reduces built-up moisture and condensation on those surfaces, essentially drying those surfaces and preventing steam and condensation from traveling upward toward the grinder components and coffee beans. The airflow is directed out of a lower portion of the upper subassembly 800 through a first opening 880 and a second opening 882 in the base plate 810 (see FIG. 22B).

Some of the features of embodiments of the system 1000 and/or brewing machine 1010 illustrated in FIGS. 23-49, and described in more detail below, may also facilitate parallel dosing during a brew cycle. For instance, embodiments of the chamber 1210, which is illustrated in FIGS. 35A and 35B, provide a structure that facilitates parallel dosing.

With reference to FIGS. 2 and 9, the coffee brewing machine 110 may also include an outer vent feature 401, and the brewing module 500 may include an inner vent feature

802. The inner vent feature 802 and the outer vent feature 401 may interact to allow steam and air generated during and after a brewing cycle to travel out of the brewing machine 110 and to be released into the surrounding environment. In the illustrated embodiment, the inner vent feature 802 and the outer vent feature 401 are disposed near a front portion of the brewing machine 100. One advantage of providing such vent features near a front portion of the machine 110 is that it provides both a pleasing visual appearance of rising steam and a desirable smell of coffee during and after the brewing process. Such pleasing appearance and desirable smell may enhance the atmosphere of a commercial establishment, such as a coffee shop, and may provide visual theater to a customer. The vent features are configured to allow steam to highlight the activity of the brewing machine and the freshness of the brewed beverage.

In some embodiments not illustrated in the drawings, the system 100 for brewing a beverage may include an apparatus to lower the hoppers 410 so that the hoppers 410 may be refilled easily by a user. For example, the system 100 may include an apparatus that allows translation of the hopper 410 without disassembly to relocate the hopper 410 to a more serviceable location. In some embodiments, the apparatus may comprise a handle in communication with a structure that rotates about one or more pivot points to lower an assembly containing the hoppers 410. In the same or other embodiments, the apparatus may comprise a handle that includes a structure, such as a four-bar linkage, that allows movement in two stages. In the first stage, the handle may allow translation of the frame generally laterally outward from the brewing machine so that it clears an upper surface of the machine. At this point, gates on the machine may activate to close ports to the grinders. In the second stage, the handle may allow translation of the frame in a generally downward direction. In one embodiment, the handle allows movement of the hoppers to the front of the brewing machine. In other embodiments, the handle may be configured to allow movement of the hoppers to the side or rear of the brewing machine.

Advantageously, the apparatus may reduce the labor and time involved in maintaining the hoppers 410 and refilling the hoppers 410 with coffee beans. The hoppers 410 normally are disposed at a relatively high elevation with respect to the ground and it may be difficult for a barista to refill the hoppers 410. Such a handle apparatus may reduce or eliminate the need for a barista to use a ladder or stepstool to refill the hoppers 410 or to otherwise expend significant effort to maintain the hoppers 410. Some users or operators empty and clean hoppers on a daily basis, or even multiple times a day. Providing such an apparatus would significantly improve access to the hoppers for maintaining the hoppers.

FIGS. 23-49 illustrate additional embodiments of a system for brewing a beverage. The embodiments of FIGS. 23-49 are similar to the embodiments described above with respect to FIGS. 1-22. Unless indicated otherwise, some or all of the components, features, and/or advantages described above with respect to FIGS. 1-22 may be incorporated in any of the embodiments of FIGS. 23-49. Similarly, unless indicated otherwise, some or all of the components, features, and/or advantages described below with respect to FIGS. 23-49 may be incorporated in any of the embodiments of FIGS. 1-22.

FIG. 23 illustrates an embodiment of a system 1000 for brewing a beverage. In some embodiments, the system 1000 is configured to brew coffee. The system 1000 may include a beverage brewing machine 1010 that is configured to brew a single-cup portion of a beverage and/or a traveler size portion of a beverage. The beverage brewing machine 1010 comprises an outer cover 1020, a dispensing portion 1030, a doser assembly 1040, and three brew groups or modules 1050*a*, 1050*b*, 1050*c*. The outer cover 1020 may comprise separate outer covers such that each brew group or module has its own outer cover to substantially cover the beverage brewing machine 1010. In some embodiments, the outer cover 1020 may include a display screen configured to display data or information relating to the system 1000 for brewing a beverage. The outer cover 1020 may comprise a tool-less release mechanism such that the outer cover 1020 can be removed from the brewing machine 1010 without the use of additional components or tools. For example, a front portion of the cover 1020 may have a tool-less release mechanism to allow a user to easily and quickly remove the front portion of the cover 1020 to access interior components of one or more brew module 1050. The dispensing portion 1030 may include a surface 1060 to place a drinking receptacle, cup, mug, and/or a traveler container to receive and contain beverage brewed by the brewing machine 1010. In some embodiments, the beverage brewing machine 1010 is configured to interact with a plurality of hoppers 1070.

In some embodiments, the hoppers 1070, the doser assembly 1040, and grinding components of the beverage brewing machine 1010 are configured to interact with the brew modules 1050 to contain coffee beans, grind the beans, and provide coffee grounds to the brew modules 1050. The brew modules 1050 then brew coffee, such as a single-cup portion or a larger traveler-size portion, and automatically clean interior components of the brew modules 1050 to prepare for the next brew cycle. In some embodiments, the doser assembly 1040 of each brew module 1050 may be configured to interact with two hoppers 1070 such that beverage brewing machine 1010 includes a total of six hoppers 1070. In one embodiment, the hoppers 1070 of each brew module 1050 are configured to provide beans to a grinder of the brew module 1050 (the grinder is not shown in FIG. 23). The brew modules 1050 also include a dispenser 1032 to dispense the beverage into a drinking receptacle or container.

The beverage brewing machine 1010 may include one or more waste bins 1080 configured to easily remove used coffee grounds and other waste, such as excess water, from the brewing machine 1010. The waste bin 1080 may be disposed between adjacent brew modules 1050. For example, FIG. 23 shows a waste bin 1080*a* disposed between a left brew module 1050*a* and a center brew module 1050*b*. That figure also shows a waste bin 1080*a* disposed between a right brew module 1050*c* and a center brew module 1050*b*. The waste bins 1080*a*, 1080*b* preferably allow a barista to remove the bin from the brew module 1050 to easily dispose of its contents. The waste bins 1080*a*, 1080*b* are illustrated such that they may be accessed and removed from a front portion of the beverage brewing machine 1010. In other embodiments, however, one or more waste bins 1080 may be configured to be removed from a rear portion and/or a side portion of the beverage brewing machine 1010.

While the embodiment of FIG. 23 shows a system 1000 having three brew modules 1050 and six hoppers 1070, other configurations may be used. For example, the system 1000 may include more or less than three brew modules 1050. In addition, the brew modules 1050 may be configured to interact with more or less than two hoppers 1070, and each brew module does not necessarily need to interact with the same number of hoppers 1070 as other brew modules. In some embodiments, the brew modules communicate with one or more hoppers 1070 shared among some or all of the brew modules.

For example, and not by way of limitation, in one embodiment, the system 1000 comprises two brew modules 1050 and one or more shared hoppers 1070. In another embodiment, the system 1000 comprises two brew modules 1050 each having one hopper 1070. In another embodiment, the system 1000 comprises two brew modules 1050 each having two hoppers 1070. In another embodiment, the system 1000 comprises two brew modules 1050 each having between one and three hoppers 1070. In another embodiment, the system 1000 comprises three brew modules 1050 and one or more shared hoppers 1070. In another embodiment, the system 1000 comprises three brew modules 1050 each having one hopper 1070. In another embodiment, the system 1000 comprises three brew modules 1050 each having two hoppers 1070. In another embodiment, the system 1000 comprises three brew modules 1050 each having between one and three hoppers 1070. In another embodiment, the system 1000 comprises four brew modules 1050 and one or more shared hoppers 1070. In another embodiment, the system 1000 comprises four brew modules 1050 each having one hopper 1070. In another embodiment, the system 1000 comprises four brew modules 1050 each having two hoppers 1070. In another embodiment, the system 1000 comprises four brew modules 1050 each having three hoppers 1070. In another embodiment, the system 1000 comprises four brew modules 1050 each having between one and four hoppers 1070.

In one particular embodiment, the system 1000 is configured to grind, brew, and dispense a single-cup portion of coffee in approximately 30 seconds or less. The system may also be configured to automatically clean interior components of a brew module 1050 of the beverage brewing machine 1010 in approximately 30 seconds. For example, the system may complete a grind and brew cycle in approximately 26 seconds and dispense the coffee in approximately 4 seconds. The system may then automatically clean the brew module 1050 in approximately 30 seconds or less such that the total time for brewing and cleaning a single brew module is approximately 60 seconds or less. Existing brew processes for single-cup portions of coffee may take more than 60 seconds, and cleaning those machines between uses may take another 30-60 seconds or more. Thus, reducing the brew cycle time to approximately 30 seconds and the automatic cleaning time to approximately 30 seconds or less may result in a significant time savings to a user and customer. Moreover, having a beverage brewing machine 1010 configured to brew multiple single-cup portions of a beverage simultaneously using multiple brew groups 1050 results in additional efficiency and time savings to a user and customer.

Figure 25:
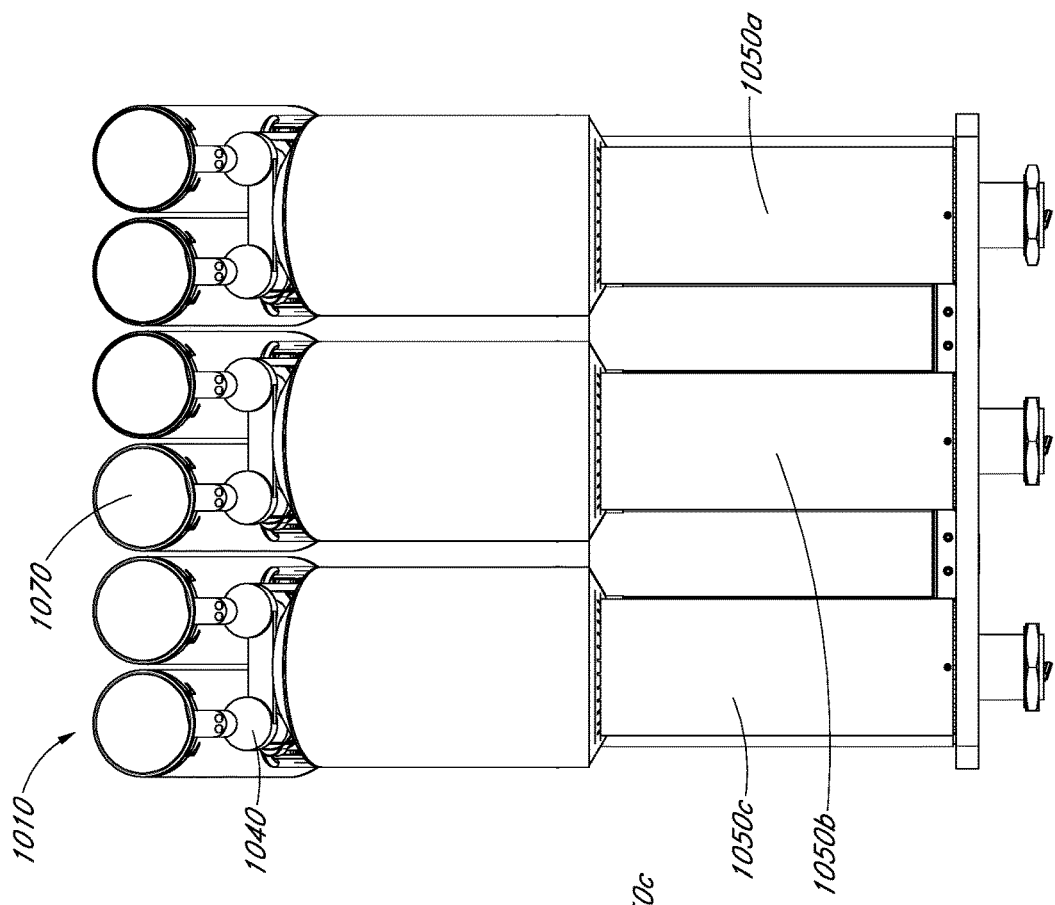
FIG. 25 is a rear side view of the system shown in FIG. 23.
Figure 24:
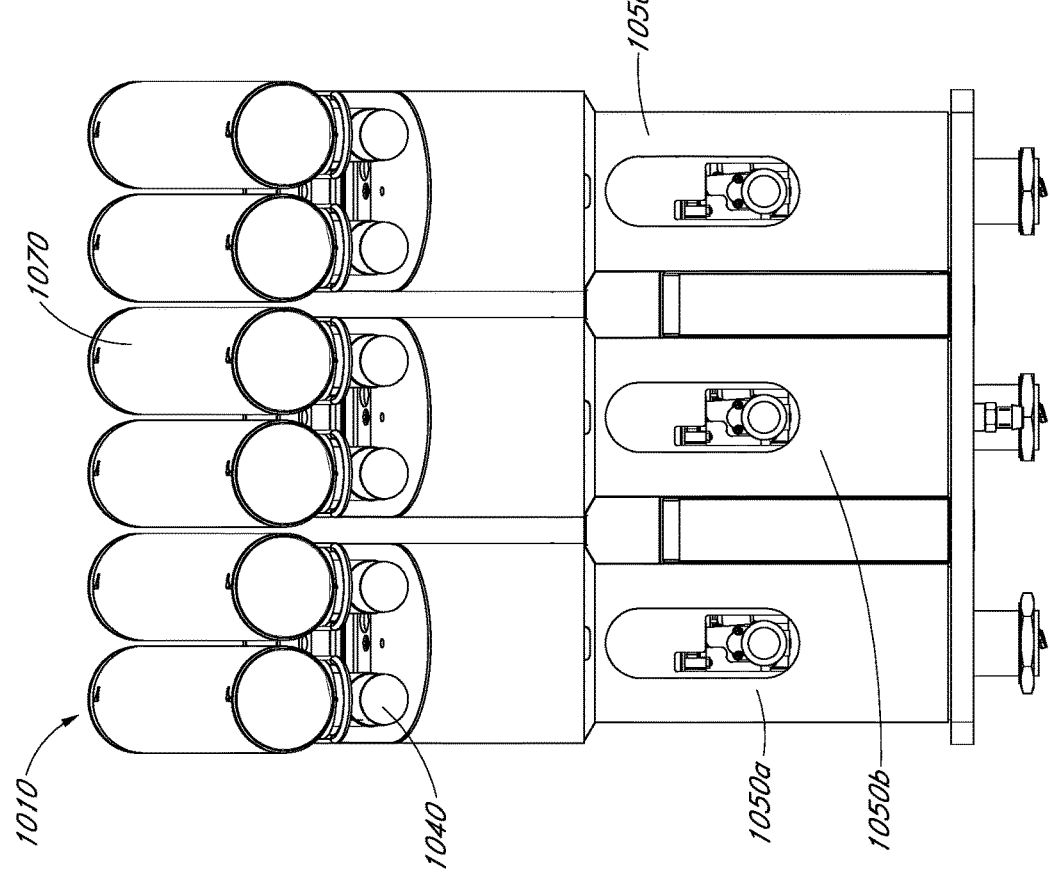
FIG. 24 is a front side view of the system shown in FIG. 23.
Figure 26:
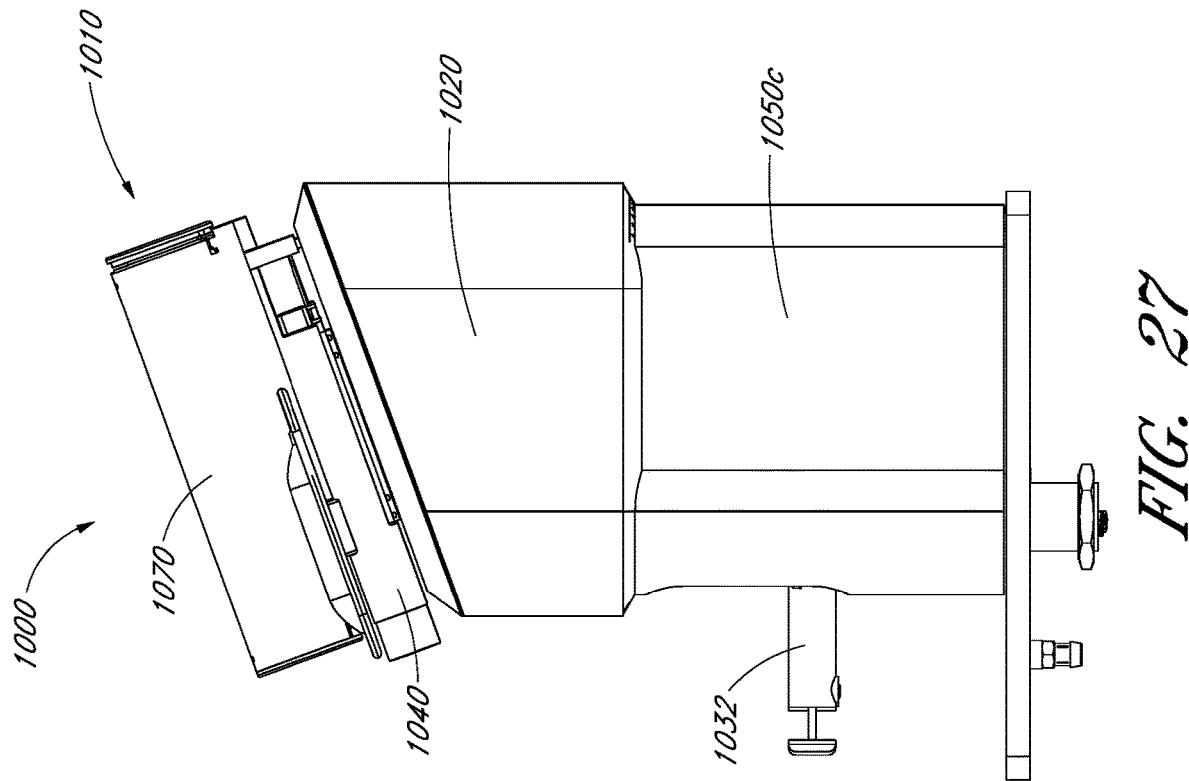
FIG. 26 is a left side view of the system shown in FIG. 23.
Figure 27:
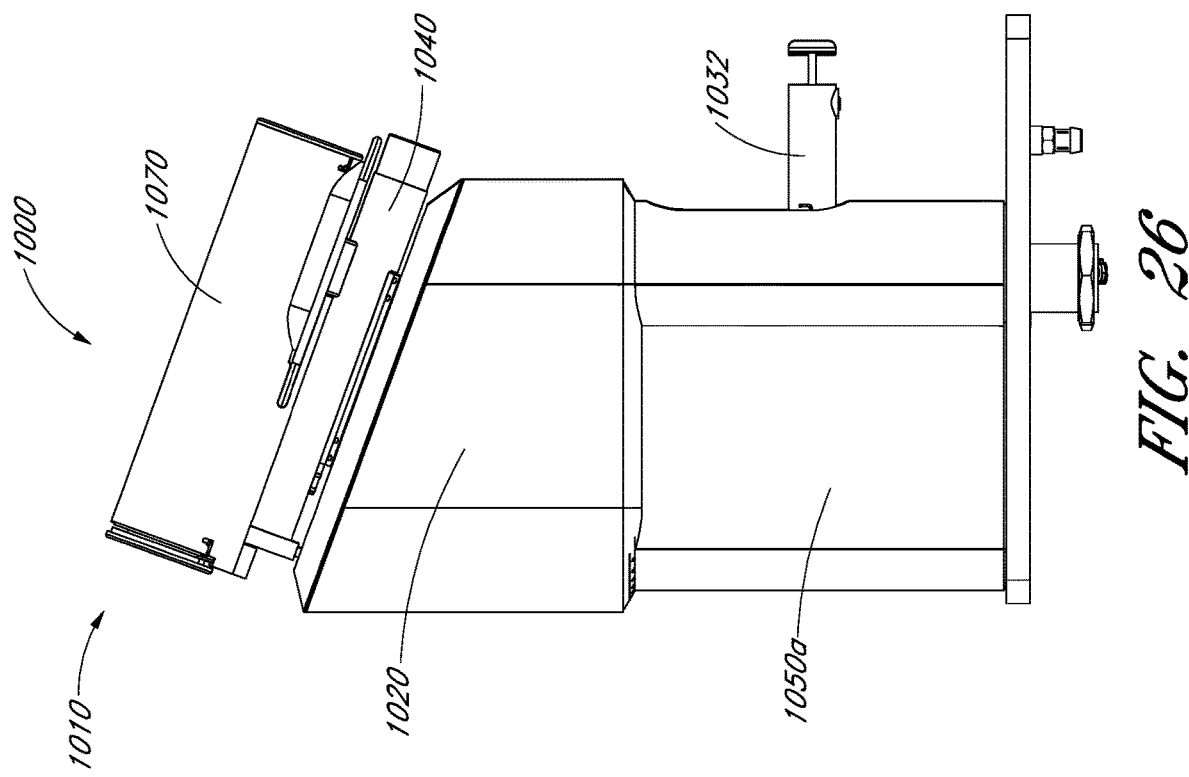
FIG. 27 is a right side view of the system shown in FIG. 23.
Figure 28:
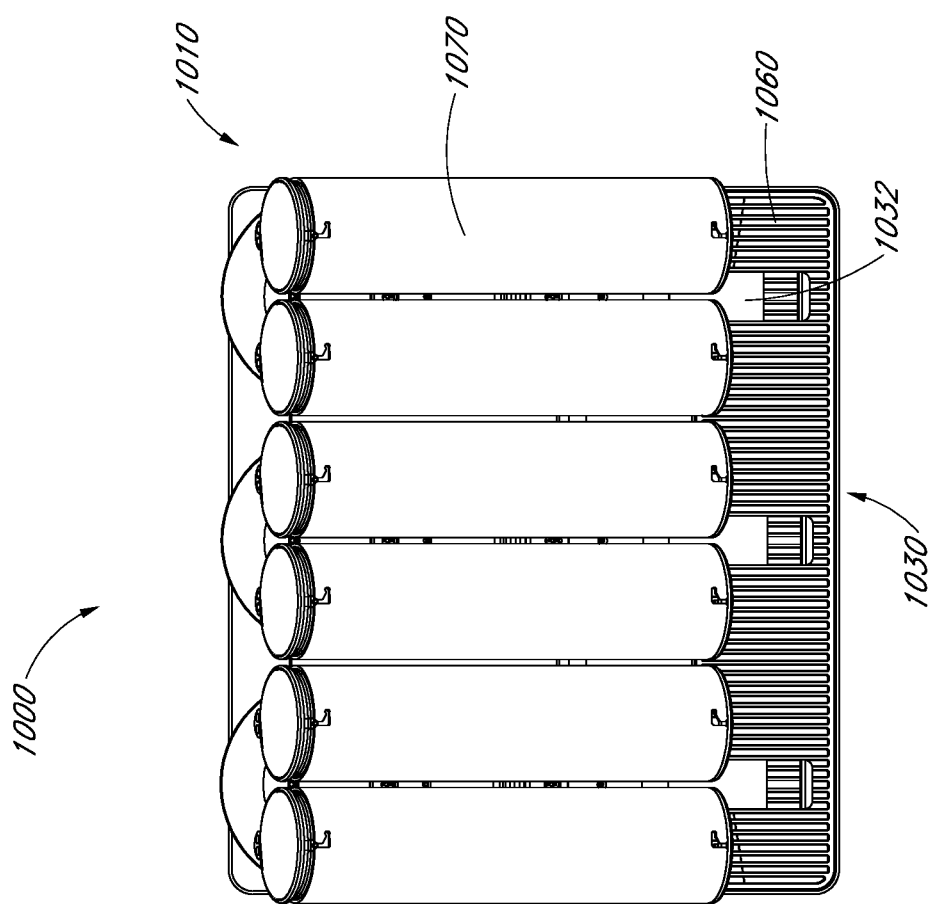
FIG. 28 is a top plan view of the system shown in FIG. 23.

FIGS. 24-28 illustrate other views of the system 1000 for brewing a beverage. Many of the features and components of the system 1000 described above with respect to FIG. 23 may be further seen in FIGS. 24-28. In particular, FIGS. 24 and 25 show a front side and a rear side, respectively, of the system 1000. FIGS. 26 and 27 illustrate a left side and a right side, respectively, of the system 1000. FIG. 28 shows a top view of the system 1000, which illustrates how the hoppers 1070 and/or the dispensers 1032 may be oriented, in some embodiments, with respect to the beverage brewing machine 1010.

Figure 29:
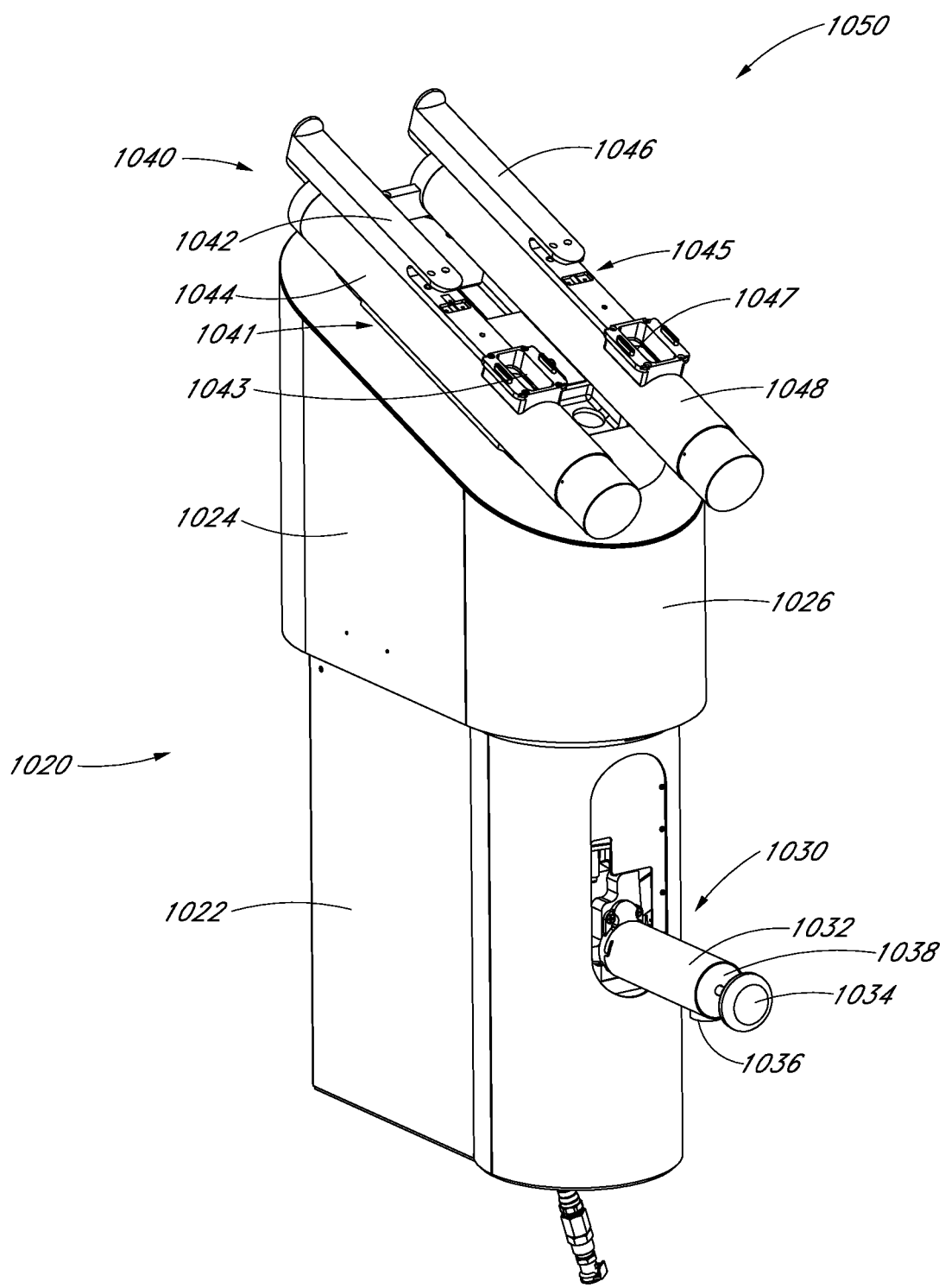
FIG. 29 is a front perspective view of an embodiment of a brew module of the system of FIG. 23.

FIG. 29 illustrates an embodiment of a brew module 1050 that may be used with the system 1000 for brewing a beverage. The brew module 1050 may comprise an outer cover 1020, a dispensing portion 1030, and a doser assembly 1040. The outer cover 1020 includes a first portion 1022 configured to cover a lower portion of the brew module 1050 and a second portion 1024 configured to cover an upper portion of the brew module 1050. The outer cover 1020 may also include a third portion 1026 that is configured to cover a front portion of the brew module 1050. In some embodiments, the outer cover 1020 may include a display screen configured to display data or information relating to the system 1000 for brewing a beverage. For example, the third portion 1026 of the outer cover 1020 may include a display screen disposed so that a user can easily interpret data or information and/or interact with the display screen.

The dispensing portion 1030 may be configured to provide a visual signal to a user to indicate when a brew cycle is complete and the brewing machine is ready to dispense a brewed beverage. The signal may be easily discernible by a user, such as a barista in a coffee shop setting. In some embodiments, the signal comprises a mechanical signal. For example, a control member, such as a button, that is disposed on an end of the dispensing portion may be in a retracted position when a beverage is being brewed and in an extended position when the brew cycle is complete and a beverage is ready to be dispensed. Advantageously, a user may easily and quickly recognize that the button is in an extended position without requiring the use of an electronic signal or display.

In some embodiments, as illustrated in FIG. 29, the dispensing portion 1030 may include a spout member 1032, a control member 1034, and a nozzle 1036. The spout member 1034 is configured to receive brewed beverage from a brewing area of the brew module 1050 and dispense the beverage through the nozzle 1036 to a container, such as a cup or mug. The control member 1034 may be in communication with a plunger that is configured to extend and retract the control member 1034 with respect to a distal end 1038 of the spout member 1032. In some embodiments, the control member 1034 comprises a button.

When the brew module 1050 is ready to brew a beverage, the control member 1034 may be in a retracted position such that the control member 1050 is disposed at or near the distal end 1038 of the spout member 1032. The plunger may be spring loaded and, for example, released by a solenoid when the brew cycle is complete or near complete. When the plunger is released, the control member 1034 extends from the spout member 1032. The control member 1034 may extend a certain distance from the spout member 1032 sufficient to enable a user to easily detect that the control member 1034 is in an extended position. The user may then dispense the dispense the beverage from the nozzle by, for example, pressing the control member 1034. After the user dispenses the beverage, the control member 1034 may stay in a retracted position until the next brew cycle is complete or near complete.

In the illustrated embodiment, the doser assembly 1040 comprises a first doser portion 1041 and a second doser portion 1045. The first doser portion 1041 and the second doser portion 1045 may be disposed in a generally side-by-side arrangement. The first doser portion 1041 comprises a first attachment member 1042, a first receiving portion 1043, and a first doser chamber 1044. Similarly, the second doser portion 1045 comprises a second attachment member 1046, a second receiving portion 1047, and a second doser chamber 1048. The first attachment member 1042 and the second attachment member 1046 may each be configured to be receive and secure a hopper 1070 (shown, for example, in FIG. 23) to the doser assembly 1040. The first receiving portion 1043 may define an opening such that a material, such as coffee beans, can be transferred from a hopper to the first doser chamber 1044. The second receiving portion 1047 may also define an opening such that a material, such as coffee beans, can be transferred from a hopper to the second doser chamber 1048. The first doser chamber 1044 and the second doser chamber 1048 are configured to provide a desired amount of material, such as coffee beans, from the doser assembly 1040 to grinder components of the brew module 1050 for grinding the material.

In some embodiments, the doser assembly 1040 is configured to provide volumetric dosing of a material instead of, or in addition to, timed dosing. Volumetric dosing refers to providing a desired amount of material based on the volume of the material. For example, a desired amount of coffee for a single-cup portion may be determined by providing a desired volume of coffee beans. Volumetric dosing may be provided by detecting the weight of the material and configuring the doser assembly 1040 to receive a quantity of material that is substantially equivalent to a desired weight. In some embodiments, the doser assembly 1040 is configured to receive a desired volume of coffee beans from one or more hoppers 1070. Volumetric dosing may also be provided by configuring the first doser portion 1041 so that its interior volume is limited and substantially matches a desired volume of material. The second doser portion 1045 can also be configured to have a limited interior volume. In some embodiments, volumetric dosing may provide more accurate and repeatable dosing than other methods of dosing of a material, such as, for example, timed dosing. Embodiments of a volumetric doser are discussed in more detail below with references to FIGS. 43-45.

Figure 30:
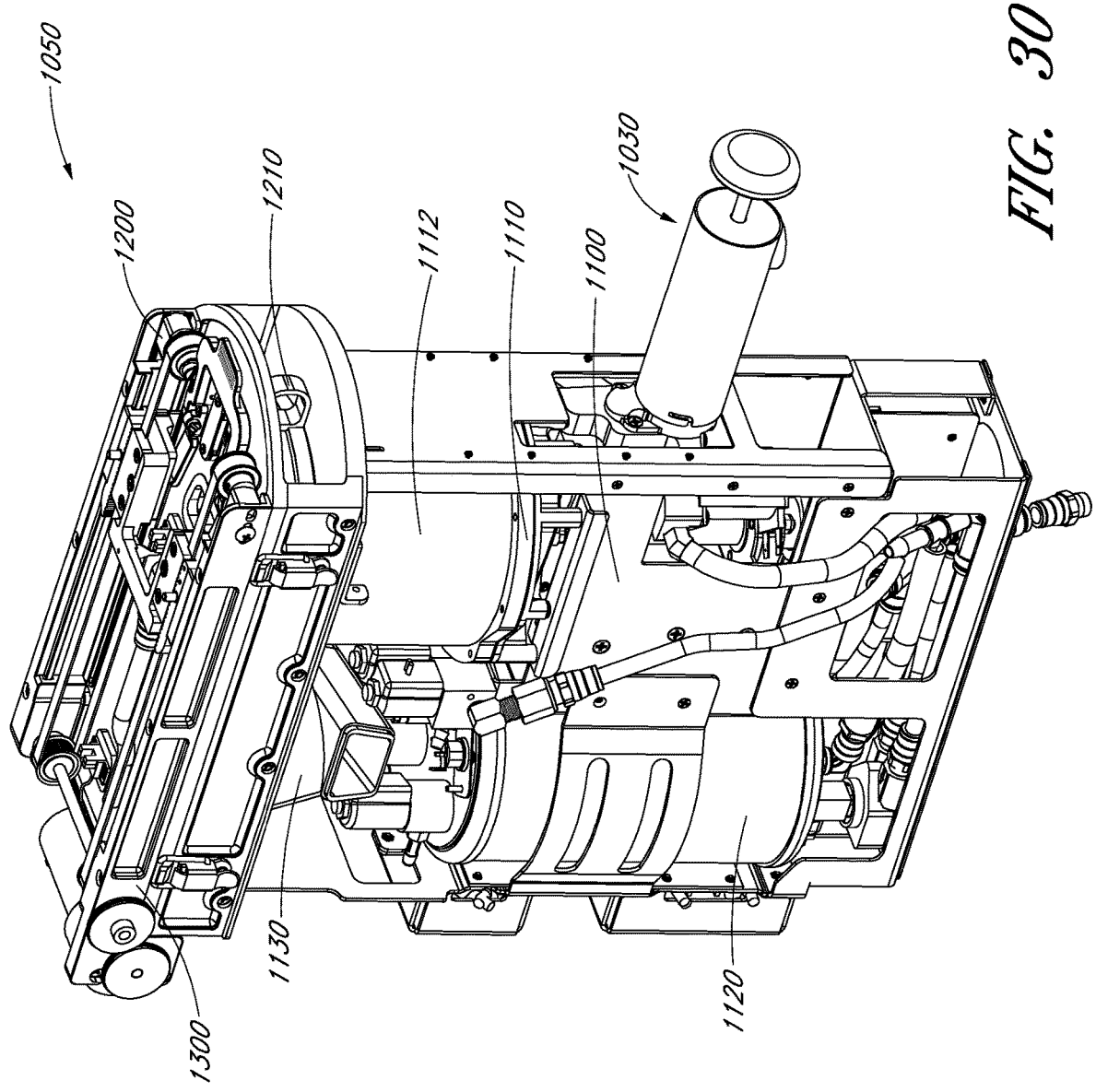
FIG. 30 is a front perspective view of an embodiment of a brew module of the system of FIG. 23 that shows interior components of the brew module.
Figure 31:
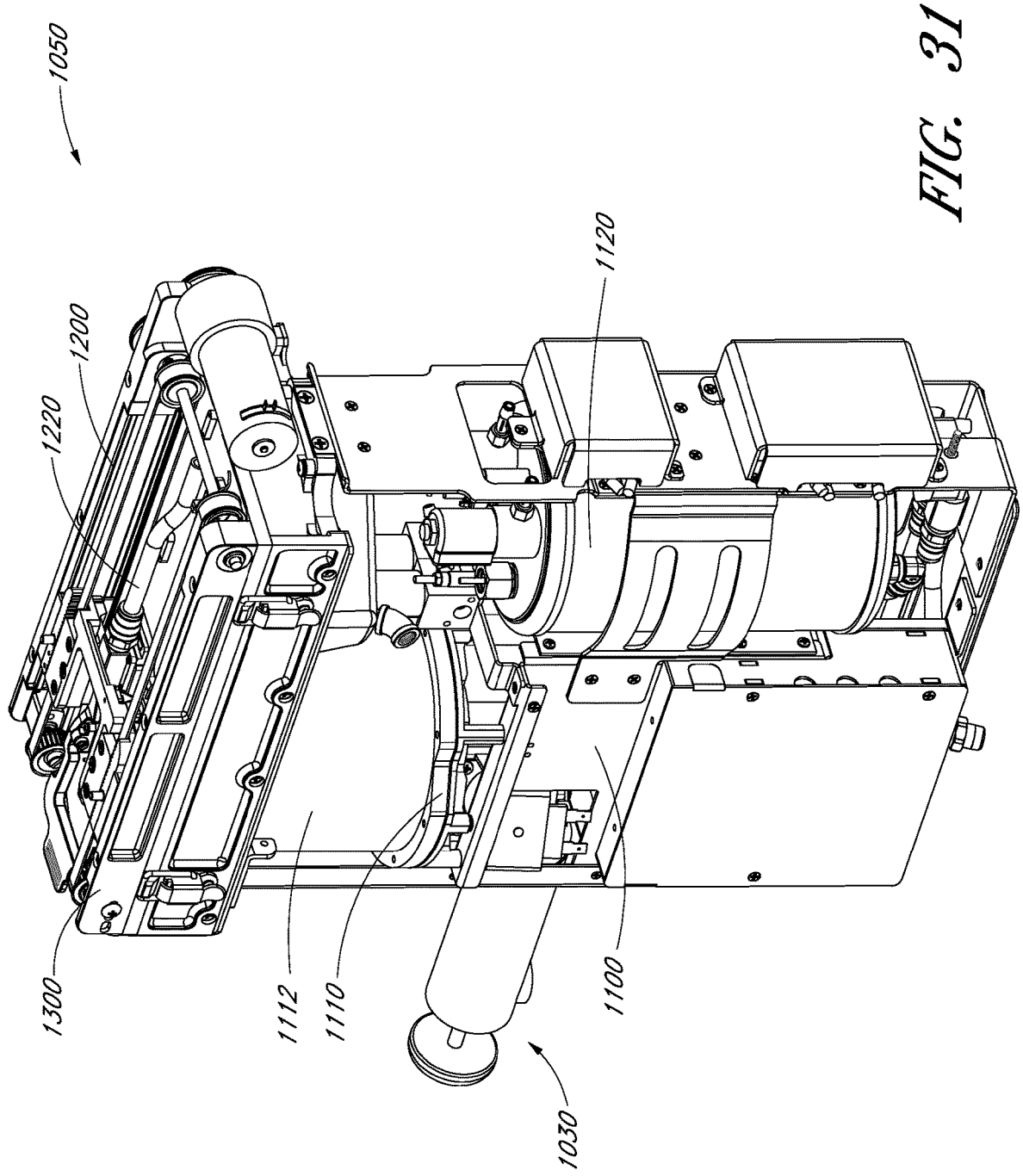
FIG. 31 is a rear perspective view of the brew module of FIG. 30.

FIGS. 30-33 illustrate an embodiment of a brew module 1050 with its outer cover removed so that internal components may be seen. With reference to FIGS. 30 and 31, the brew module 1050 comprises an interior subassembly 1100, an upper subassembly 1200, and a wiper assembly 1300. The upper subassembly 1200 is configured to receive coffee grounds from a hopper 1070 (shown, for example, in FIG. 23) and deliver the grounds to the interior subassembly 1100 for brewing, for example, a single-cup portion of coffee. The wiper assembly 1300 is configured to interact with the interior subassembly 1100 and the upper subassembly 1200 to clean components of the brew module 1050. For example, the wiper assembly 1300 may automatically clean components of the interior subassembly 1100 between brewing cycles. In some embodiments, the wiper assembly 1300 is substantially similar in structure, function, and operation to the wiper assembly 700 illustrated and described above with respect to FIGS. 16-19. The upper subassembly 1200 may include, among other components, a brewing chamber 1210 and one or more hoses 1220 (shown, for example, in FIG. 31). In some embodiments, the brewing chamber 1210 is slidable and removable from the beverage brewing machine 1010. The components described above and below are further illustrated in FIGS. 32 and 33. For example, FIGS. 32 and 33 show left side and right side views, respectively, of the brew module 1050.

Continuing with reference to FIGS. 30-33, the brew module 1050 may include, for example, a piston 1110, a piston chamber 1112, a boiler element 1120, and a waste chute 1130. The piston 1110 and the piston chamber 1112 may be configured to interact with the upper subassembly 1200 to brew a beverage. The boiler element 1120 is configured to heat water used in the brew module 1050 to brew a beverage. The waste chute 1130 is configured to deliver waste from the upper subassembly 1200 and the wiper assembly 1300 to a waste bin 1080 (shown, for example, in FIG. 23). In some embodiments, the brew module 1050 comprises an inner vent feature that interacts with the outer vent feature of the brewing machine 1010 to permit steam generated during a brew cycle to vent from the brewing machine 1010 and into the surrounding environment. Other embodiments of the brew module 1050 may comprise different configurations and components.

With reference to FIG. 30, the brew module 1050 may be configured so that rinse water from the automatic cleaning system may exit the brew module 1050 along a separate path from the path used to move brewed beverage from a brew chamber 1210 to the dispensing portion 1030. For example, a separate hose may be used for rinse water, which may be referred to as purged water, for the brew module 1050. In FIG. 30, the separate hose is shown near a front portion of the brew module 1050 and extending out from a lower left side of the brew module 1050. Some current systems use the same path for rinse water and the brewed beverage. However, separating the paths for the rinse water and the brewed beverage, as contemplated herein in some embodiments, substantially reduces the likelihood that the brewed beverage will be exposed to rinse water when dispensed from the brew module 1050. This can help to improve to the overall quality and taste of the brewed beverage.

FIGS. 34A and 34B illustrate an embodiment of a hopper 1070 that is configured to be used with the beverage brewing machine 1010 described herein. The hopper 1070 may comprise a container or canister that stores material, such as coffee beans, and is configured to interact with and/or attach to the beverage brewing machine 1010. For example, in some applications, a user may have several hoppers 1070 on hand each of which stores a particular type of material, such as a particular type of coffee beans. Some of the hoppers 1070 may be attached to the beverage brewing machine 1070, while other hoppers 1070 may be stored in a nearby location such that a user can exchange hoppers when a particular type of coffee is desired. Such an arrangement is particularly advantageous in a coffee shop setting. For example, when a user orders a particular type of coffee, a barista may select an appropriate pre-filled hopper from a nearby location, such as a shelf or cabinet, and engage the hopper with the beverage brewing machine to automatically brew a single-cup portion of coffee. If a user orders a type of coffee that is in a hopper already engaged with the beverage brewing machine, then a brew cycle may be initiated without the need to attach the hopper to the beverage brewing machine. The combination of a brewing system 1000 having one or more brew groups 1050 each with one or more hoppers 1070 and the ability to easily replace one hopper with another hopper enables the brewing system 1000 to efficiently, quickly, and automatically brew a wide variety of single-cup portions or traveler portions of a beverage with minimal involvement of a user.

The hopper 1070 may comprise a base portion 1072 and a container portion 1092. In some embodiments, the base portion 1072 includes a slide portion 1073 having an outer perimeter 1074. The base portion 1072 also includes a slide rail 1076 that is disposed between the slide portion 1073 and the container portion 1092 of the hopper 1070. In the illustrated embodiment of FIG. 34B, the slide portion 1073 and the slide rail 1076 define an opening 1075. The opening 1075 allows material to transfer from the hopper 1070 to the doser assembly 1040 (which is shown, for example, in FIG. 29) of the beverage brewing machine 1010. The slide portion 1073 is configured to translate with respect to the slide rail 1076 to open the opening 1075 to release material from the hopper 1070 and to close the opening 1075 to contain material in the hopper 1070. The base portion 1072 of the hopper 1070 may also include a release mechanism 1077 that is configured to interact with the beverage brewing machine 1010 to release and/or secure the slide portion 1073. In some embodiments, the outer perimeter 1074 of the slide portion 1073 comprises a substantially oval shaped handle that enables a user to easily open and close the hopper 1070. The slide portion 1073 may comprise other shapes and configurations, such as, for example, substantially rectangular and substantially circular configurations.

The container portion 1092 may comprise an elongated tube portion 1093 having a first end 1094 and a second end 1095. In the illustrated embodiment of FIGS. 34A and 34B, the first end 1094 is disposed near a front portion of the beverage brewing machine 1010 when the hopper 1070 is attached to the doser assembly 1040 and the second end 1095 is disposed near a rear portion of the brewing machine 1010. In some embodiments, the tube portion 1093 comprises a substantially cylindrical configuration. In other embodiments, the container portion 1092 may comprise other shapes and configurations. The tube portion 1093 may be comprised of a transparent material such that a user can easily see material stored in the hopper 1070. However, in other embodiments, may include hoppers 1070 of different shapes and configurations and/or may not be transparent.

The first end 1094 and the second end 1095 can comprise a first cap and a second cap, respectively. One or both of the first end 1094 and the second end 1095 may be configured to be removable. In some embodiments, the first end 1094 includes one or more securing features 1096 to attach the first end 1094 to the tube portion 1093 of the hopper 1070. Similarly, the second end 1095 may include one or more securing features 1097 to attach the second end 1095 to the tube portion 1093 of the hopper 1070. In the illustrated embodiment, the one or more securing features 1096, 1097 of the first end 1094 and the second end 1095 each comprise a plurality of pin and slot configurations. The slot may define a substantially L-shaped slot. In some embodiments, other securing mechanisms may be employed.

The hopper 1070 may include a detection system that is configured, for example, to detect the amount of material in the hopper 1070. The detection system may comprise a photo detection system with one detector device on the hopper 1070 and another detector device disposed outside of the hopper 1070. The detector device on the hopper 1070 can detect, for example, the amount of light in the hopper and make a relative comparison to the amount of light outside of the hopper. This could provide data regarding the amount of material remaining in the hopper and provide a signal when the material falls below a certain threshold. Such a signal may indicate that it is desirable for a user to refill the hopper 1070 with material and/or replace the hopper 1070. In some embodiments, the detection system may detect whether a particular hopper 1070 is engaged with the beverage brewing machine 1010. In such embodiments, the detection system may include components of the doser assembly 1040 and/or the hopper 1070. The detection system can include, for example, a Hall effect sensor.

FIGS. 35A and 35B show an embodiment of the brewing chamber 1210 of the beverage brewing machine 1010. The brewing chamber 1210 may be a component of the upper subassembly 1200 of the beverage brewing machine 1010. In some embodiments, the chamber 1210 may be configured to resemble a cup-like configuration and/or a dome-like configuration. The brewing chamber 1210 is configured to be disposed above a piston chamber 1112 (shown, for example, in FIG. 31) of the beverage brewing machine 1010 during a brew cycle to provide, for example, a brewing area for the mixture of coffee grounds and water. In some embodiments, the brewing chamber 1210 facilitates the brewing process by helping to improve agitation during the brew cycle. The chamber 1210 may also be configured to be slidable and removable from the beverage brewing machine 1010. The chamber 1210 can comprise a tool-less release mechanism such that the chamber 1210 may move without the use of any additional components or tools. The brewing chamber 1210 provides a substantially contained area where brewing occurs. Accordingly, the brewing chamber 1210 advantageously contains waste and debris generated during a brew cycle, such as coffee grinds, within the brewing chamber 1210. By containing waste in the brewing chamber 1210, such waste may be easily discarded and it may be easier and more efficient to clean the brew module 1050 between brew cycles because there will be less waste on other components of the brew module 1050.

The brewing chamber 1210 may comprise an outer surface 1232 that defines a first opening 1234, a second opening 1238, and a third opening 1242. The first opening 1234 may be configured to engage with a funnel of grinding components of the beverage brewing machine 1010 to receive freshly ground material, such as coffee grounds. The second opening 1238 may be configured to engage with a nozzle of a hose to provide a fluid, such as water, to an inner portion of the chamber 1210 during the brewing cycle. The third opening 1242 may comprise a vent that allows air to exit the chamber 1210 during the brewing cycle. In some embodiments, the outer surface 1232 comprises a first surface 1244 that defines the first opening 1234 and a second surface 1236 that defines the second opening 1238. As illustrated in FIG. 35A, the first surface 1244 may be offset from the second surface 1236. The chamber 1210 can also include a handle 1240 to facilitate sliding and removing the chamber 1210 from the beverage brewing machine 1010. In some embodiments, the chamber 1210 may be removed from the brewing machine 1010 after a brew cycle.

During use of the beverage brewing machine 1010, ground material, such as coffee, is delivered to the brewing chamber 1210 through the first opening 1234. Simultaneously, hot water may be sprayed into the chamber 1210 through the second opening 1238. Agitation of the coffee grounds may be improved by the directing a fan spray through the second opening 1238 at an angle so that the spray may be directed throughout an inner portion of the chamber 1210. The structure of the inner portion of the chamber 1210 may also improve agitation because grounds may tend to generally spread out within the chamber 1210 to better receive the fan spray of water. This structure of the chamber 1210 in combination with an angled fan spray helps to improve agitation of coffee grounds during the brew cycle to avoid clumping of the grounds and to provide brewed coffee with a more consistent and desirable flavor. The chamber 1210 is configured to remain attached to the brew module 1050 during normal operation of the beverage brewing machine 1010, including during an automatic cleaning cycle of the brew module 1050. The brewing chamber 1210 may be removed, for example, at the end of the day by user to allow a user to manually clean the chamber 1210. For example, at the end of the day (or at another time when the brew module 1050 is not in use), a user may remove the brewing chamber 1210 and rinse and/or wash the brewing chamber 1210 with cleaning solution to further clean the brewing chamber 1210 and prepare the brewing chamber 1210 for use the next day (or for the next cycle of uses). Without this removable feature of the brewing chamber 1210, it can be difficult and cumbersome to clean components of a brew module 1050, such as interior components in an upper subassembly of a brew module 1050, that collect waste and debris during normal operation of the brew module 1050.

Figure 36A:
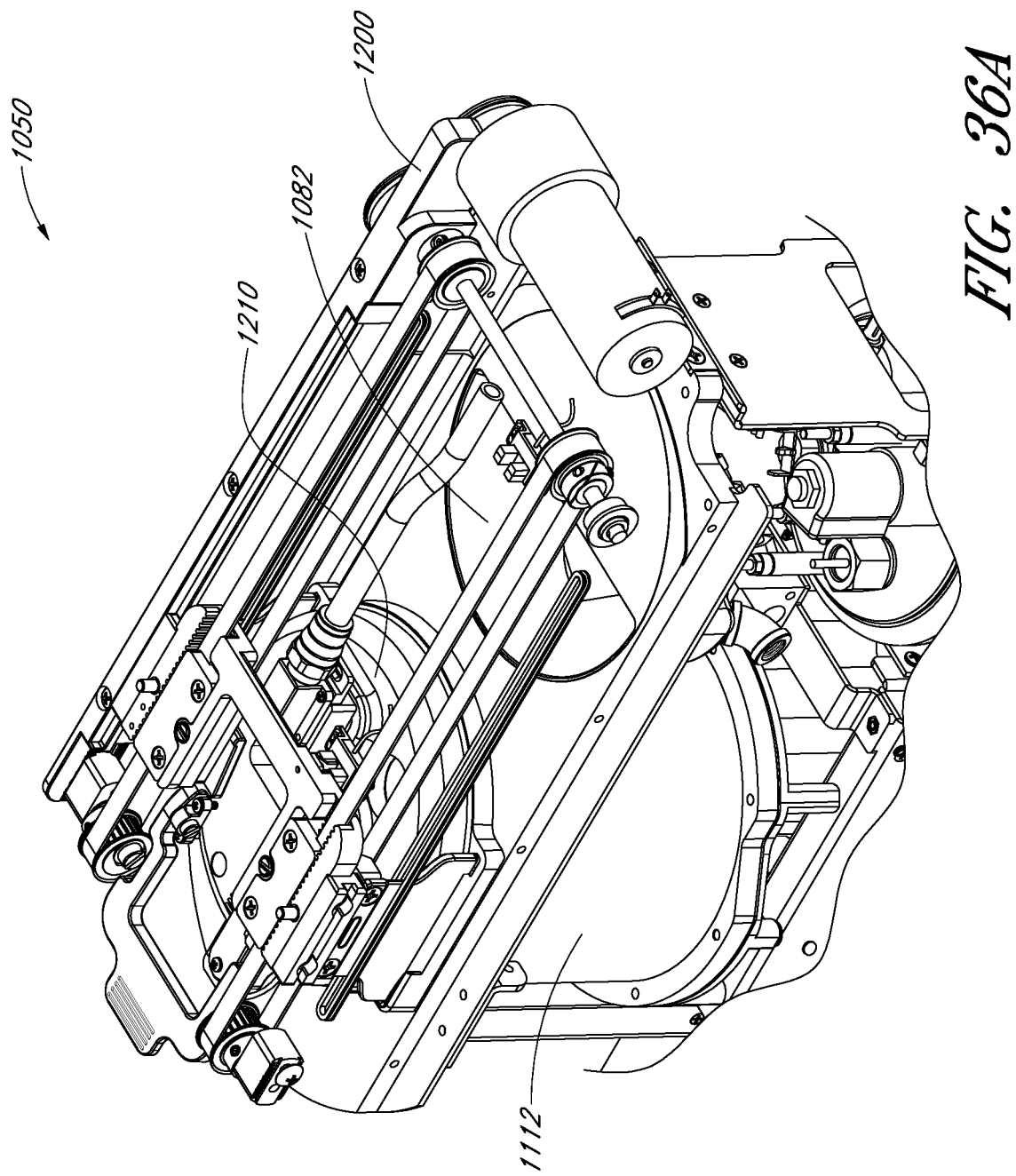
FIG. 36A is a partial rear perspective view of the brew module of FIG. 30 where certain components have been removed and where a brewing chamber is disposed in a first position.
Figure 36B:
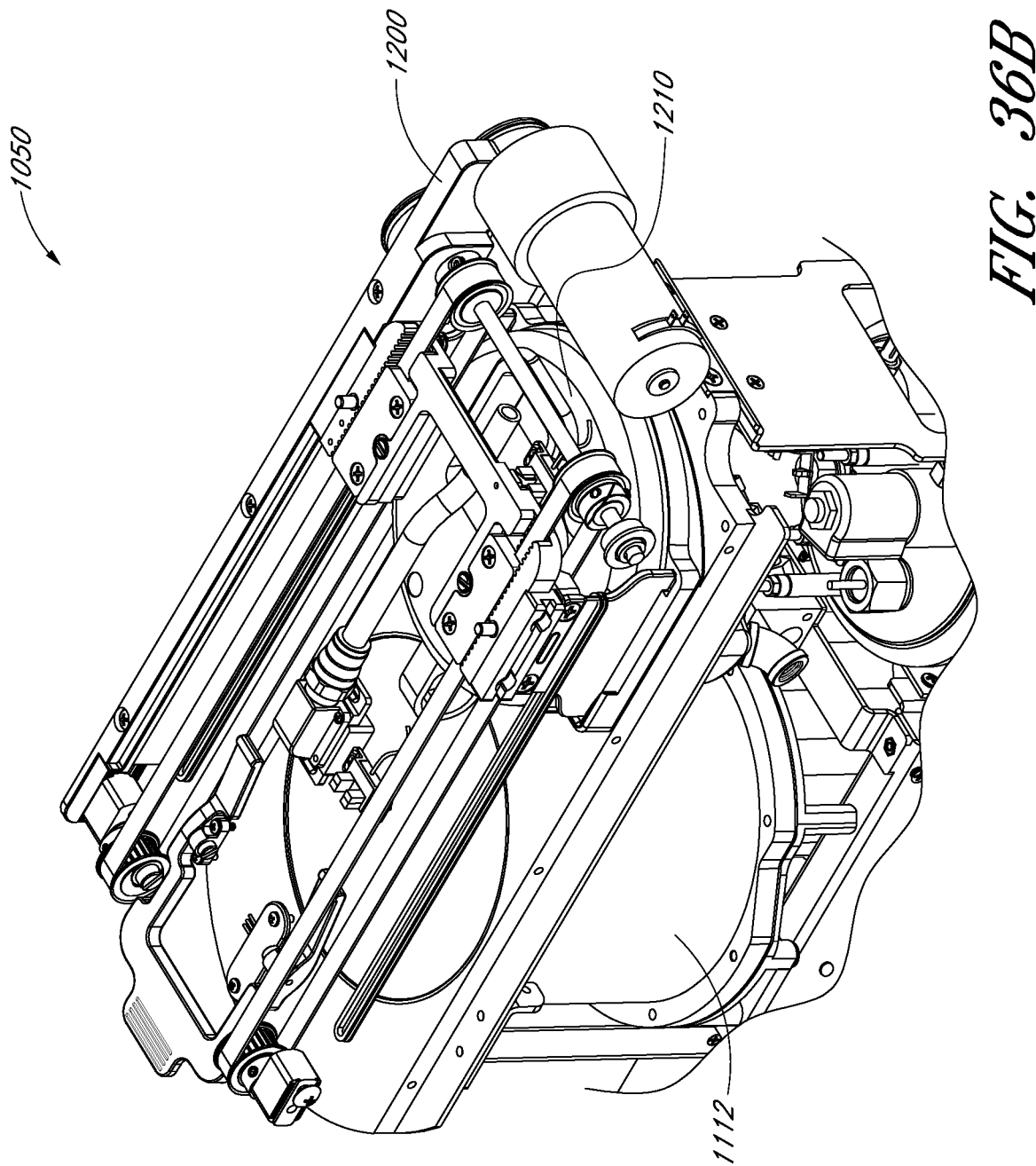
FIG. 36B is a partial rear perspective view of the brew module of FIG. 30 where certain components have been removed and where a brewing chamber is disposed in a second position.

In FIGS. 36-38, the brewing chamber 1210 is shown in the upper subassembly 1200 of the brew module 1050. FIGS. 36A and 37A illustrate the chamber 1210 in a first position where the chamber 1210 is disposed generally above the piston chamber 1112. FIGS. 36B and 37B illustrate the chamber 1210 in a second position where the chamber is disposed near a rear side of the brew module 1050 such as, for example, over an opening defined by a waste chute 1082. FIG. 38 is shows the brew module 1050 with certain components removed to better show the first opening 1234 and the second opening 1238 of the chamber 1210.

In some embodiments, an automatic cleaning system comprises the chamber 1210, a spray feature (such as, for example, one or more hoses 1220), and a waste nozzle (which is not shown in the figures) disposed at or near a waste chute 1082 of the brew module 1050. The chamber 1210 may have a plow feature configured to mechanically move coffee grounds and debris to a waste bin 1080 (shown, for example, in FIG. 23). In some embodiments, the spray feature is configured to rinse the upper subassembly 1200 after a brew cycle. The waste nozzle may be configured to rinse the chamber 1210, including, for example, an inner portion of the chamber 1210. In some embodiments, the spray feature of the automatic cleaning system comprises the same structure that provides a fan spray to the chamber 1210 during a brew cycle.

The operation of embodiments of an automatic cleaning system will now be described with references to FIGS. 36 and 37. The chamber 1210 begins in a first position near a front portion of the brewing machine 1010. The chamber is shown in this position in FIGS. 36A and 37A. After the beverage brewing machine 1010 brews a single-cup portion of coffee, the piston 1110 (show in FIG. 37A) can raise to provide used coffee grounds to the upper subassembly 1200. The coffee grounds can extend upward through an opening defined by the piston chamber 1112. The cleaning system may be actuated such that, for example, belt assemblies activate to move the chamber 1210 linearly toward a rear portion of the brewing module 1050. As the chamber 1210 translates, the plow feature of the chamber 1210 collects used coffee grounds and directs them toward the waste chute 1082, which leads to a waste bin 1080. The chamber 1210 continues to move toward the rear portion of the brew module 1050 until it reaches a second position. FIGS. 36B and 37B show the chamber 1210 disposed at or near this second position.

After the chamber 1210 has reached the second position, it will have mechanically moved much of the used coffee grounds and unwanted materials from the piston and filter to the waste bin 1080. The spray feature may activate such that a nozzle sprays a cleaning fluid, such as water, toward surfaces of the upper subassembly 1200 to clean grounds and debris from the upper subassembly 1200. While the chamber 1210 is disposed near or over the waste chute 1082, the waste nozzle may activate to direct a cleaning fluid, such as water, toward an inner portion of the chamber 1210 to remove grounds and debris from the chamber 1210. The piston 1110 may also lower slightly before or during retraction of the chamber 1210 to avoid dirtying a rear portion of the chamber 1210. In one embodiment, the piston 1110 lowers so that it is not elevated above the opening defined by the piston chamber 1210. The chamber 1210 may then linearly translate from the second position near the rear portion of the brew module 1050 to the first position near the front portion of the brew module 1050. At this point, in some embodiments, the cleaning cycle is approximately halfway complete. In some embodiments, the spray feature is configured to activate such that a nozzle sprays a cleaning fluid, such as water, toward a lower surface of the upper subassembly 1200 before the chamber has reached the second position.

Once the chamber 1210 reaches the first position again, the spray feature may activate such that it directs a cleaning fluid, such as water, from a nozzle. This step is intended to remove remaining debris from the upper subassembly 1200. For example, the spray feature may serve as a pressure washer to sufficiently clean exposed surfaces of the upper subassembly 1200. In some embodiments, the spray feature may also activate during the previous step described above where the plow mechanically clears the bulk of the used coffee grounds.

After the spray feature activates, the chamber 1210 may once again move from the first position to the second position. Such movement causes the plow feature of the chamber 1210 to push and direct remaining unwanted grounds, oils, and excess water toward the waste bin. While in at or in the second position, the waste nozzle may again direct cleaning fluid toward an inner portion of the chamber 1210 to further surfaces of the chamber 1210. In some embodiments, the spray feature is also activated to further rinse and clean the piston 1110, piston chamber 1112, and surrounding components of the upper subassembly 1200 disposed at or near a front portion and/or central portion of the brew module 1050.

Finally, the chamber 1210 moves from the second position near the rear portion of the brew module 1050 back to its original position near the front portion of the brew module 1050. A two-step process involving mechanically removing the bulk of the grinds in one step and then using the spray feature to clear remaining grounds in a second step has been found to be advantageous in some applications because, among other reasons, such a process results in less waste water than a single-step cleaning process employing only a spraying step. Other embodiments of the automatic cleaning system may comprise different configurations and components.

With reference to FIGS. 37A and 37B, one problem encountered in some beverage brewing machines relates to the waste chute. The waste chute tends to accumulate waste, such as coffee grounds and other debris, and it can be difficult to clean the waste chute. For example, if water is sprayed generally downward into the waste chute from above (such as, for example, similar to a toilet bowl design), the machine may require a significant amount of water to clean the surfaces of the waste chute and oftentimes accumulation and built-up debris remains in the chute. It has been found that such issues can be addressed by altering the geometry of the waste chute and by dispensing water on a surface of the waste chute shortly before grounds and waste is dispensed into the chute.

For example, the waste chute 1082 may be configured to have a relatively shallow exit angle and a spray head that is substantially parallel with a surface of the waste chute 1082. A bottom of the waste chute 1082 may be configured to exit a side of the brew module 1050 instead of, for example, being configured to dispense waste vertically in a waste bin below generally below the chute. The water may be activated to spray a surface of the waste chute 1082 shortly before grounds and other waste is provided to the chute 1082. This can result in a plane of water that substantially covers a surface of the waste chute 1082 from a shearing direction, which can create a shear force that helps to carry waste down the chute 1082. Additionally, by providing the chute 1082 with water shortly before waste is provided, a smooth plane of water is provided that acts as a protective barrier and is configured to move waste down the chute 1082. This may reduce the likelihood that waste will accumulate on surfaces of the chute 1082. Such a configuration may also allow a relatively small amount of water to effectively clean the waste chute 1082, thereby resulting in a more efficient cleaning system and cost savings to a user. In some embodiments, a low-mounted spray nozzle in combination with directing waste out a side of the brew module 1050 provides some or all of the advantages of embodiments of the waste chute 1082 described above.

In some embodiments, the brewing chamber 1210 may be replaced with a cleaning head to further assist with cleaning the brew module 1050. The cleaning head may include a brush, bristles, a scrubber, and/or other cleaning mechanisms configured to wipe, scrub, and/or clean surfaces of the upper subassembly of the brew module. For example, the cleaning head may be employed by a user at the end of the day to clean and disinfect components of the brew module. The user may remove the brewing chamber and replace it with a cleaning head configured to be attached to the wiper assembly and translate back and forth along a surface of the upper subassembly. The cleaning head may be used in conjunction with one or more nozzles configured to spray interior components of the module, similar to that which is described above with respect to embodiments of the automatic cleaning system. In some embodiments, the brew module has one or more sensors configured to determine whether the brew chamber or whether the cleaning head is engaged with the wiper assembly. Such a cleaning head would advantageously aid, for example, in the daily maintenance and cleaning cycle of a brew module.

FIGS. 39 and 40 illustrate partial cross-sectional views of the brew module 1050 where certain components have been removed to help show features of the upper subassembly 1200 of the brew module 1050. For example, those figures show that the one or more hoses 1220 may have a nozzle 1222 configured to deliver a fan spray of fluid to the chamber 1210. The nozzle 1222 is configured to engage with the second opening 1238 of the chamber 1210 to provide, for example, hot water to coffee grounds during the brewing process. In some embodiments, the nozzle 1222 comprises one or more openings on a face 1224 of the nozzle 1222 configured to direct water to an interior of the chamber 1210.

As shown in FIG. 40, the face 1224 of the nozzle 1222 may be inclined with respect to a horizontal plane of the brewing machine 1010. That is, a central axis of the nozzle 1222 may be titled to provide an angled spray in the chamber 1210. For example, in some embodiments, the face 1224 of the nozzle 1222 defines an angle between about 0° and 90° with respect to a horizontal plane. In some embodiments, the face 1224 of the nozzle 1222 defines an angle between about 5° and 60° with respect to a horizontal plane. In some embodiments, the face 1224 of the nozzle 1222 defines an angle between about 10° and 30° with respect to a horizontal plane. In some embodiments, the face 1224 of the nozzle 1222 defines an angle between about 15° and 20° with respect to a horizontal plane. Such an angled configuration of the face 1224 of the nozzle 1222 may allow the nozzle 1224 to deliver a desirable fan spray to the chamber 1210 such that the fan spray cover a larger area of the interior of the chamber 1210 and improves the agitation process during a brewing cycle. The fan spray may also be directed toward one or more inner sidewalls of the chamber 1210 to further agitate and spin the ground material during a brewing cycle. As discussed above, improved agitation of ground material, such as ground coffee, during the brewing process may speed up the brew cycle time and provide a brewed beverage with a more consistent and desirable flavor.

FIGS. 41 and 42 are additional views of a brew module where certain components have been removed to show interior components of the brew module. For example, FIG. 41 shows an embodiment of the brew module 1050, the doser assembly 1040, and a grinder assembly 1090. The grinder assembly 1090 is disposed generally between the doser assembly 1040 and the brew module 1050. As described above, material may be provided to the doser assembly 1040. The doser assembly 1040 is configured to provide a desired amount of material to the grinder assembly 1090. The material is then ground in the grinder assembly 1090. The ground material is then provided to the brew module 1050. The brew module 1050 is configured to brew the material and dispense a desired amount of a beverage, such as a single-cup portion, out of the dispensing portion of the brew module 1050.

FIG. 42 is a cross-sectional view that further shows interior components of an embodiment of the brew module 1050, the doser assembly 1040, the grinder assembly 1090, and the dispensing portion 1030. FIG. 42 generally shows that, in some embodiments, the flow path for delivering brewed beverage from the brew chamber to the dispensing portion and ultimately to a container, such as a mug, may generally define a downward slope substantially along the entire flow path. For example, the flow path is generally flow in a downhill direction, even around and about difficult geometrical constraints of the brew module, so that gravity assists in dispensing the brewed beverage. Such a downward configuration helps to create gravity-assisted flow and results in dispensing a steady stream of brewed beverage followed by, in some embodiments, a single drop of any final remaining brewed beverage. This can avoid a dispensing system where a lingering trickle of beverage is dispensed followed by several drops of beverage. As a result, a much more efficient fluid-dispensing process may be provided. In addition, in some embodiments, the spout of the dispensing portion 1030 may include two separate fluid flow paths disposed on either side of a shaft of the spout. As illustrated in FIG. 42, the fluid flow paths in the spout may also be in a generally downward direction.

FIGS. 43-45 illustrate embodiments of a doser assembly 1040 having a volumetric doser 1300. The volumetric doser may be configured to provide a precise amount of material, such as coffee beans, to a grinder based on a defined, open interior volume of the doser. The interior volume of the doser is adjustable such that the interior volume may change depending on, for example, the amount of brewed material that is desired and/or the strength of the brewed material. For example, if a customer orders a particular size and type of coffee, the volumetric doser is configured to adjust the interior volume of the doser to an appropriate volume. The doser may adjust the interior volume automatically and seamlessly when, for example, a customer orders a cup of coffee. The volumetric doser is particularly advantageous in providing only a precise amount of material such that extra material and waste is thereby reduced. Some existing systems lack the ability to precisely control the volume of material provided to a beverage brewing machine. As a result, excess material is often brewed and additional, unnecessary waste is created. Accordingly, the volumetric doser may provide a cost savings to a user by avoiding waste and providing no more than a necessary amount of material to a grinder and brew module during a brew cycle.

Embodiments of the volumetric doser may comprise a first opening and a second opening. The first opening is configured to receive material from a hopper of the beverage brewing system, while the second opening is configured to dispense material to a funnel that leads to a grinder. The first opening and the second opening may be offset from each other so that material can be contained in the doser. In some embodiments, the volumetric doser comprises a first piston and a second piston. The first piston and second piston define an open interior volume that is configured to receive material, such as coffee beans. The first piston and the second piston are configured to move with respect to a frame of the volumetric doser. The first piston is also configured to move respect to the second piston. Additionally, the second piston may be configured to move with respect to the first piston. The ability of the first position and second piston to move with respect to the frame of the doser and with respect to each other allows the first and second pistons to shuttle back and forth between the first opening and the second opening. That is, the first and second pistons may be initially configured such that the open interior volume of the doser is disposed generally below the first opening. In this position, the doser is configured to receive material from the hopper and contain the material between the first and second pistons. The first and second pistons are then configured to move the contained material along an inner portion of the doser toward the second opening. When the material reaches the second opening, the material may then exit the doser and travel through the funnel to the grinder for grinding the material.

Figure 43A:
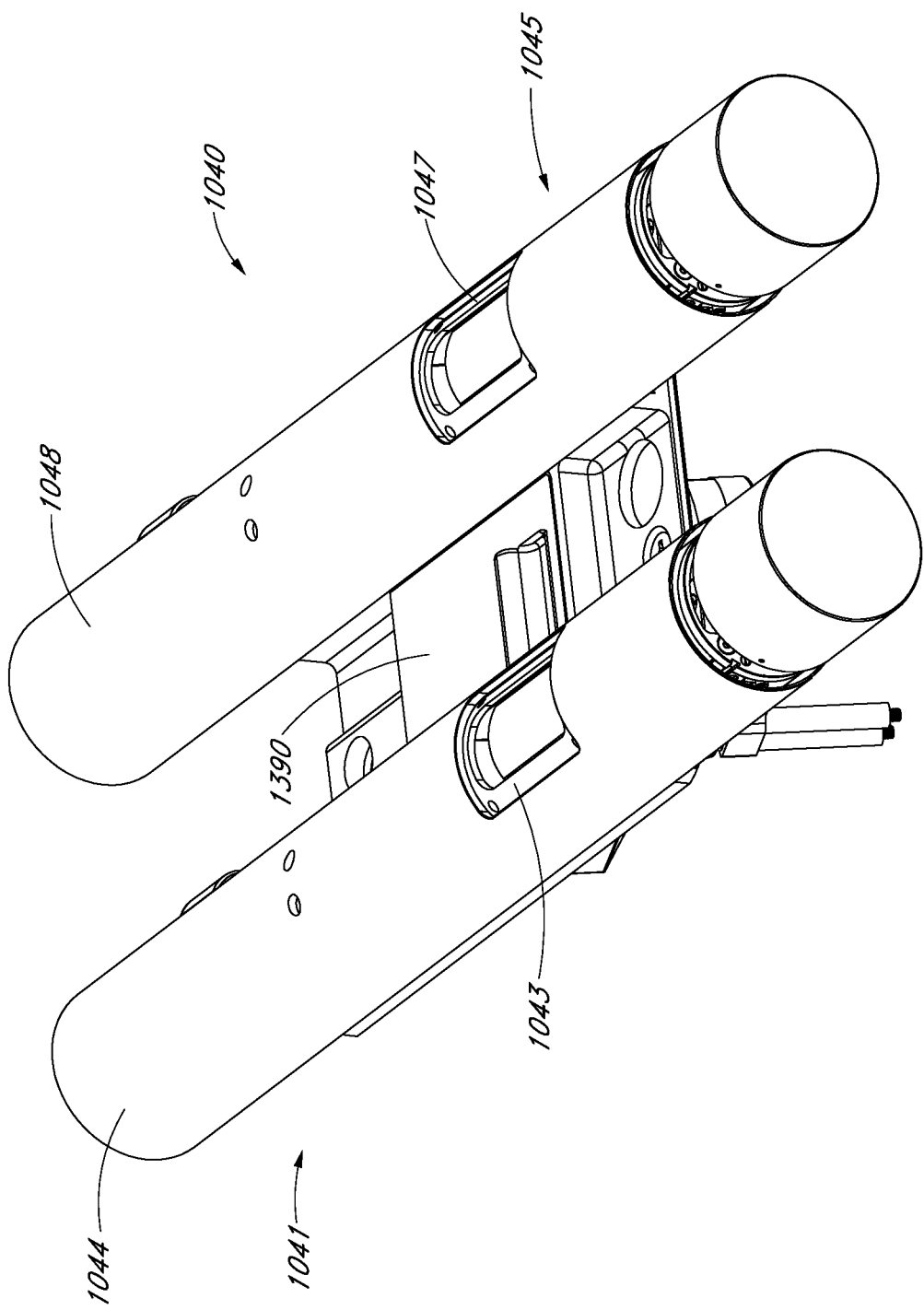
FIG. 43A shows a front perspective view of a doser assembly of the system shown in FIG. 23.
Figure 43B:
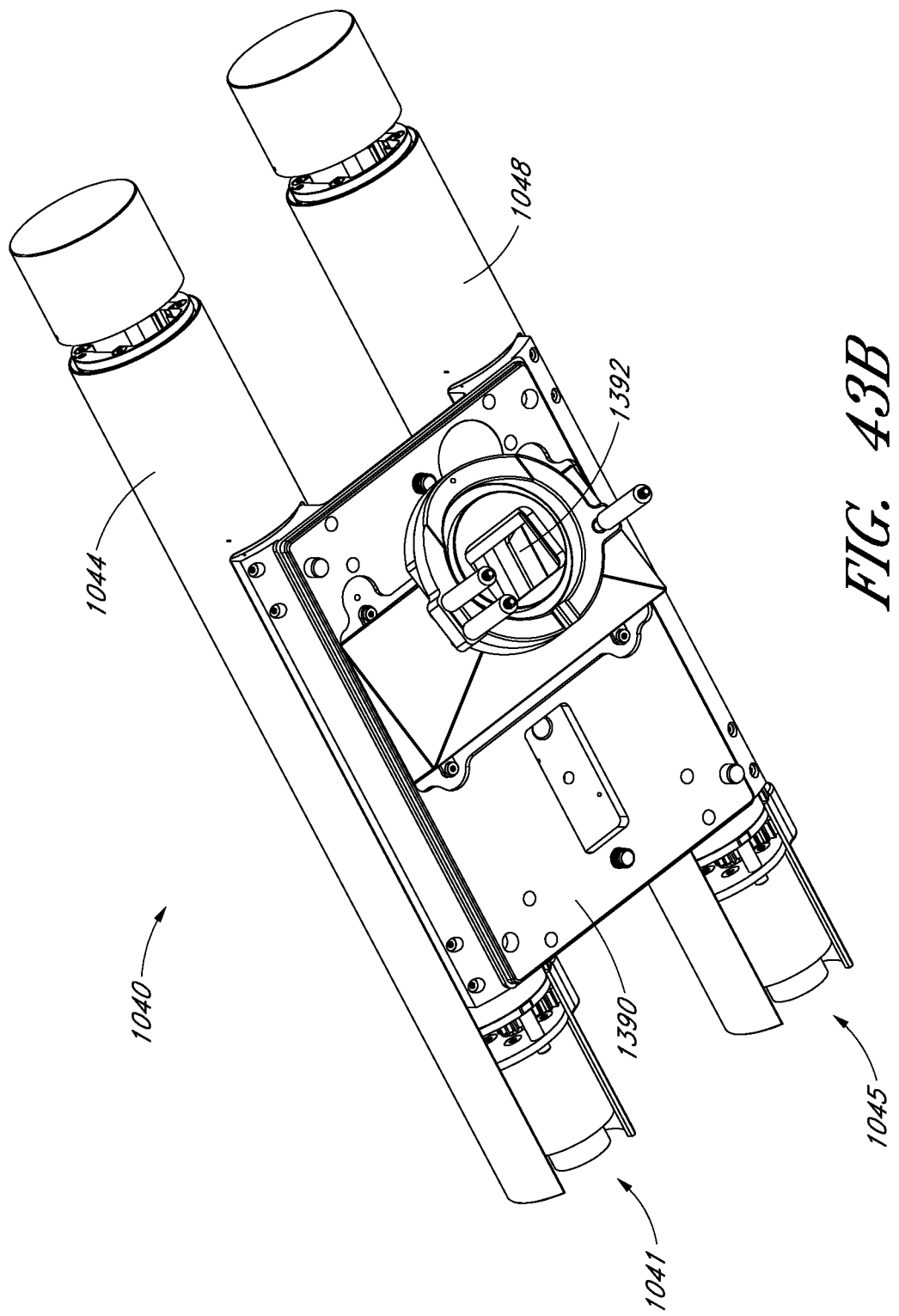
FIG. 43B shows a perspective view of an underside of the doser assembly of FIG. 43A.

With reference to FIGS. 43A and 43B, an embodiment of a doser assembly 1040 is shown having a first doser portion 1041 and a second doser portion 1045. The first doser portion 1041 may comprise a first doser chamber 1044 containing pistons that define an adjustable, inner volume. The first doser portion 1041 also includes a first receiving portion 1043 configured to receive material, such as coffee beans, through an opening. Similarly, the second doser portion 1041 may include a second doser chamber 1048 and a second receiving portion 1047. The illustrated doser assembly 1400 also includes a mounting portion 1390 defining a funnel opening 1392. The mounting portion 1390 is configured to attach to a grinder assembly and the funnel opening 1392 facilitates delivering material from the first doser portion 1041 and the second doser portion 1045 to a grinder.

Figure 44A:
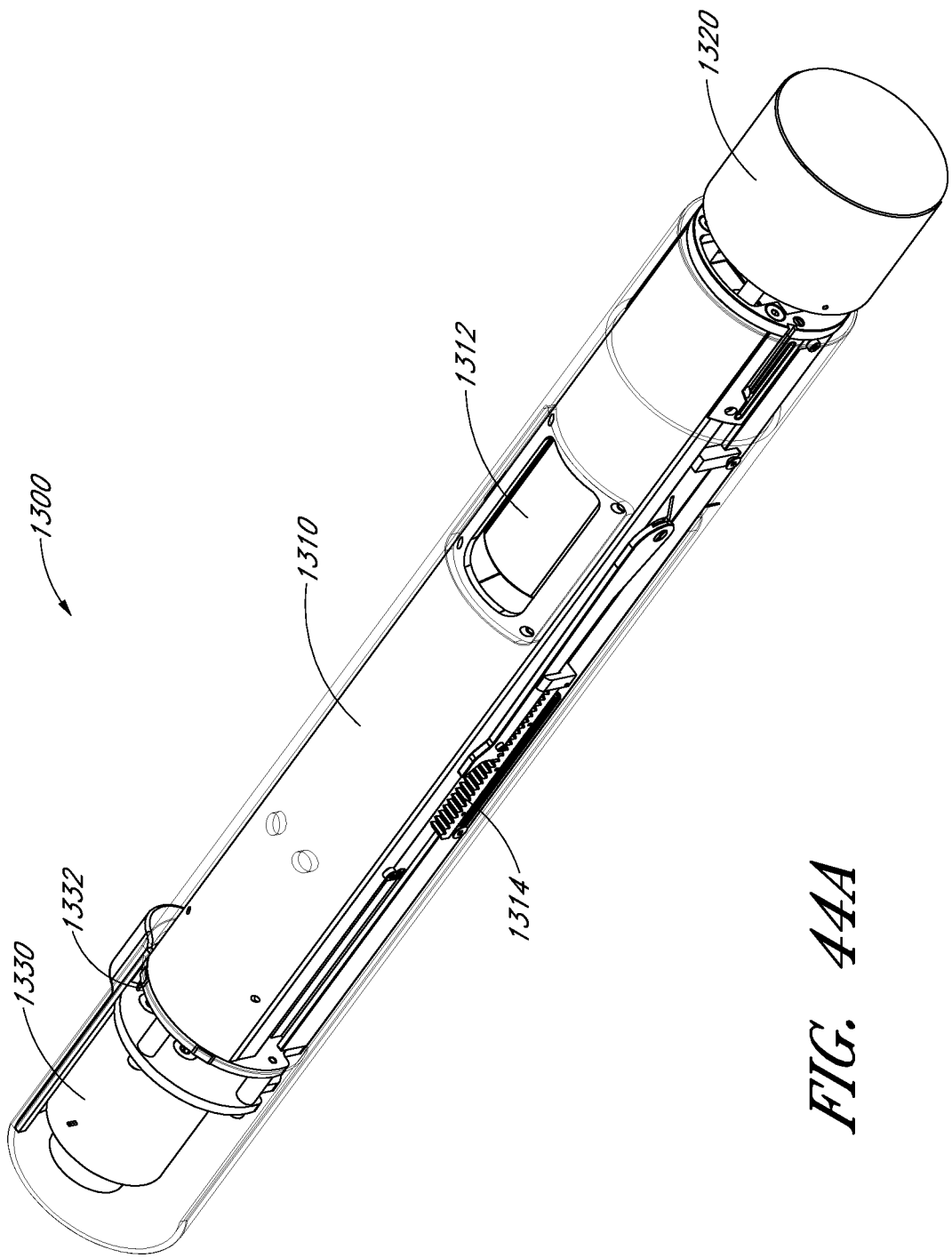
FIG. 44A shows a front perspective view of a volumetric doser of the system shown in FIG. 23.
Figure 44B:
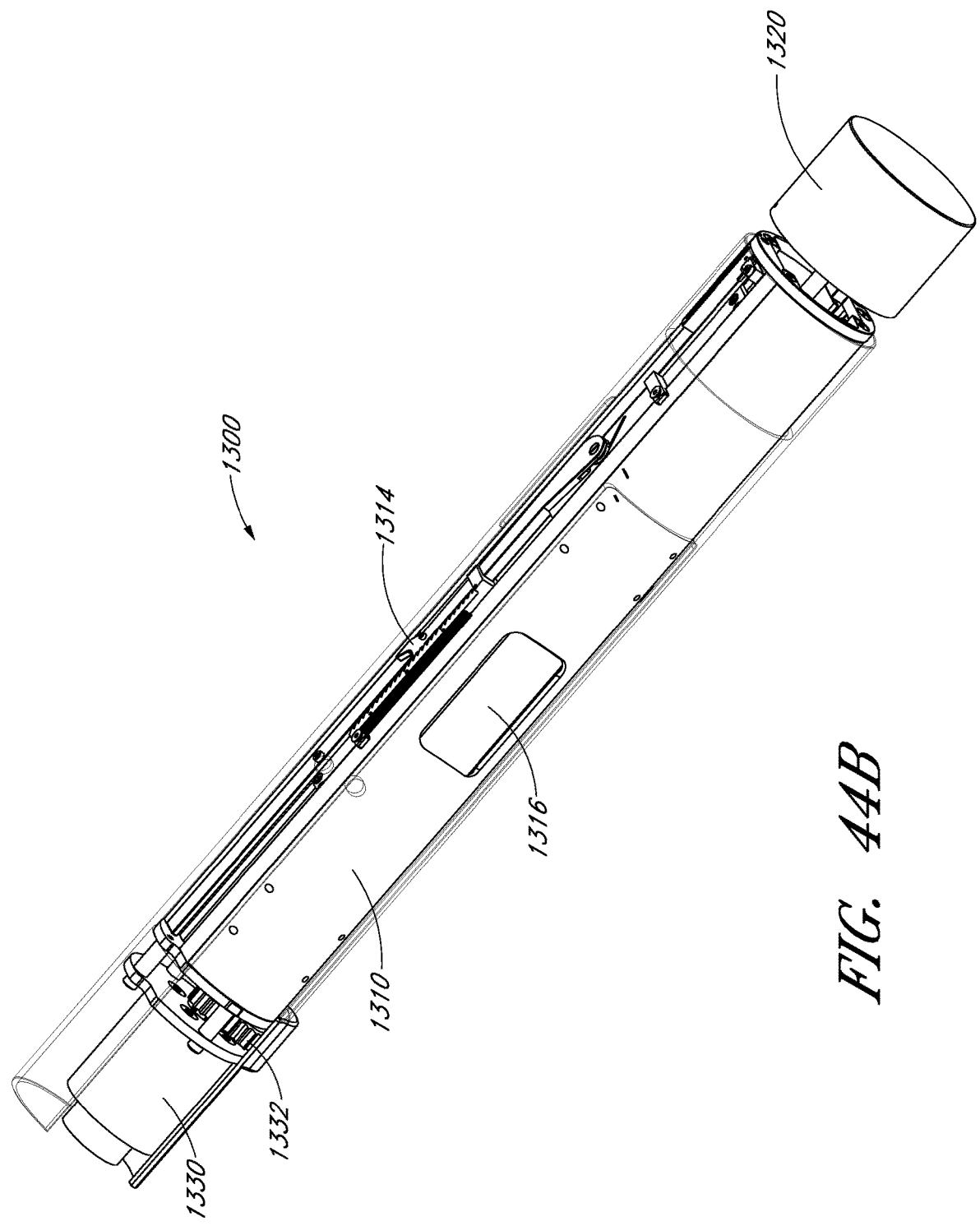
FIG. 44B shows a perspective view of an underside of the volumetric doser of FIG. 44A.
Figure 45A:
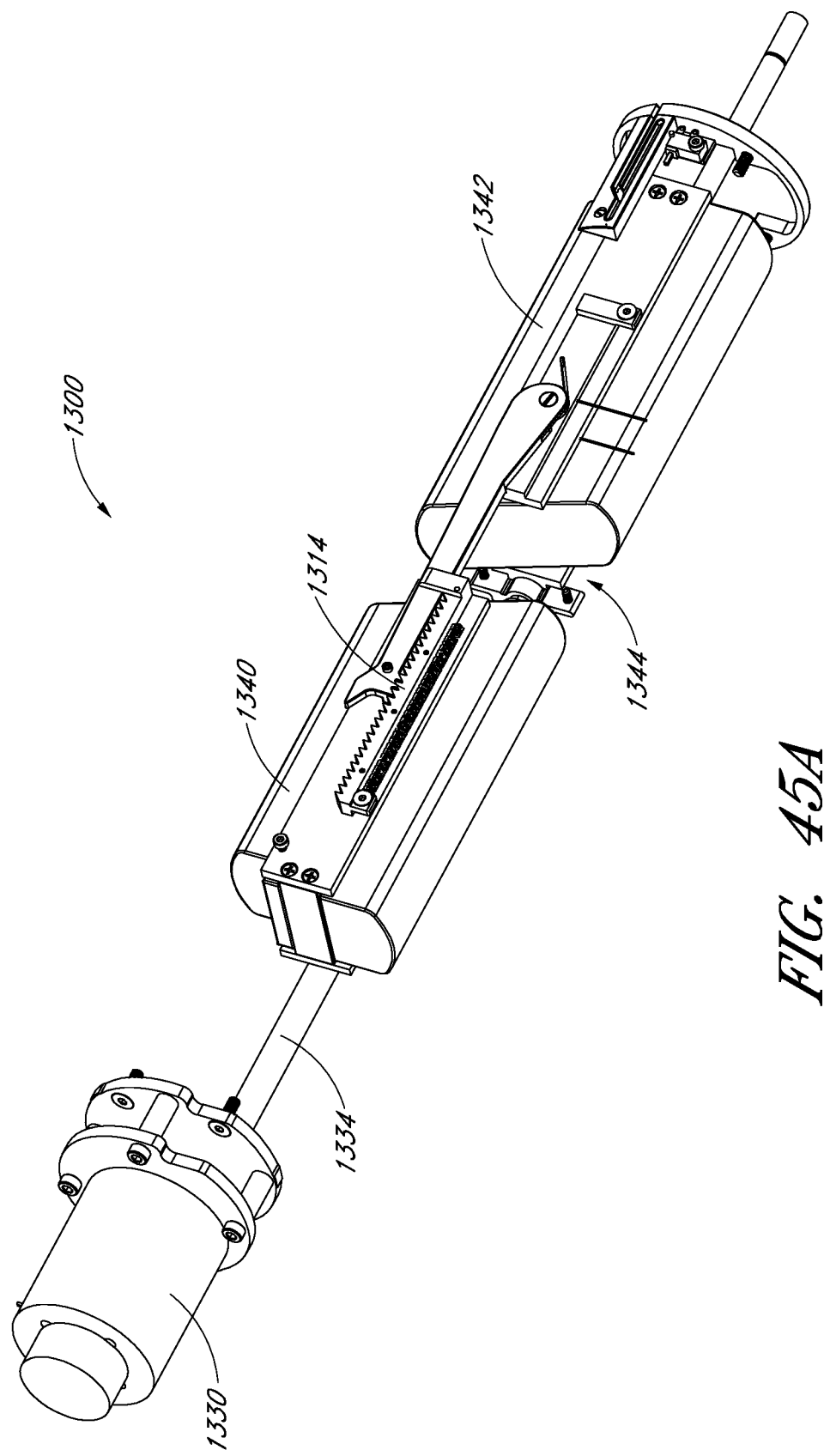
FIG. 45A shows a first perspective view of internal components of the volumetric doser of FIG. 44A where certain components have been removed.
Figure 45B:
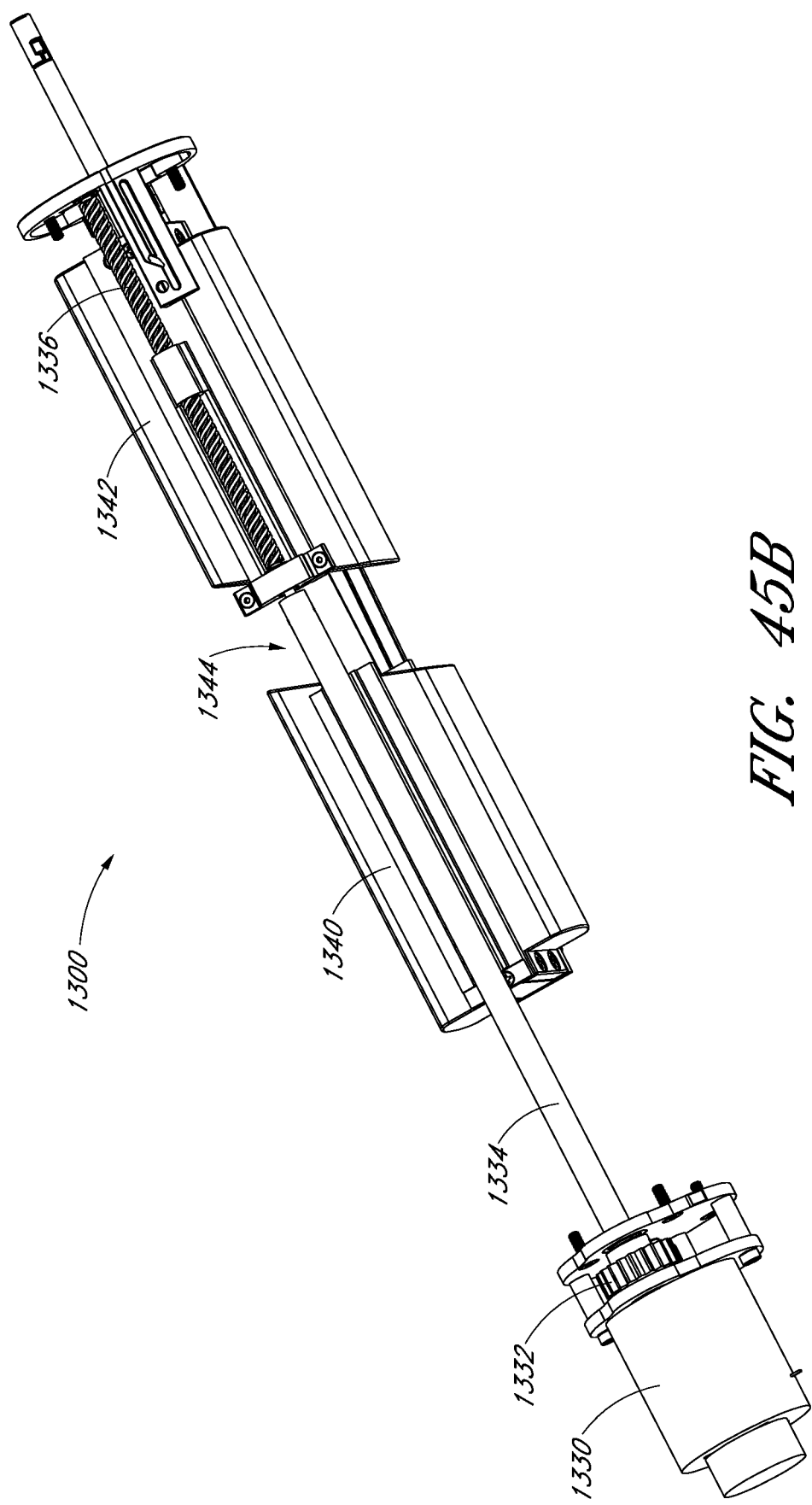
FIG. 45B shows a second perspective view of internal components of the volumetric doser of FIG. 45A.
Figure 45C:
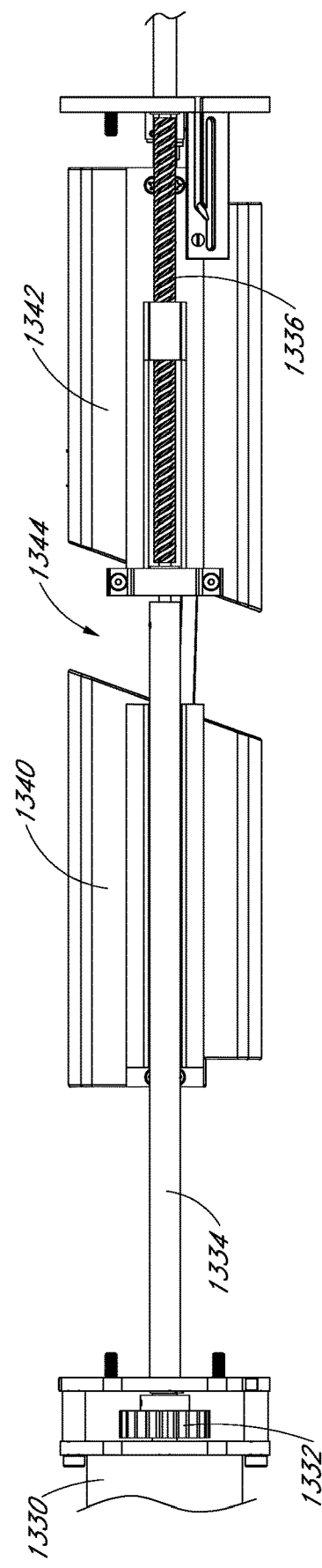
FIG. 45C shows a side view of internal components of the volumetric doser of FIG. 45A.

FIGS. 44-45 show an embodiment of a volumetric doser 1300. In some embodiments, first doser portion 1041 and the second doser portion 1045 of FIGS. 43A and 43B are essentially the same as the volumetric doser 1300 illustrated in FIGS. 44 and 45. With reference to FIGS. 44A and 44B, the volumetric doser 1300 may comprise an outer body 1310 that defines a first opening 1312 for receiving material and a second opening 1316 for delivering material to a grinder. The volumetric doser 1300 may also include a cap 1320 at one end of the doser 1300 and a motor 1330 near an opposite end of the doser 1300. In some embodiments, the cap 1320 is disposed at or near a front portion of the doser 1300 and the motor 1330 is disposed at or near a rear portion of the doser 1300. The motor 1330 is in communication with a gear 1332. The gear 1332 may be in communication with a shaft 1334 and a lead screw 1336 (the shaft 1334 and lead screw 1336 are shown in FIGS. 45B and 45C). The motor 1330, gear 1332, shaft 1334, and/or lead screw 1336 are configured to adjust at least one piston disposed on an inner portion of the doser 1300. The doser 1300 may also include a ratchet mechanism 1314 that is configured to adjust at least one piston of the doser 1300.

In FIGS. 45A-45C, certain components of the volumetric doser 1300 have been removed, such as an outer cover, to better show inner components of the doser 1300. The doser 1300 may include a first piston 1340 and a second piston 1342. The first piston 1340 and the second piston 1342 are configured to define an open interior volume 1344 disposed generally between the first piston 1340 and the second piston 1342. In some embodiments, the second piston 1342 is in communication with the motor 1330 via the gear 1332, the shaft 1334, and the lead screw 1336 such that the motor can cause the second piston 1342 to move. In some embodiments, the motor 1330 is configured to cause both the first piston 1340 and the second piston 1342 to move together. In other embodiments, the motor 1330 is configured to cause the second position 1342 to move independent from the first piston 1340 to adjust the size of the interior volume 1344. In some embodiments, the ratchet mechanism 1340 is configured to cause the first piston 1340 to move relative to the second piston 1342 to adjust the size of the interior volume 1344. In some embodiments, a control system is configured to automatically adjust the size of the interior volume 1344.

FIGS. 46-49 illustrate embodiments of a fan system configured to deliver airflow near an outlet of the grinder. The fan system may deliver a constant flow of air through an exit port of the grinder and through a grounds chute toward a brewing chamber of the brew module. Continuous airflow from the fan creates a positive pressure in the exit port of the grinder during operation of the brewing machine. In some embodiments, an air inlet is provided in an exit port of the grinder near burrs of the grinder. During operation, the fan system may provide several advantages to the beverage brewing system such as, for example, preventing steam from rising and entering the grinder assembly, ensuring that substantially all fresh grounds are transferred from the grinder assembly to the brew module, and reducing the likelihood that grounds of material (such as coffee grounds) will stick to surfaces at or near an exit port of the grinder.

In some embodiments, the brewing machine 1010 and/or one more brew modules 1050 is grounded. Grounding the brewing machine 1010, or components of the brewing machine 1010, can help to reduce or substantially eliminate static electricity. Electrostatic charges can cause ground material, such as coffee grinds, to collect and stick to surfaces of components of the brewing machine 1010. Accordingly, grounding the brewing machine 1010 can further reduce or substantially eliminate electrostatic build-up of ground material on internal components of the brewing machine 1010.

Figure 46:
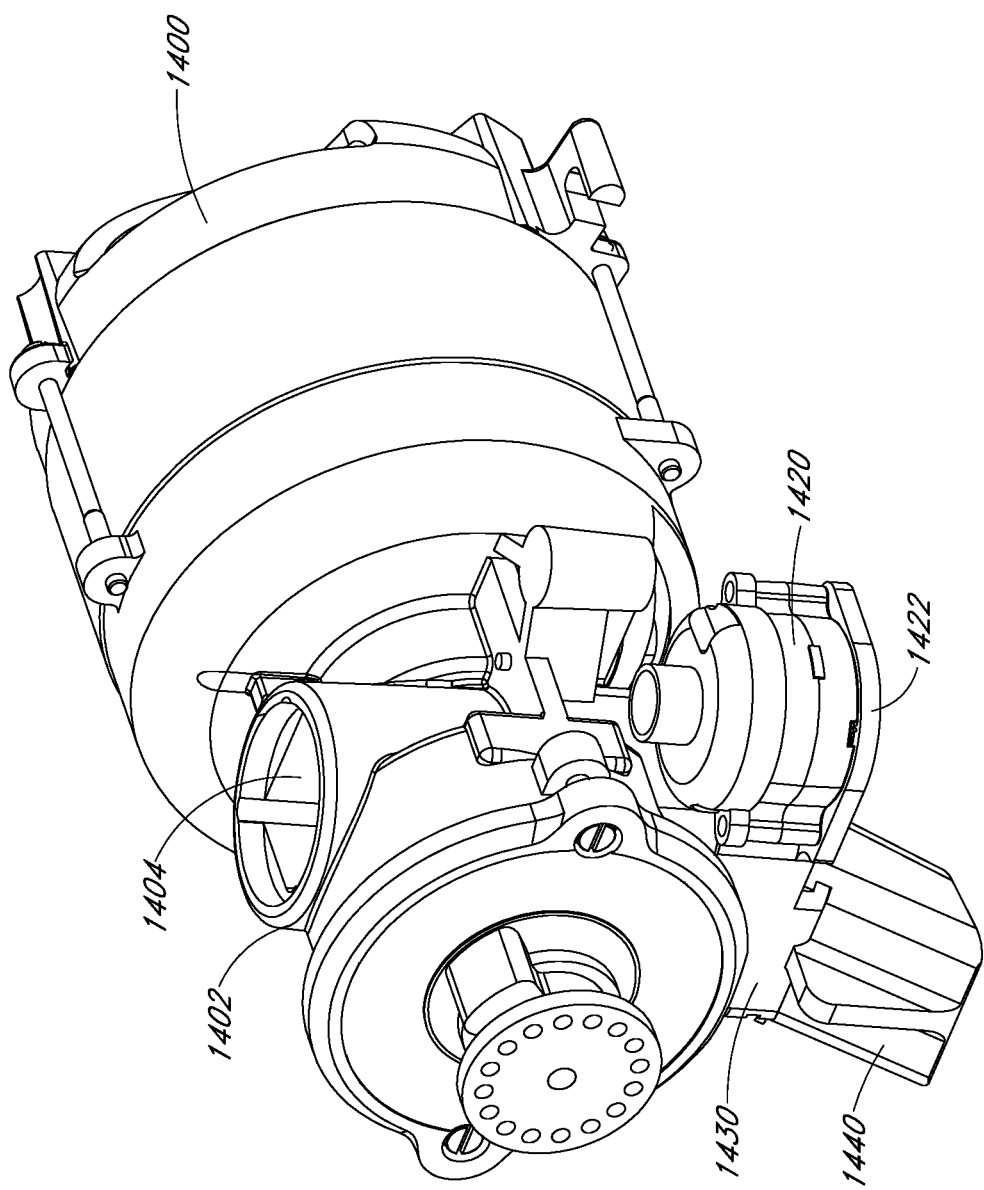
FIG. 46 shows a front perspective view of a fan system of the system for brewing a beverage shown in FIG. 23.

With reference to FIG. 46, a grinder 1400 is shown having an elongated portion 1402 that defines an opening 1404. The opening 1404 is configured to receive ground material from mounting portion 1390 of the doser assembly 1040 (shown, for example, in FIGS. 43A and 43B). The grinder 1400 is in communication with an exit port 1430 disposed generally below the grinder 1400. The exit port 1430 may be connected to a grounds chute 1440, which leads to a brewing chamber 1210 (shown, for example, in FIGS. 35A, 35B, and 38). The exit port 1430 may also be attached to a base plate 1422 that supports a fan 1420. In the illustrated embodiment, the fan 1420 is disposed adjacent the exit port 1430. The fan 1420 is configured to deliver airflow to the exit port 1430 and the grounds chute 1440.

Figure 47A:
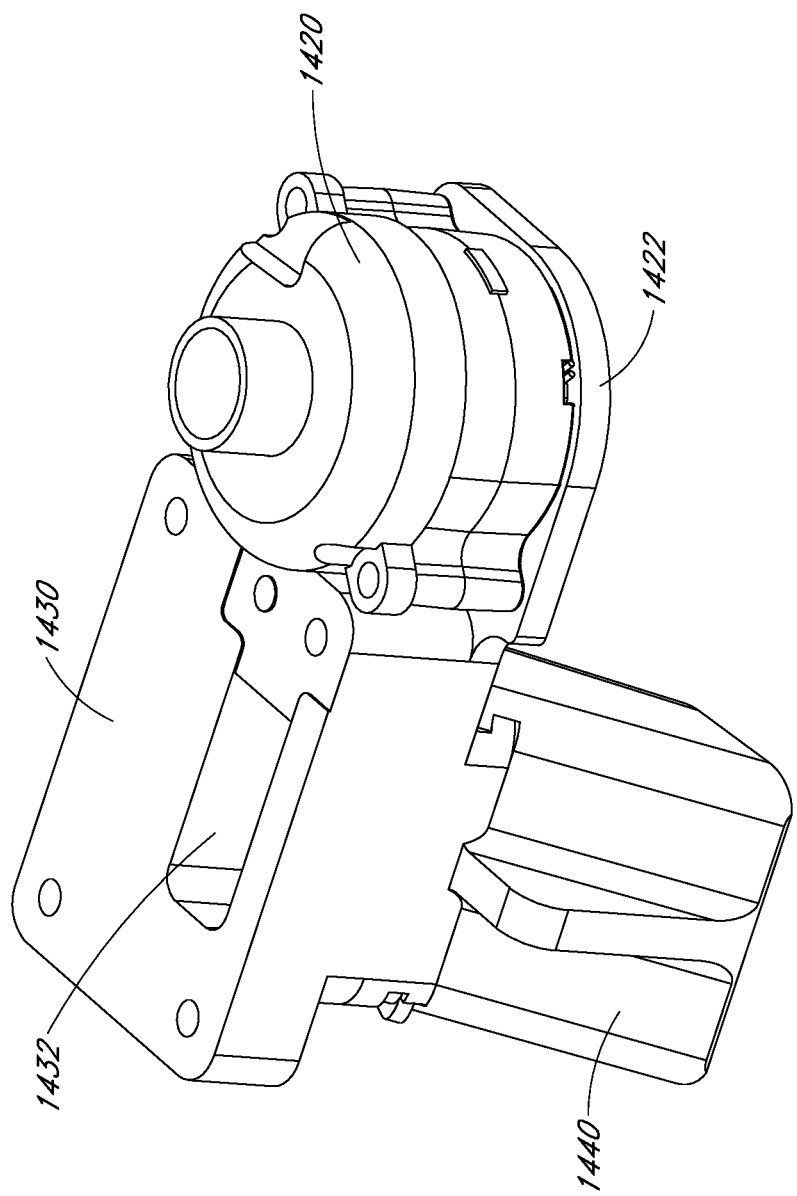
FIG. 47A shows a first perspective view of the fan system of FIG. 46 where a grinder has been removed.
Figure 47B:
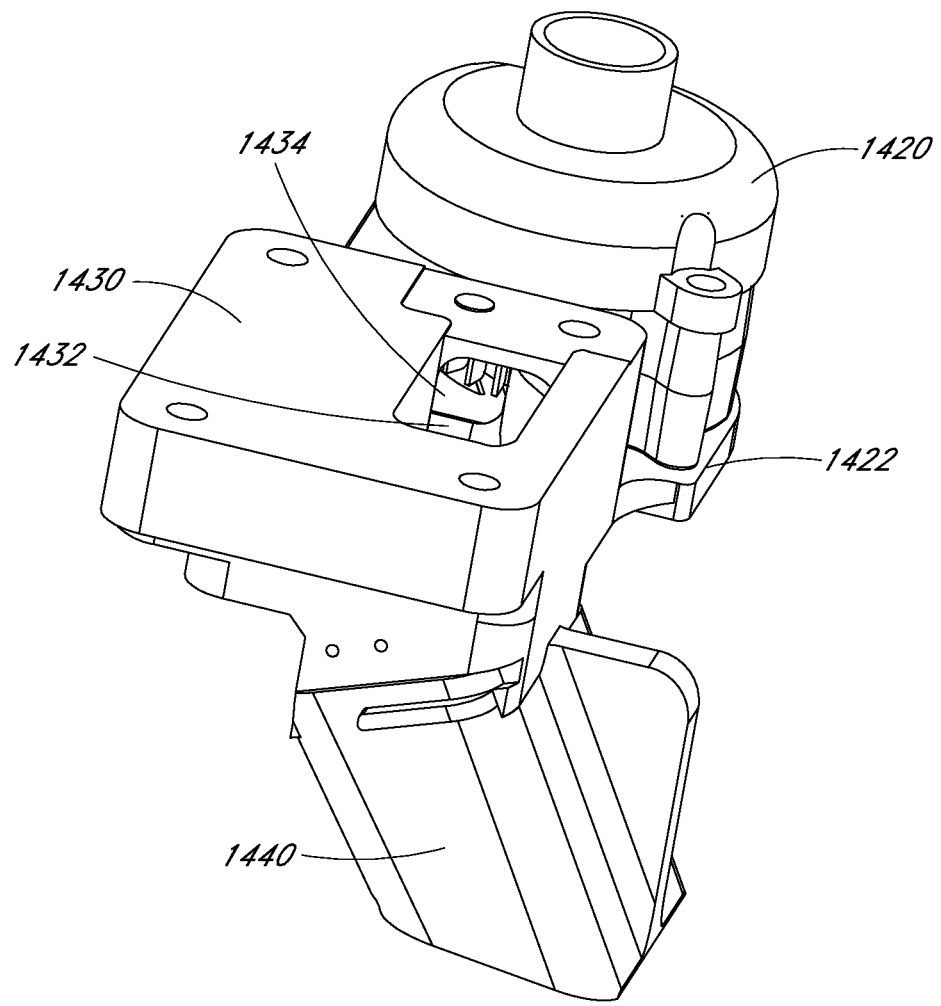
FIG. 47B shows a second perspective view of the fan system of FIG. 47A.
Figure 48A:
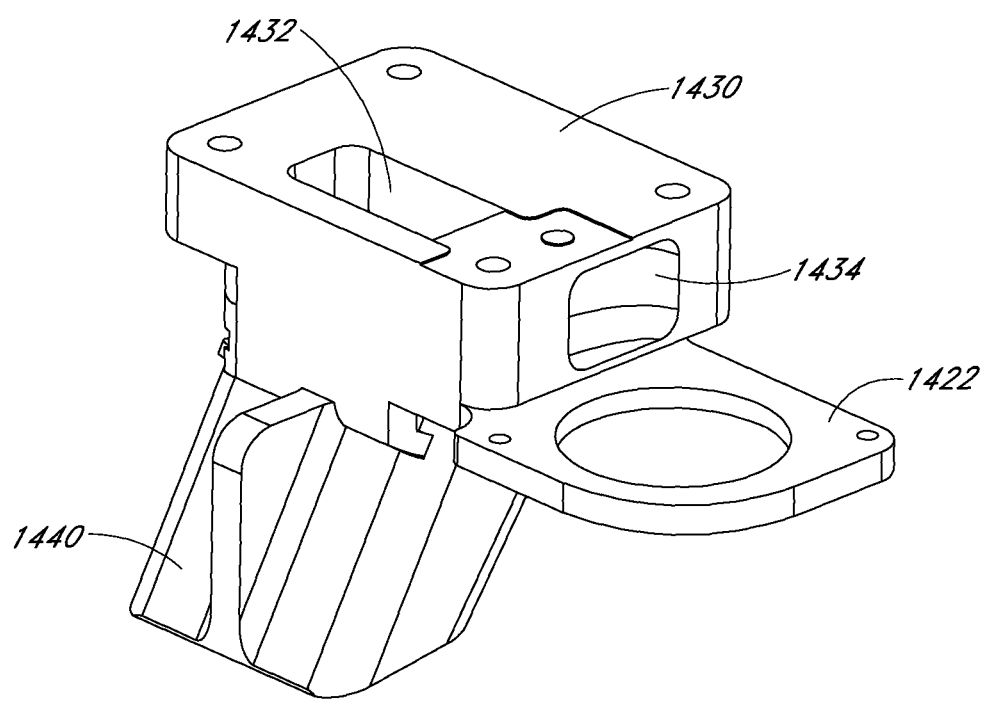
FIG. 48A shows a first perspective view of the fan system of FIG. 46 where a grinder and a fan have been removed.
Figure 48B:
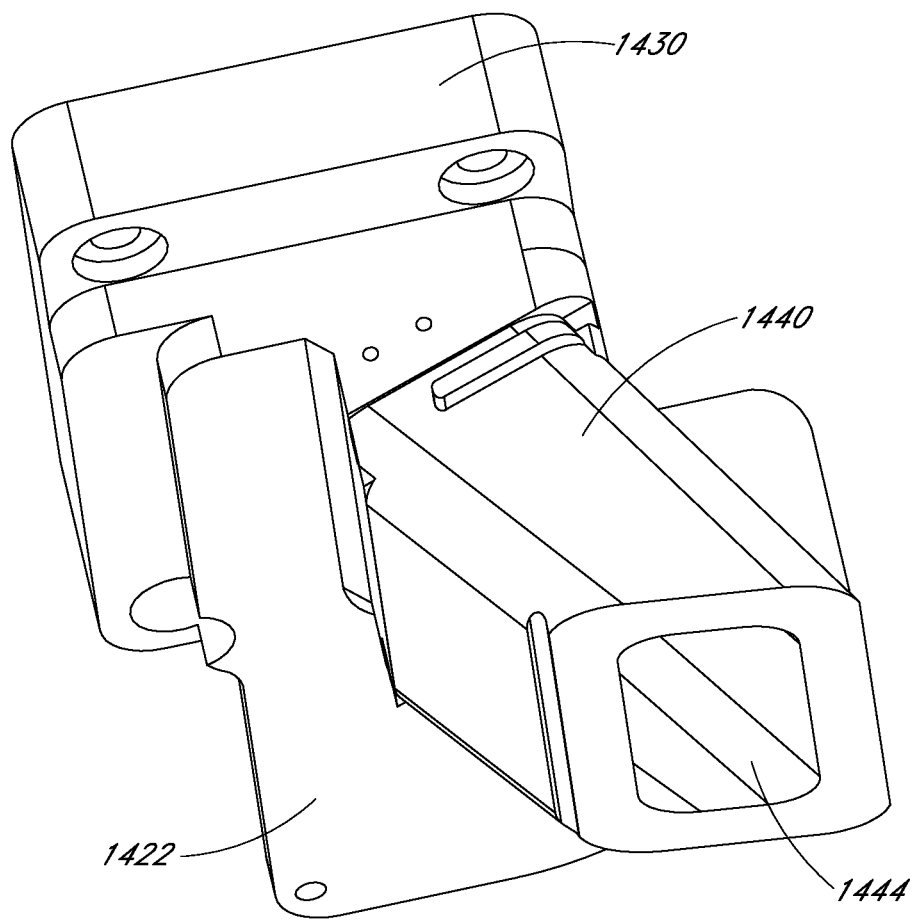
FIG. 48B shows a second perspective view of the fan system of FIG. 48A.

FIGS. 47-49 illustrate additional views where certain components have been removed to better show certain features. For example, FIGS. 47A and 47B show additional views where the grinder 1400 has been removed. FIG. 47A shows that the exit port 1430 may define a first opening 1432 that leads to the grounds chute 1440, while FIG. 47B shows that the exit port 1430 may define a second opening 1434 that enables the fan 1420 to provide airflow to the exit port 1430. FIGS. 48A and 48B show additional views where the grinder 1400 and the fan 1420 have been removed. For instance, FIG. 48A shows the first opening 1432 and the second opening 1434 of the exit port 1430. In FIG. 48B, it can be seen that the grounds chute 1440 may define a distal opening 1444 that is configured to provide ground material to a brewing chamber 1210. FIG. 49 shows an additional view where the grinder 1400 and the exit port 1430 have been removed. That figure illustrates that the fan 1420 may define an opening 1424 configured to allow air to flow from the fan 1420 to the exit port 1430. Air may then flow through the exit port 1430 through a proximal opening 1442 defined by the grounds chute 1440.

Although some embodiments have been discussed above in terms of apparatus, systems, and methods for brewing a coffee beverage using coffee beans, the disclosed embodiments may also be employed to brew other types of materials that are mixed with a fluid to form a beverage. Furthermore, the disclosed apparatus, systems, and methods may be used or employed in a commercial setting, such as at a coffeehouse or coffee shop, or in a residential setting, such as at a user's home. While the term "user" may be referred to as a barista in some embodiments and applications, the user may includes other individuals such as a manager, employee, customer, client, colleague, family member, friend, acquaintance, or any other individual. In some embodiments, the user may include a machine instead of, or in addition to, a person.

Some embodiments of the systems for brewing a beverage disclosed herein may use one or more cooking management systems. Embodiments of such cooking management systems are disclosed in U.S. Provisional Patent Application No. 61/563,317, filed on Nov. 23, 2011, having, and entitled "Cooking Management," the entire content of which is hereby incorporated by reference in its entirety. Embodiments of such cooking management systems are also disclosed in U.S. Patent Application having, which was filed on Nov. 21, 2012, which claims priority to U.S. Provisional Patent Application No. 61/563,317, and which is entitled "Cooking Management," the entire content of which is hereby incorporated by reference in its entirety.

Conditional language such as, among others, "can," "could," "might," or "may," unless specifically stated otherwise, are otherwise understood within the context as used in general to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

It should be emphasized that many variations and modifications may be made to the embodiments disclosed herein, the elements of which are to be understood as being among other acceptable examples. Accordingly, it should be understood that various features and aspects of the disclosed embodiments can be combined with or substituted for one another in order to form varying modes of the disclosed apparatus, systems, and methods. All such modifications and variations are intended to be included and fall within the scope of the embodiments disclosed herein.

What is claimed is:

1. An apparatus for brewing a beverage, the apparatus comprising:
at least one brew module configured to brew a single-cup portion of a beverage, the at least one brew module comprising a chamber configured to receive ground material and configured to engage with a nozzle;
wherein the chamber defines a first opening and a second opening, the first opening configured to receive ground material and the second opening configured to engage with the nozzle to direct a fan spray of liquid to one or more inner sidewalls of the chamber during a brew cycle;
wherein the second opening defines a plane across the second opening;
wherein the nozzle is configured to be inclined with respect to the plane across the second opening such that a face of the nozzle defines an angle between 5° and 60° with respect to the plane across the second opening;
wherein the nozzle is configured to direct liquid to an inner portion of the chamber during a brew cycle to agitate ground material during the brew cycle.

2. The apparatus of claim 1, wherein the chamber comprises a plow feature configured to direct debris toward a waste bin.

3. The apparatus of claim 1, wherein the chamber is configured to be removed from the brew module after a brew cycle.

4. The apparatus of claim 1, wherein the face of the nozzle defines an angle between about 10° and 30° with respect to the plane across the second opening.

5. The apparatus of claim 1, wherein the face of the nozzle defines an angle between about 15° and 20° with respect to the plane across the second opening.

6. The apparatus of claim 1, wherein the at least one brew module further comprises a wiper assembly configured to automatically clean the at least one brew module.

7. The apparatus of claim 1, wherein the apparatus further comprises a doser and a grinder, wherein the doser is configured to provide a precise amount of material to the grinder.

8. The apparatus of claim 7, wherein the apparatus further comprises an upper subassembly configured to engage with the doser which is configured to engage with one or more hoppers.

9. The apparatus of claim 1, wherein the ground material is ground coffee.

10. The apparatus of claim 1, wherein the liquid is water.

11. The apparatus of claim 1, wherein the apparatus is configured to brew at least three single-cup portions of coffee simultaneously.

12. The apparatus of claim 1, wherein the apparatus for brewing a beverage comprises one brew module.

13. The apparatus of claim 1, wherein the apparatus for brewing a beverage comprises two brew modules.

14. The apparatus of claim 1, wherein the apparatus for brewing a beverage comprises three brew modules.

15. The apparatus of claim 1, wherein the apparatus for brewing a beverage comprises four or more brew modules.

\* \* \* \* \*